(12) United States Patent
Jannard

(10) Patent No.: US 11,165,895 B2
(45) Date of Patent: *Nov. 2, 2021

(54) MODULAR DIGITAL CAMERA AND CELLULAR PHONE

(71) Applicant: RED HYDROGEN LLC, Irvine, CA (US)

(72) Inventor: James H. Jannard, Las Vegas, NV (US)

(73) Assignee: RED.COM, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,293

(22) Filed: Feb. 26, 2019

(65) Prior Publication Data

US 2019/0260862 A1 Aug. 22, 2019

Related U.S. Application Data

(63) Continuation of application No. 16/141,564, filed on Sep. 25, 2018, now abandoned, which is a continuation of application No. 15/376,407, filed on Dec. 12, 2016, now Pat. No. 10,116,776.

(60) Provisional application No. 62/267,038, filed on Dec. 14, 2015.

(51) Int. Cl.
*H04B 1/38* (2015.01)
*H04M 1/02* (2006.01)
*H04N 5/225* (2006.01)

(52) U.S. Cl.
CPC ....... *H04M 1/0264* (2013.01); *H04M 1/0254* (2013.01); *H04N 5/225* (2013.01); *H04N 5/2252* (2013.01); *H04N 5/2253* (2013.01); *H04N 5/2254* (2013.01); *H04N 5/2258* (2013.01); *H04N 5/2257* (2013.01)

(58) Field of Classification Search
None
See application file for complete search history.

(56) References Cited

U.S. PATENT DOCUMENTS

| 3,295,425 A | 1/1967 | Bing |
| 3,559,542 A | 2/1971 | Clapp |
| 4,239,364 A | 12/1980 | Doi |
| 4,281,909 A | 8/1981 | Ishibashi |

(Continued)

FOREIGN PATENT DOCUMENTS

| CN | 2470854 | 1/2002 |
| CN | 1512764 | 7/2004 |

(Continued)

OTHER PUBLICATIONS

ArriPL. Wikipedia.org, available online Dec. 25, 2013, from: http://web.archive.org/web/20131225170240/http://en.wikipedia.org/wiki/Arri_PL.

(Continued)

*Primary Examiner* — Tuan A Tran
(74) *Attorney, Agent, or Firm* — Mintz Levin Cohn Ferris Glovsky and Popeo, P.C.; F. Jason Far-hadian, Esq.

(57) ABSTRACT

Modular digital camera systems, such as modular digital still and motion cameras are disclosed. Individual modules may be removed from the system and replaced, such as to benefit from upgraded technology, while preserving the remaining modules in the system. According to certain aspects, the modular camera system includes cellphone functionality and multiple cameras.

19 Claims, 23 Drawing Sheets

(56) References Cited

U.S. PATENT DOCUMENTS

| | | | |
|---|---|---|---|
| 4,417,276 A | 11/1983 | Bennett | |
| 4,420,240 A | 12/1983 | Katsuma | |
| 4,507,689 A | 3/1985 | Kozuki | |
| 4,550,343 A | 10/1985 | Nakatani | |
| 4,659,203 A | 4/1987 | Niwa | |
| 4,746,990 A | 5/1988 | Katoh | |
| 4,769,665 A | 9/1988 | Dagborn | |
| 4,873,580 A | 10/1989 | Katoh | |
| 4,914,746 A | 4/1990 | Seiki et al. | |
| 4,924,246 A | 5/1990 | Yamada | |
| 5,005,948 A | 4/1991 | Takahashi | |
| 5,016,034 A | 5/1991 | Goto | |
| 5,132,800 A | 7/1992 | Wada | |
| 5,189,520 A | 2/1993 | Okayasu | |
| 5,206,731 A | 4/1993 | Takaiwa | |
| 5,221,964 A | 6/1993 | Chamberlain | |
| 5,264,935 A | 11/1993 | Nakajima | |
| 5,469,211 A | 11/1995 | Maruichi | |
| 5,500,701 A | 3/1996 | Itoh | |
| 5,568,205 A | 10/1996 | Hurwitz | |
| 5,708,874 A | 1/1998 | Schrock | |
| 5,844,604 A | 12/1998 | Myeong | |
| 6,027,828 A * | 2/2000 | Hahn | H01M 2/1022 429/100 |
| 6,034,728 A | 3/2000 | Arena | |
| 6,087,803 A | 7/2000 | Eguchi | |
| 6,137,686 A | 10/2000 | Saye | |
| 6,628,326 B1 | 9/2003 | Manico | |
| 6,731,952 B2 * | 5/2004 | Schaeffer | H04M 1/0262 455/556.1 |
| 6,760,135 B1 | 7/2004 | Payne et al. | |
| 6,903,766 B1 | 6/2005 | Silverbrook | |
| 7,144,262 B2 * | 12/2006 | Cheng | H04M 1/0254 439/151 |
| 7,170,557 B2 | 1/2007 | Manico | |
| 7,190,496 B2 | 3/2007 | Klug et al. | |
| 7,286,182 B2 | 10/2007 | Silverbrook | |
| 7,322,863 B2 | 1/2008 | Rapp | |
| 7,327,396 B2 | 2/2008 | Schultz | |
| 7,385,773 B2 | 6/2008 | Chang | |
| 7,396,235 B2 | 7/2008 | De Wilde | |
| 7,466,360 B2 | 12/2008 | Lee | |
| 7,518,654 B2 | 4/2009 | Bleau | |
| 7,532,249 B2 | 5/2009 | Shultz | |
| 7,576,776 B2 | 8/2009 | Silverbrook | |
| 7,589,920 B2 | 9/2009 | Shin | |
| 7,600,932 B2 | 10/2009 | Senba | |
| 7,604,423 B2 | 10/2009 | Nagata | |
| 7,736,072 B2 | 6/2010 | Tian | |
| 7,830,967 B1 | 11/2010 | Jannard et al. | |
| 7,862,185 B2 * | 1/2011 | Noba | H04M 1/0214 348/14.01 |
| 7,917,028 B2 | 3/2011 | Lin | |
| 7,972,069 B2 | 7/2011 | Shintani | |
| 8,019,216 B2 | 9/2011 | Jannard | |
| 8,068,168 B2 | 11/2011 | Haubmann | |
| 8,174,560 B2 | 5/2012 | Jannard et al. | |
| 8,237,830 B2 | 8/2012 | Jannard et al. | |
| 8,290,360 B2 | 10/2012 | Jannard | |
| 8,330,852 B2 * | 12/2012 | Kane | H04N 5/23212 348/362 |
| 8,358,357 B2 | 1/2013 | Jannard et al. | |
| 8,436,912 B2 * | 5/2013 | Kane | H04N 5/2226 348/222.1 |
| 8,477,238 B2 | 7/2013 | Jannard | |
| 8,525,924 B2 | 9/2013 | Jannard | |
| 8,525,925 B2 | 9/2013 | Jannard | |
| 8,587,648 B2 | 11/2013 | Olsson | |
| 8,634,873 B2 | 1/2014 | Jones | |
| 8,704,944 B1 | 4/2014 | Wierzoch | |
| 8,773,550 B2 * | 7/2014 | Kane | H04N 5/23264 348/222.1 |
| 8,773,581 B2 | 7/2014 | Jannard | |
| 8,830,607 B2 | 9/2014 | Linuma | |
| 8,862,183 B2 | 10/2014 | Kulas | |
| 8,872,933 B2 | 10/2014 | Jannard et al. | |
| 8,913,179 B2 | 12/2014 | Jannard | |
| 8,947,586 B2 | 2/2015 | Yamada | |
| 9,019,397 B2 | 4/2015 | Jannard | |
| 9,031,610 B2 * | 5/2015 | Kulas | H04M 1/0254 455/556.1 |
| 9,128,226 B2 | 9/2015 | Fattal et al. | |
| 9,247,041 B2 * | 1/2016 | Moran | H04M 1/0264 |
| 9,281,702 B2 | 3/2016 | Hotta | |
| 9,304,491 B2 | 4/2016 | Nikonov et al. | |
| 9,357,109 B2 * | 5/2016 | Hyers | H04N 5/2254 |
| 9,386,367 B2 * | 7/2016 | Onishi | H04M 1/0254 |
| 9,389,415 B2 | 7/2016 | Fattal et al. | |
| 9,451,143 B2 * | 9/2016 | Shinozaki | H04N 1/2112 |
| 9,459,461 B2 | 10/2016 | Santori et al. | |
| 9,467,548 B1 | 10/2016 | Allore | |
| 9,467,608 B2 * | 10/2016 | Barros | H04B 1/3888 |
| 9,531,345 B2 * | 12/2016 | Lombardi | H01Q 21/28 |
| 9,544,416 B2 | 1/2017 | Lombardi | |
| 9,557,466 B2 | 1/2017 | Fattal | |
| 9,568,806 B2 * | 2/2017 | Kim | H04N 5/2254 |
| 9,568,808 B2 | 2/2017 | Pizzo | |
| 9,584,639 B2 | 2/2017 | Slaby | |
| 9,609,454 B2 | 3/2017 | Haurais et al. | |
| 9,614,949 B2 | 4/2017 | Lombardi | |
| 9,621,690 B2 | 4/2017 | Jannard | |
| 9,634,774 B1 | 4/2017 | Sayem | |
| 9,667,760 B2 | 5/2017 | Lim | |
| 9,667,871 B2 | 5/2017 | Lombardi | |
| 9,769,588 B2 | 9/2017 | Shenoy et al. | |
| 9,774,712 B2 | 9/2017 | Connell | |
| 9,785,119 B2 | 10/2017 | Taff et al. | |
| 9,800,875 B2 | 10/2017 | Bhat | |
| 9,871,900 B2 | 1/2018 | Jannard | |
| 9,917,935 B2 | 3/2018 | Jannard | |
| 10,070,118 B2 | 9/2018 | Baran et al. | |
| 10,082,613 B2 | 9/2018 | Fattal et al. | |
| 10,116,776 B2 | 10/2018 | Jannard | |
| 10,200,583 B2 * | 2/2019 | Gomes Da Motta | H04N 5/23203 |
| 10,313,568 B2 * | 6/2019 | Barros | A45C 13/002 |
| 10,560,689 B2 | 2/2020 | Lapstun | |
| 10,687,046 B2 | 6/2020 | Trevor et al. | |
| 2002/0196360 A1 | 12/2002 | Miyadera | |
| 2003/0193571 A1 | 10/2003 | Schultz | |
| 2003/0202013 A1 | 10/2003 | Wilkinson | |
| 2003/0210333 A1 | 11/2003 | Manico et al. | |
| 2004/0004952 A1 | 1/2004 | McGrath | |
| 2004/0032506 A1 | 2/2004 | Silverbrook | |
| 2004/0097277 A1 | 5/2004 | Shimamura | |
| 2004/0127254 A1 | 7/2004 | Chang | |
| 2004/0198101 A1 | 10/2004 | Rapp | |
| 2004/0209645 A1 | 10/2004 | Park | |
| 2005/0068422 A1 | 3/2005 | Silverbrook | |
| 2005/0073587 A1 | 4/2005 | Silverbrook | |
| 2005/0122416 A1 | 6/2005 | Ryu | |
| 2005/0141199 A1 | 6/2005 | Chiou | |
| 2006/0216023 A1 | 9/2006 | Tokiwa | |
| 2006/0216973 A1 | 9/2006 | Walmsley | |
| 2006/0233545 A1 | 10/2006 | Senba | |
| 2006/0268159 A1 | 11/2006 | Orimoto | |
| 2007/0024721 A1 * | 2/2007 | Rogers | H04N 5/238 348/229.1 |
| 2007/0043963 A1 | 2/2007 | Cheng | |
| 2007/0073937 A1 | 3/2007 | Feinberg | |
| 2007/0098385 A1 | 5/2007 | Tanaka | |
| 2007/0126871 A1 | 6/2007 | Henninger | |
| 2007/0126872 A1 | 6/2007 | Bolotine | |
| 2008/0002968 A1 | 1/2008 | Arai | |
| 2008/0055052 A1 | 3/2008 | Chang | |
| 2008/0136915 A1 | 6/2008 | Iwamura | |
| 2008/0186397 A1 | 8/2008 | Kim | |
| 2008/0219659 A1 | 9/2008 | Tian | |
| 2008/0233870 A1 | 9/2008 | Budde | |
| 2008/0246842 A1 | 10/2008 | Inoue | |
| 2008/0266387 A1 | 10/2008 | Krijn | |
| 2009/0073300 A1 | 3/2009 | Chung | |
| 2009/0154594 A1 | 6/2009 | Yeh | |

(56) References Cited

U.S. PATENT DOCUMENTS

| | | |
|---|---|---|
| 2009/0231483 A1 | 9/2009 | Seddik |
| 2009/0251423 A1 | 10/2009 | Jung |
| 2009/0291709 A1 | 11/2009 | Lee |
| 2009/0316038 A1 | 12/2009 | Schmack |
| 2010/0011228 A1 | 1/2010 | Chen |
| 2010/0085474 A1 | 4/2010 | Morita |
| 2010/0097030 A1 | 4/2010 | Kim |
| 2010/0111489 A1 | 5/2010 | Presler |
| 2010/0165138 A1 | 7/2010 | Jannard |
| 2010/0165188 A1 | 7/2010 | Jannard |
| 2010/0208434 A1 | 8/2010 | Kim |
| 2010/0328526 A1 | 12/2010 | Halliday |
| 2011/0052137 A1 | 3/2011 | Cowie |
| 2011/0149292 A1* | 6/2011 | Himmelhaus ............ G01J 3/45 356/454 |
| 2011/0193949 A1 | 8/2011 | Nambakam |
| 2011/0216485 A1 | 9/2011 | Kang |
| 2011/0249128 A1 | 10/2011 | Squyres |
| 2011/0309728 A1 | 12/2011 | Diebel |
| 2012/0062180 A1 | 3/2012 | Nakamura |
| 2012/0076362 A1* | 3/2012 | Kane ...................... G06T 5/003 382/106 |
| 2012/0093494 A1 | 4/2012 | Wang |
| 2012/0268648 A1 | 10/2012 | Yang |
| 2012/0270598 A1 | 10/2012 | Okuda |
| 2012/0274808 A1* | 11/2012 | Chong ............ H04N 5/232933 348/234 |
| 2012/0294582 A1 | 11/2012 | Jannard et al. |
| 2012/0327296 A1 | 12/2012 | Kim |
| 2013/0077953 A1 | 3/2013 | Kikuchi |
| 2013/0111464 A1 | 5/2013 | Markas |
| 2013/0113951 A1 | 5/2013 | Jannard |
| 2013/0128110 A1 | 5/2013 | Jannard |
| 2013/0163980 A1 | 6/2013 | Lazaridis |
| 2013/0176481 A1 | 7/2013 | Holmes |
| 2013/0245039 A1 | 9/2013 | Higgins et al. |
| 2013/0265662 A1 | 10/2013 | Araie |
| 2013/0267283 A1* | 10/2013 | Guzman ............. H04N 5/2254 455/575.1 |
| 2013/0303534 A1 | 11/2013 | Ibrahim et al. |
| 2014/0002725 A1 | 1/2014 | Jannard |
| 2014/0071548 A1 | 3/2014 | Sanford |
| 2014/0098225 A1 | 4/2014 | Rodriguez |
| 2014/0098509 A1 | 4/2014 | Tomoe |
| 2014/0128132 A1 | 5/2014 | Cox |
| 2014/0132816 A1 | 5/2014 | Jannard |
| 2014/0140688 A1 | 5/2014 | Xu |
| 2014/0169486 A1 | 6/2014 | McCormack |
| 2014/0185844 A1 | 7/2014 | Haurais et al. |
| 2014/0192183 A1 | 7/2014 | Liao |
| 2014/0267768 A1 | 9/2014 | Burleigh |
| 2014/0270687 A1 | 9/2014 | Jannard et al. |
| 2014/0320696 A1 | 10/2014 | Jannard |
| 2014/0368731 A1 | 12/2014 | Hyers |
| 2015/0076190 A1 | 3/2015 | deSouza |
| 2015/0156379 A1 | 6/2015 | Jannard |
| 2015/0256655 A1 | 9/2015 | Jannard |
| 2015/0271307 A1 | 9/2015 | Berg |
| 2015/0271420 A1 | 9/2015 | Neal |
| 2015/0288942 A1 | 10/2015 | Jannard et al. |
| 2015/0296104 A1 | 10/2015 | Jannard |
| 2015/0334258 A1 | 11/2015 | O'neill |
| 2015/0334306 A1 | 11/2015 | Sato |
| 2016/0041453 A1 | 2/2016 | Pizzo |
| 2016/0044148 A1 | 2/2016 | Jannard |
| 2016/0195609 A1 | 7/2016 | Lin |
| 2016/0234363 A1 | 8/2016 | Lombardi |
| 2016/0282915 A1 | 9/2016 | Lombardi |
| 2016/0309283 A1 | 10/2016 | Lombardi |
| 2016/0316050 A1 | 10/2016 | Lombardi et al. |
| 2016/0366259 A1* | 12/2016 | Lombardi ............ H04M 1/0256 |
| 2016/0377947 A1* | 12/2016 | Scepanovic ............ G02F 1/157 455/566 |
| 2017/0041449 A1 | 2/2017 | Connell |
| 2017/0041450 A1 | 2/2017 | Connell |
| 2017/0064054 A1 | 3/2017 | Lombardi |
| 2017/0171371 A1 | 6/2017 | Jannard |
| 2017/0201672 A1 | 7/2017 | Hayashi |
| 2017/0214777 A1 | 7/2017 | Jannard |
| 2017/0215018 A1 | 7/2017 | Rosset et al. |
| 2017/0230585 A1 | 8/2017 | Nash et al. |
| 2017/0261838 A1 | 9/2017 | Pizzo |
| 2018/0253884 A1 | 9/2018 | Burnett, III |
| 2019/0166359 A1 | 5/2019 | Lapstun |
| 2020/0128233 A1 | 4/2020 | Jannard et al. |

FOREIGN PATENT DOCUMENTS

| | | |
|---|---|---|
| CN | 1520156 | 8/2004 |
| CN | 1690896 | 11/2005 |
| CN | 2772066 | 4/2006 |
| CN | 101609196 A | 12/2009 |
| CN | 103018873 A | 4/2013 |
| CN | 203522875 | 4/2014 |
| DE | 43 04 506 | 8/1994 |
| DE | 195 47 166 | 6/1996 |
| DE | 20 220 067 | 4/2003 |
| DE | 10 2010 009 851 | 9/2011 |
| EP | 0 225 408 | 6/1987 |
| EP | 0 574 105 | 12/1993 |
| EP | 1 212 728 | 6/2002 |
| EP | 3 123 708 | 2/2017 |
| FR | 2918834 A1 | 1/2009 |
| GB | 2 026 187 | 1/1980 |
| JP | 61-059978 | 3/1986 |
| JP | 11-040960 | 2/1999 |
| JP | 11-146245 | 5/1999 |
| JP | 2001-285687 | 10/2001 |
| JP | 2003-057742 | 2/2003 |
| JP | 2003-289498 | 10/2003 |
| JP | 2004172654 A | 6/2004 |
| JP | 2007-286201 | 11/2007 |
| JP | 2007-310005 | 11/2007 |
| JP | 2010-145707 | 7/2010 |
| JP | 2011-081331 | 4/2011 |
| JP | 2011-095689 | 5/2011 |
| JP | 2011187043 A | 9/2011 |
| JP | 2012514391 A | 6/2012 |
| KR | 10-2004-0079203 | 9/2004 |
| KR | 10-2006-0012933 | 2/2006 |
| KR | 10-0595695 | 7/2006 |
| KR | 10-0663380 | 1/2007 |
| KR | 10-2010-0082452 | 7/2010 |
| TW | 200720813 | 6/2007 |
| WO | WO 2000072260 | 11/2000 |
| WO | WO 2007036308 | 4/2007 |
| WO | WO 2007075000 | 7/2007 |
| WO | WO 2008128205 | 10/2008 |
| WO | 2010078173 A1 | 7/2010 |
| WO | WO 2015153787 | 10/2015 |
| WO | 2017204840 A1 | 11/2017 |
| WO | 2018185733 A1 | 10/2018 |

OTHER PUBLICATIONS

Baldwin, 10 things you need to know about Google's Project Ara Modular Smartphones, 2014, 10 pages.
Beacham, RED's modular camera breaks new ground, TV Technology, 2010.
Davies, RED Scarlett & EPIC Modulare HD camera "Brains" announced: Awesom, 2008, 26 pages.
Epic Dragon Features, available online Jul. 26, 2013, from: https://web.archive.org/web/20130726055056/http://www.red.com/products/epicdragon#features.
Epic Dragon Overview available online Jul. 26, 2013, from: https://web.archive.org/web/20130726055056/http://www.red.com/products/epic-dragon#features.
Fotodiox Pro Lens Adapter, Arri PL Mount lens to Sony E-Mount mirrorless camera such as NEX VG-10, FS-700.
Hasselblad True Zoon—Moto Mods—Motorola, 2017, 4 pages.
JBL SoundBoost Speaker—Moto Mods—Motorola, 2017, 4 pages.

(56) References Cited

OTHER PUBLICATIONS

Kumar, CES 2014: ZTE Introduces its Eco-Mobius Modular Smartphone Concept, 2014, 2 pages.
Leitner, Back to the future with 4K: Large-sensor motion picture cameras in 2013, 2013, 17 pages.
Marine, Open Source Apertus Axiom 4K Camera project exploring swappable sensors, 2014, 11 pages.
Meet the toughest, most durable smartphones money can buy, 2014, www.phonearena.com.
Moto Insta-Share Projector—Moto Mods—Motorola, 2017, 4 page.
Moto Mods—Modify your smartphone—Motorola, 2017, 6 pages.
RED ONE Digital Cinema Camera, Operations Guide Build 14, 2008, p. 64.
RedUser.net, Meizler Module-Sneak Pea, 2014, 4 pages.
RedUser.net, The Meizler module . . . The details, 2012, 8 pages.
Ridden, WVIL Concept: Digital SLR meets mobile phone, with an ingenious twists, 2011, 5 pages.
Shirmohammadi, et al., Using smart cameras to localize self-assembling modular robots, IEEE, 2007, pp. 76-80.
Sony E-mount, available online Dec. 11, 2013, htttps:web.archieve.org/web/20131211063640/http://en.wikipedia.org/wiki/Sony_E-mount.
Waller, ePhotonzine, Nikon 1 AW1 Review, 2017, 15 pages.
Varias, Aspekt modular SLR camera concept: Connecti-cam, 2013, 3 pages.
Yamashita, et al., 8K Extremely-High-Resolution Camera Systems, Proceeding of the IEEE, 2013, pp. 74-88, vol. 101, No. 1.
Zhang, Equinox: A modular concept camera that can take on various form factors, 2013, 17 pages.
Zhang, Hasselblad made a phone attachment that adds RAW and 10x zoom, 2017, 8 pages.
International Search Report and Written Opinion for PCT Application No. PCT/US2015/044285, dated Jan. 15, 2016. 17 pages.
International Search Report and Written Opinion for PCT Application No. PCT/US2016/066193, dated Mar. 13, 2017, 18 pages.
International Search Report and Written Opinion for PCT Application No. PCT/US2019/55723, dated Jan. 7, 2020, 13 pages.
Invitation to Pay Additional Fees and, Where Applicable, Protest Fee for PCT Application No. PCT/US2015/044285, dated Oct. 23, 2015. 5 pages.
Micro Four Thirds System (Apr. 24, 2013) Available at: Wikipedia.org, https://web.archive.org/web/2013042420648/http://en.wikipedia.org/wiki/MicroFour_Thirds_system, 19 pages.

* cited by examiner

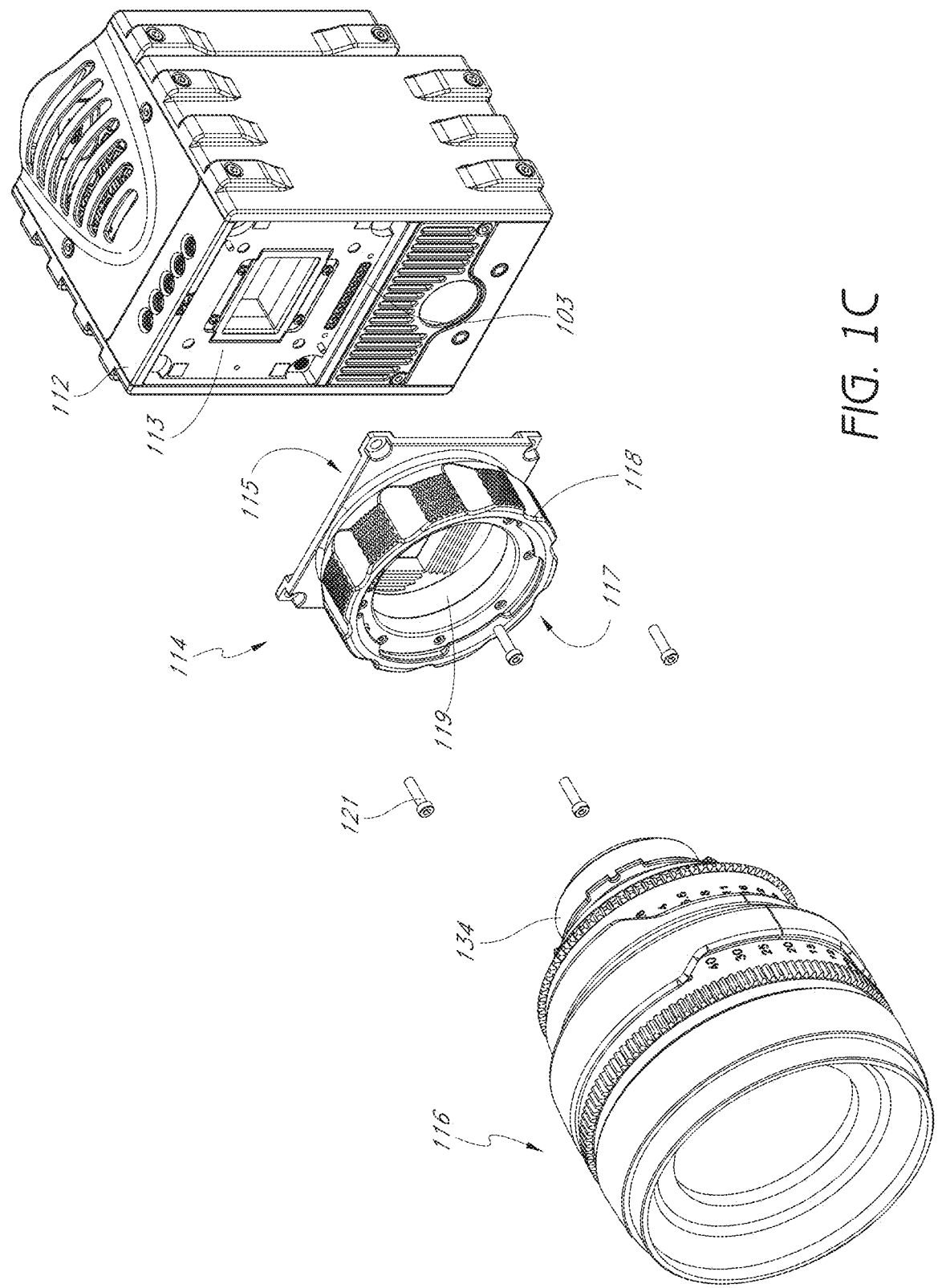

MODULAR DIGITAL CAMERA AND CELLULAR PHONE

CROSS-REFERENCE TO RELATED APPLICATION

Any and all applications for which a foreign or domestic priority claim is identified in the Application Data Sheet as filed with the present application are hereby incorporated by reference under 37 CFR 1.57.

BACKGROUND

Digital cameras include a series of functional components such as lenses, optical filters, one or more electronic image sensor arrays, electronic circuits to capture, process and store images from the image sensor array, internal or external memory devices to store and transfer image files, power supplies and a display system to preview the captured images. These components are typically integrated and interdependent, from each of an optical, electronics and physical perspective. In many instances, external lenses and power supplies may be attached to and removed from the camera. But the remaining components are typically permanently integrated into a main framework or housing without any practical ability to be removed and replaced. As a consequence, the performance and functionality of these cameras are limited by the least advanced component or the first component to malfunction. In addition, these cameras are not upgradeable with updated technology and must instead be replaced in their entirety in order to obtain the benefit of technological improvements in only a single component part. Additionally, due to the limited configurability associated with conventional cameras, they are typically suitable for a limited range of applications and contexts. For example, such cameras are generally suited for either still or motion photography, but not both. As a result, users who want to shoot in a variety of contexts and for a variety of applications often need to purchase multiple cameras to achieve desired results. Such limitations are present in a variety of different types of camera systems. For instance, cameras within integrated mobile phones are similarly limited in terms of upgradeability and configurability.

Thus, notwithstanding the various digital camera options available in the art, there remains a need for a camera system that is fully customizable by the user, and which overcomes the limitations discussed above.

SUMMARY

The present disclosure provides a fully modular digital camera system. In certain embodiments, for example, the digital camera system can advantageously be a digital still and motion camera (DSMC) which can be optionally configured for both still and motion shooting. In various embodiments, the camera system can be either a still, motion, or still/motion combination digital camera. Each module may be removed from the system and replaced, for example, by an upgraded technology module, while preserving the functionality of the remainder of the system. This interchangeable nature of the modular design allows a camera owner to replace various components as they are upgraded and improved, rather than having to replace the entire camera system.

In addition, the modules may be disconnected and reassembled by the user to rapidly change the physical configuration of the system. The various electronics modules may be connected to each other or stacked in any sequence and in a wide variety of geometries, to enable reconfiguration of the system to suit the user's preference.

According to certain aspects, the modular camera system is a modular cellular phone with multiple cameras. The modular cellular phone comprises a phone module comprising a phone module housing having first and second substantially planar sides spaced by a thickness of the phone module housing. The phone module can further comprise a battery within the phone module housing, and phone electronics configured to provide wireless voice and data communication functionality. The phone module can include a first camera comprising a first image sensor, and one or more memory devices configured to store digital image data derived from light incident on the first image sensor. The phone module can also comprise a phone module electrical interface having a first plurality of electrical connectors electrically connected to the phone electronics and positioned on the first side of the phone module housing, and a touch screen display on the second side of the phone module housing. The modular cellular phone can also include a camera module attachable to the phone module, comprising a camera module housing having a first side and a second side. The first side of the camera module housing can have an aperture through which light enters the camera module housing. The second side can be substantially planar. The camera module can further comprise a second camera, which can include a lens connected to the first side of the camera module housing over the aperture, and a second image sensor configured to digitize light incident on the second image sensor after the light passes through the lens and the aperture. The lens of the second camera can be a zoom lens. The camera module can also comprise a camera module electrical interface comprising a second plurality of electrical connectors positioned on the second side of the camera module housing. The modular cellular phone can further comprise magnets configured to provide for magnetic attachment of the phone module to the camera module, mating the first side of the phone module housing with the second side of the camera module housing. Video data acquired with the camera module can be transmitted to the phone module across a system bus formed by the electrical connections between the phone electrical connector and the camera electrical connector.

According to certain implementations, one or more of the phone module electrical interface and the camera module electrical interface can comprise retractable pins. The phone module housing and the camera module housing can be shaped as rectangular plates. A rectangular outer periphery of the first side of the phone module housing matches a rectangular outer periphery of the second side of the camera module housing. The second side of the camera module housing can be dimensioned to cover the entire first side of the phone module housing when the phone module and the camera module are coupled to one another. The phone module electrical interface and the camera module electrical interface can each comprise an oblong shape having a longest dimension extending in a direction transverse to a longitudinal direction of the phone and camera modules. The first camera can be positioned on the first side of the phone module housing. The first camera can be entirely covered by the second side of the camera module housing when the phone module and the camera module are coupled to one another.

The modular cellular phone can further comprise a battery module releasably magnetically attachable to the phone module via magnetic coupling of a side of the battery module to the first side of the phone module housing. The battery module can be configured to charge the battery of the phone module. The modular cellular phone can further comprise one or more of a projector module releasably attachable to the phone module via magnetic coupling of a side of the projector module to the first side of the phone module housing, and a speaker module releasably attachable to the phone module via magnetic coupling of a side of the speaker module to the first side of the phone module housing.

The phone module can be configured to operate in an independent mode and a modular mode. The independent mode corresponds to use of the phone module when decoupled from the camera module and the modular mode corresponds to use of the phone module when coupled to the camera module phone.

The video data can comprise a resolution of at least 2 k and a frame rate of at least 23 frames per second. The phone module can be configured to store the video data transmitted from the camera module in a raw format. The video data may be transmitted through the system bus in real time.

For example, the modular camera system may be assembled in a DSLR mode such as for use with a handle such as a bottom grip handle. The system may be disassembled and reassembled in an electronics news gathering (ENG) mode (e.g., for use with a shoulder mount), or into a studio configuration, such as for use on a tripod, dolly, or crane. Reconfiguration can be accomplished to move the center of gravity forward or backward along the viewing axis, and any of a variety of support hardware such as grips, bars, or frames may be readily connected to the modular system, as may be appropriate for the assembled configuration.

The modular camera system comprises a sensor module or "brain" in certain embodiments, and the terms sensor module and brain module are used interchangeably herein. The brain module preferably additionally comprises digital signal processing electronics and may further comprise an interface for removably receiving a functional module. The functional module may comprise any one or more of a recording module, a power module, an in/out module, a user interface module, lens mount, or some other type of functional module.

There is provided in accordance with one aspect of the present disclosure, a modular digital camera. The camera comprises a sensor module, having a first interface. A power module is provided having a second and third interface, and a recording module is provided, having a fourth and fifth interface. The first interface is functionally engageable with at least any of the second and fourth interfaces. In this manner, the power module, recording module, and other optional modules may be stacked in any order on the sensor module. In certain embodiments, the third interface is functionally engageable with the fourth interface, and the second interface is functionally engageable with the fifth interface.

The power module includes a recording bus extending between the second and third interface, for transmitting motion picture image data through the power module. The recording module includes a power bus extending between the fourth and fifth interface, for transmitting power through the recording module.

Preferably, the modular camera additionally comprises an in/out module having a sixth and seventh interface. The sixth interface is engageable with at least the first interface, and the seventh interface is engageable with at least the second interface. In this manner, the power module, recording module and in/out module may be stacked in any order on the sensor module.

Preferably, a user interface module is additionally provided. The user interface module may include an eighth interface, which may be engageable with any other interface in the system. In one implementation of the disclosure, the user interface module comprises an eighth interface which is engageable with any of the third and fifth interface. The user interface may additionally comprise a transceiver for wireless communication with other devices, such as the sensor module. The user interface may therefore be functionally associated with but physically detached from the modular camera system.

In one implementation, the modular camera further comprises at least a second power module, the second power module having a ninth and tenth interface. The second power module preferably comprises a recording bus extending between the ninth and tenth interface, for transmitting motion picture image data through the second power module. The second power module preferably also comprises a control bus extending between the ninth and tenth interface, for transmitting control signals through the second power module.

The module camera system preferably additionally comprises a lens mount module, releasably connectable to the sensor module. A digital signal processor may reside in the sensor module.

The sensor module may be directly or indirectly engageable with the other modules. For example, in certain embodiments, the first interface is indirectly functionally engageable with any of the second and fourth interfaces via a releasably attachable adapter plate. In some other embodiments, the first interface is indirectly functionally engageable with any of the second and fourth interfaces via one or more dummy modules.

In accordance with a further aspect of the present disclosure, there is provided a modular camera. The camera comprises a sensor module having a first bus segment, a recording module having a second bus segment, and a power module having a third bus segment. Each of the modules is releasably connectable to any other of the modules, such that every assembled configuration of the modules places the bus segments in communication with each other in a manner that permits functional electrical communication among each of the modules.

The modular camera system preferably additionally comprises an in/out module having a fourth bus segment, that is directly connectable with any of the other bus segments. The sensor module of certain embodiments can be directly or indirectly releasably connectable to any other of the modules. For example, the sensor module can be indirectly releasably connectable to any other of the modules via one or more of a releasably attachable adapter plate, dummy module, or the like.

In accordance with a further aspect of the present disclosure, there is provided a modular, convertible camera. The camera comprises a sensor module, a recording module, a power module, and a user interface module. Each module is directly or indirectly releasably connectable to the sensor module in a first construct to produce a camera having an ENG configuration, and at least one or two and preferably each module maybe disconnected and reassembled into a second construct, having a DSLR configuration. The camera may further include an in/out module.

In accordance with a further aspect of the present disclosure, there is provided a modular convertible camera system.

The system includes a sensor module, a recording module, a power module and a user interface module. Each module is directly or indirectly releasably connectable to the sensor module in a first construct to produce a camera having an ENG configuration, and at least one or two and preferably each module may be disconnected and reassembled into a second construct having a studio configuration.

In accordance with a further aspect of the present disclosure, there is provided a modular, convertible camera. The camera comprises a sensor module, a recording module, a power module, and a user interface module. Each module is directly or indirectly releasably connectable to the sensor module in a first construct, to produce a camera having a studio configuration, and at least one or two and preferably each module may be disconnected and reassembled into a second construct having a DSLR configuration.

In accordance with a further aspect of the present disclosure, there is provided a modular, multi-component convertible camera. The modular camera comprises a sensor module, a recording module, a power module, and a user interface module. Each module is directly or indirectly releasably connectable to the sensor module in a first construct to produce a camera having an ENG configuration, and each module may be disconnected and reassembled into a second construct having a DSLR configuration, and each module may be disconnected and reassembled into a third construct having a studio configuration.

In accordance with a further aspect of the present disclosure, there is provided a modular camera subassembly. The subassembly comprises a sensor module, having a sensor, digital signal processing electronics, and a back focal distance of no more than about 16 mm. The sensor module is configured for connection to an external recording module and an external power module.

There is provided in accordance with a further aspect of the present disclosure a module camera system configured for operation with any of a plurality of lenses having different focal lengths. The system comprises a sensor module, having an interface for removably receiving a lens mount module. At least a first and a second lens mount module are removably connectable to the interface, each lens mount module having a different focal length. Each lens mount module focal length is selected so that it can be mounted to the sensor module and added to the back focal length of the modular camera system, to produce an overall focal length of the system. The overall focal length of the system may be any of a variety of lengths, including 17 mm, 35 mm, 46 mm, 48 mm, 52 mm, or other focal length. In one implementation of the disclosure, the back focal length is no more than about 16 mm.

The modular camera system preferably additionally comprises digital signal processing electronics in the sensor module. The sensor module may further comprise an interface for removably receiving a functional module. The functional module may comprise any one or more of a recording module, a power module, an in/out module, and a user interface module.

In accordance with a further aspect of the present disclosure, there is provided a modular camera comprising a camera body having an image sensor and a first bus segment. The modular camera can include a first module having a second bus segment, and a second module having a third bus segment. In certain embodiments, each of the camera body, the first module and the second module are releasably connectable to each other. At least one assembled configuration of the modules places the bus segments in communication with each other in a manner that permits functional electrical communication among each of the modules in some embodiments. In some embodiments, every assembled configuration of the modules places the bus segments in communication with each other in a manner that permits functional electrical communication among each of the modules. According to some embodiments, the camera body is releasably connectable to each of the first and the second module via a releasably connectable adapter plate.

The modular camera may include a variety of modules. In some embodiments, the first module comprises a recording module and the second module comprises a power module. In one embodiment, the modular camera further comprises a third module having a fourth bus segment.

In certain embodiments, each of the first, second and third bus segments can include a power bus, for example. Additionally, each of the first, second and third bus segments comprises a SATA bus in some embodiments. In some embodiments, each of the first, second and third bus segments comprises a PCI Express bus.

There is provided in accordance with one aspect of the present disclosure, an image capturing apparatus. The image capturing apparatus can include an electronic image sensor having a plurality of sensor elements and, in certain embodiments, the sensor elements detect light and provide an output representative of the detected light. The image capturing apparatus includes a digitizing module that converts the output representative of the detected light into a digital format. The image capturing apparatus can further include a processor configured to communicate the digitized sensor output onto a digital bus. In addition, the image capturing apparatus can include a housing that contains the electronic image sensor, the digitizing module, and the processor. The housing can include a bus interface configured to electronically connect the digital bus to a detachable module. In certain embodiments, the housing also includes an engagement mechanism configured to physically fasten the housing with the detachable module. In certain embodiments, the digitized sensor output is compressed prior to communication on the digital bus.

A modular camera is provided in accordance with certain aspects of the disclosure. The modular camera can include a camera body comprising an image sensor and a first module interface. The first module interface includes a mating portion and an electrical coupling portion, for example. The modular camera can further include a plurality of modules each releasably and functionally engageable with the camera body and with each of the other of the plurality of modules. Each of the plurality of modules comprises a first interface in certain embodiments. The first interface includes a mating portion and an electrical coupling portion. The mating portion of the first interface can be releasably mechanically matable with the mating portion of the first module interface. Additionally, the electrical coupling portion of the first interface can be electrically couplable with the electrical coupling portion of the first module interface so as to communicate signals between the camera body and the module. Each of the plurality of modules can also include a second interface which may include a mating portion and an electrical coupling portion. The mating portion of the second interface can be releasably mechanically matable with the mating portion of the first interface of each of the other of the plurality of modules, for example. The electrical coupling portion of the second interface can be configured to be electrically couplable with the electrical coupling portion of the first interface of each of the other of the plurality of modules. In certain embodiments, each of the modules also includes a bus segment for communicating signals between the first interface and the second interface.

In certain embodiments, the first interface of each of the plurality of modules is located on a first side of a housing of the corresponding module. The second interface of each of the plurality of modules can be located on a second side of the housing of the corresponding module, wherein the second side is opposite the first side.

In certain embodiments, in an assembled configuration, a first module of the plurality of modules is attached to the camera body, and the remaining modules of the plurality of modules are arranged in a stack extending from the first module. In some embodiments, the first module of the plurality of modules comprises a recording module. A second module of the plurality of modules comprises a power module in some embodiments. In certain embodiments, a second module of the plurality of modules comprises a user interface module configured for wireless communication with the camera body. In certain embodiments, at least one module of the plurality of modules comprises a cooling unit.

The camera body comprises a releasably attachable adapter plate including the first module interface in some embodiments.

The bus segment can include a recording bus for transmitting image data between the first interface and the second interface. The bus segment can also include a power bus for transmitting power between the first interface and the second interface.

In some embodiments, the camera includes a lens mount module can be releasably connectable to a lens mount interface of the camera body. The camera can also include a handle module can be releasably connectable to an interface of the camera body. The camera body further comprises a second module interface releasably and functionally engageable with each of the plurality of modules in certain embodiments.

According to certain aspects of the disclosure, a module adapted to connect with a modular image capturing apparatus is provided. The module can include a housing and can further include a first bus interface having a first type of electrical connection located on a first side of the housing. The first bus interface can also include a second bus interface having a second type of electrical connection located on a side of the housing opposite the first side of the housing. For example, the first type of electrical connection can be operably couplable with electrical connections of the second type of electrical connection. The module can further include a first engagement interface of a first type located on the first side of the housing and a second engagement interface of a second type located on the second side of the housing. The engagement interfaces of the first type can be configured to fasten together with engagement interfaces of the second type. In certain embodiments, the first bus interface, the second bus interface, the first engagement component, and the second engagement component are positioned in the housing to allow multiple modules having the same configuration to be daisy-chained together.

In certain embodiments, the module can further include a repeater between the first bus interface and the second bus interface. The module can also include an amplifier between the first bus interface and the second bus interface in certain embodiments. In certain embodiments, the first bus interface and the second bus interface are Serial ATA compatible, for example. In some other embodiments, the first bus interface and the second bus interface are Peripheral Component Interconnect Express compatible. In certain embodiments, the first bus interface and the second bus interface are compatible with at least two high bandwidth buses. For example, the at least two high bandwidth buses are Serial ATA and Peripheral Component Interconnect Express buses. In some embodiments, the first bus interface and the second bus interface are compatible with at least three high bandwidth buses. The at least three high bandwidth buses are each capable of at least about 1 GB/s of data throughput, for example. In certain embodiments, the at least three high bandwidth buses comprise Serial ATA, Peripheral Component Interconnect Express, and XAUI buses. In some embodiments, the first bus interface and the second bus interface are further compatible with a plurality of support buses. For example, the plurality of support buses comprise two or more of an Inter-integrated circuit ($I^2C$) bus, a Serial Peripheral Interface (SPI) bus, a 1-Wire® bus, and an RS-232 bus, in certain embodiments.

The module can include a recording bus extending between the first bus interface and the second bus interface, for transmitting image data through the module. The module can also include a power bus extending between the first bus interface and the second bus interface, for transmitting power through the module.

An adapter module is provided in accordance with certain aspects of the disclosure for use with a modular camera system. The adapter module can be configured to connect a modular image capturing apparatus and a functional module having incompatible connections, for example. The adapter module can include a housing, for example. The adapter module of certain embodiments includes a first bus interface having a first type of electrical connection located on a first side of the housing and a second bus interface having a second type of electrical connection located on a side of the housing opposite the first side of the housing. The first type of electrical connection can be operably couplable with an electrical connection of a modular image capturing apparatus. The second type of electrical connection can be operably couplable with an electrical connection of an expansion module of the modular camera system. The adapter module can also include a first engagement interface located on the first side of the housing and a second engagement interface located on the second side of the housing. The first engagement interface can be of a first type that is configured to fasten the adapter module together with a modular image capturing apparatus. The second engagement interface can be of a second type that is configured to fasten the adapter module together with the expansion module.

In certain embodiments, the first type of electrical connection is operably couplable with the second type of electrical connection. In some other embodiments, the first type of electrical interface is not operably couplable with the second type of electrical interface. The first type of engagement interface is not configured to fasten together with the second type of engagement interface in some configurations. In certain embodiments, the first type of engagement interface is configured to fasten together with the second type of engagement interface.

According to yet another aspect of the present disclosure, a modular, convertible digital still and motion camera system is provided. The camera system can include a sensor module and can further include a plurality of functional modules each directly or indirectly releasably connectable to the sensor module. In certain embodiments, a first group of at least one of the plurality of functional modules can be directly or indirectly releasably connected to the sensor module in a first construct to produce a camera having a motion configuration. In certain embodiments, a second group of at least one of the plurality of functional modules can be directly or indirectly releasably connected to the sensor module in a second construct having a still configuration.

In certain embodiments, the sensor module is indirectly releasably connectable to at least one of the plurality of functional modules via a releasably attachable adapter module.

A variety of module configurations are possible. In certain embodiments, at least one functional module in the first group comprises a recording module. In some embodiments, at least one functional module in the first group comprises a power module. At least one functional module in the first group can comprise an in/out module, for example. In certain embodiments, at least one functional module in the second group comprises a handle module. The handle module can include a power source, for example. In some embodiments the second construct is a DSLR configuration. The first construct can be Studio configuration or an ENG configuration in various embodiments.

In some embodiments, at least one of the functional modules in the first group is different from at least one of the functional modules in the second group. In certain embodiments, the first group comprises at least two functional modules daisy chained together when assembled in the first construct.

According to another aspect of the present disclosure, a method of distributing power in a modular camera system is provided. The method can include detecting, by at least one processor of a sensor module of a modular camera system, the presence of one or more available first power sources associated with one or more of a plurality of functional modules. Each of the plurality of functional module can be directly or indirectly attached to the sensor module, for example. A power bus extends between the sensor module and each of the plurality of functional modules in certain embodiments. In certain embodiments, the method can further include receiving, at the sensor module and over the input power bus, a first input power signal from one of the one or more available first power sources. The method can also include transmitting over the power bus, an output power signal to the plurality of functional modules for consumption by electronics of the plurality of functional modules. In certain embodiments, the method comprises communicating to each of the one or more functional modules associated with the one or more available first power sources, which of the available first power sources should be placed on power bus.

In some embodiments, the one or more available first power sources comprise a plurality of power sources associated with a single functional module. In one embodiment, the single functional module comprises a quad battery pack. The available first power sources comprise power sources can be associated with a plurality of functional modules, for example. In certain embodiments, the method further comprises selecting the output power signal from one of the first input power signal and one or more second input power signals associated with a corresponding one or more available second power sources. In some embodiments, the one or more available second power sources comprise an external power source connectable to camera system via an input port of the sensor module. In yet other embodiments, the one or more available second power sources comprise a battery housed in a handle assembly releasably connectable to the sensor module.

According to another aspect of the present disclosure, a modular cellular phone is provided that includes a camera module comprising a camera housing, a battery within the camera housing, and a camera electrical connector on a first side of the camera housing. The modular cellular phone also includes a battery module comprising a battery housing, a battery within the battery housing, a first battery electrical connector on a first side of the battery housing, and a second battery electrical connector on a side surface opposite the first side of the battery housing. The modular cellular phone also includes a phone module comprising a phone housing, a battery within the phone housing, a display on a first side of the camera housing, and a phone electrical connector on a second side of the camera housing. The camera module is releasably mechanically attached to the battery module such that the camera electrical connector is electrically coupled to the first battery electrical connector. The phone module is releasably mechanically attached to the battery module such that the phone electrical connector is electrically coupled to the second battery electrical connector. Video data acquired with the camera module is transmitted to the phone module through the battery module across a system bus formed by the electrical connections between the camera module, the battery module, and the phone module.

In some embodiments, the camera module further comprises an optical module interface on a second side of the camera housing, the second side opposite the first side. In further embodiments, the modular cellular phone includes an optical module releasably mechanically coupled to the camera module at the optical module interface.

In some embodiments, the battery module charges the battery of the camera module, the battery of the phone module, or both the battery of the camera module and the battery of the phone module. In some embodiments, the camera module is configured to operate in an independent mode and a modular mode, the independent mode corresponding to use of the camera module when decoupled from the modular cellular phone and the modular mode corresponding to use of the camera module when coupled to the modular cellular phone. In some embodiments, the phone module is configured to operate in an independent mode and a modular mode, the independent mode corresponding to use of the phone module when decoupled from the modular cellular phone and the modular mode corresponding to use of the phone module when coupled to the modular cellular phone.

In some embodiments, the video data comprises a resolution of at least 2 k and a frame rate of at least 23 frames per second. In further embodiments, the video data is transmitted through the system bus in real time.

According to another aspect of the present disclosure, a modular cellular phone that includes a camera module comprising a camera housing and a camera electrical connector on a first side of the camera housing. The modular cellular phone also includes a battery module comprising a battery housing, a battery within the battery housing, a first battery electrical connector on a first side of the battery housing, and a second battery electrical connector on a side surface opposite the first side of the battery housing. The modular cellular phone also includes a phone module comprising a phone housing, a display on a first side of the camera housing, and a phone electrical connector on a second side of the camera housing. The camera module is releasably mechanically attached to the battery module such that the camera electrical connector is electrically coupled to the first battery electrical connector. The phone module is releasably mechanically attached to the battery module such that the phone electrical connector is electrically coupled to the second battery electrical connector. The video data acquired with the camera module is transmitted in real time to the phone module through the battery module across a system bus formed by the electrical connections between the camera module, the battery module, and the phone module. The video data comprises a resolution of at least 2 k and a frame rate of at least 23 frames per second.

In some embodiments, the camera module further comprises an optical module interface on a second side of the camera housing, the second side opposite the first side. In further embodiments, the modular cellular phone also includes an optical module releasably mechanically coupled to the camera module at the optical module interface.

In some embodiments, the camera module further comprises camera data storage and the phone module further comprises phone data storage. In further embodiments, the camera module is configured to acquire video data and to store the acquired video data on the camera data storage at a first resolution and frame rate and the phone module is configured to store the acquired video data on the phone data storage at a second resolution and frame rate. In further embodiments, the camera data storage comprises removable flash memory and the phone data storage comprises removable flash memory.

BRIEF DESCRIPTION OF THE DRAWINGS

FIG. 1C shows a lens, lens mount module, and brain module of the camera system of FIG. 1 in a disassembled configuration.

DETAILED DESCRIPTION

Figure 1A:
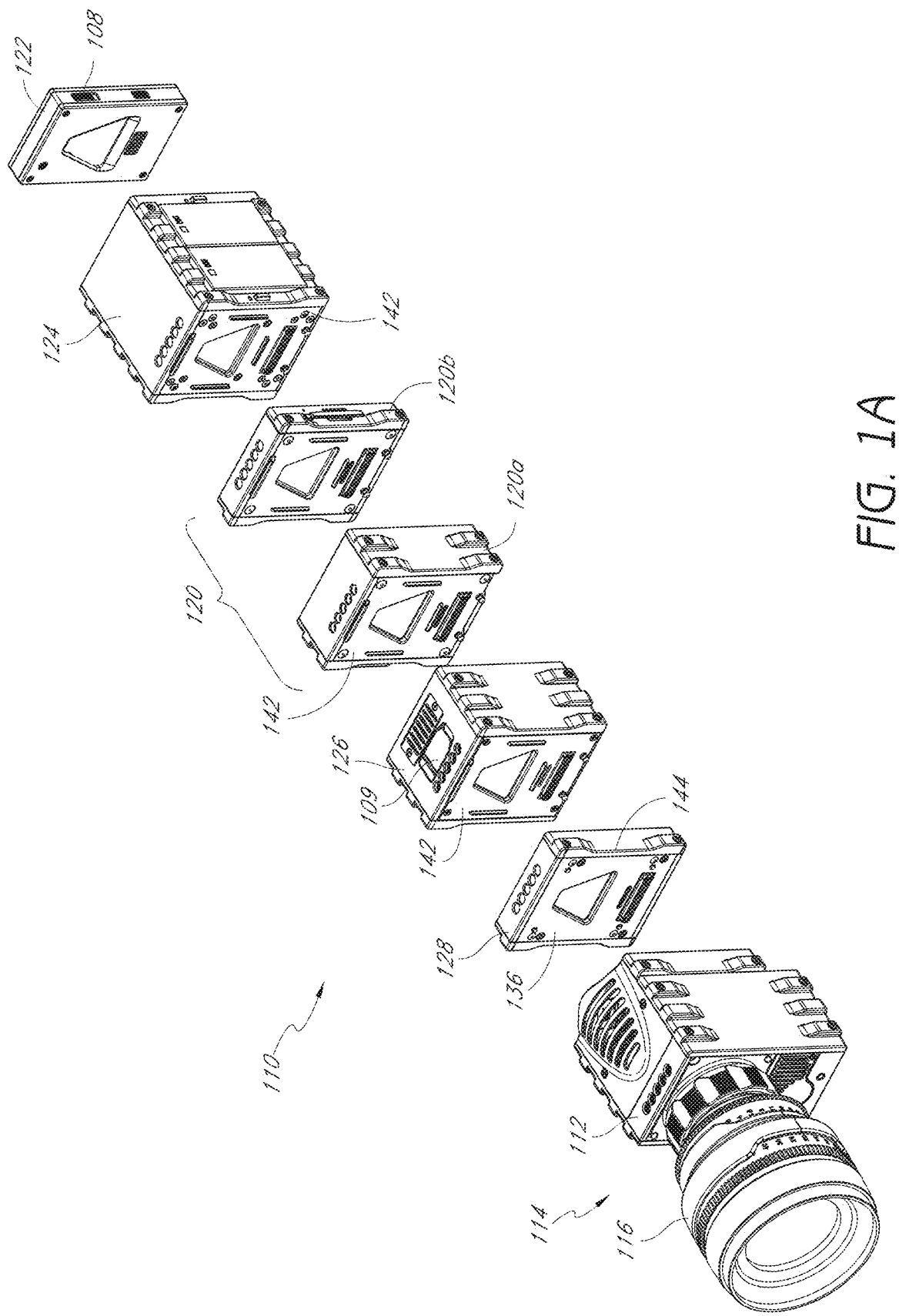
FIGS. 1A-B are perspective exploded views of one configuration of a modular camera system in accordance with embodiments described herein.

Various embodiments will be described hereinafter with reference to the accompanying drawings. These embodiments are illustrated and described by example only, and are not intended to be limiting.

System Overview

Referring to FIG. 1, there is schematically illustrated a modular camera system 10 in accordance with the present disclosure. Although the camera system will be primarily described herein as a motion camera system, it is to be understood that the principals of the present disclosure are applicable to digital still cameras, digital video cameras as well as digital still and motion cameras (DSMC).

In addition, the description herein will be primarily directed to the physical electronics and optical modules of the present camera systems. However, additional modules, components and accessories are also contemplated in the systems of the present disclosure. These include, for example, any or combinations of lenses; lens mounts; stabilization modules or features; neutral density filters and modules containing neutral density filters; brain modules with or without separate electronics modules; user interface modules; input/output modules; various system bus configurations; recording modules; various displays such as LCD displays; cooling units; electronic view finders, optical view finders and handles.

The camera of the present disclosure may also be provided with or compatible with rails, rods, shoulder mounts, tripod mounts, helicopter mounts, matte boxes, follow focus controls, zoom controls, and other features and accessories known in the art.

The pre-calibrated, modular aspect of camera systems provided herein enables a user to construct a modular camera in a variety of configurations. For example, a first brain module may have a first, smaller sensor size. When a larger sensor, recording area, recording speed or the like is desired, the user may uncouple various other functional modules described herein from the brain module with the first sensor size, and reassemble the modular system using a second brain module having a second, larger sensor size. All of the reassembled modules with the second brain module can be automatically calibrated for seamless functioning without the need for extra calibration or adjustment steps. This allows the user to upgrade the sensor or other brain components without the need to purchase a new camera or camera system.

The same exchange/upgrade capability exists with respect to each of the modules in the system of the present disclosure. Thus, the particular technologies used in the various modules are deemphasized in importance compared to some of the prior art systems, since the modules may be simply removed and replaced as upgraded technology becomes available. Moreover, the camera system 110 can be configured in a variety of constructs that can be tailored for specific uses by swapping and/or rearranging the modules surrounding the brain module 112 or by swapping the brain module 112 itself for another brain module. For example, the camera system 110 of certain embodiments can be configured for use in a first construct suited for still shooting (e.g., a DSLR construct), and a second construct configured for motion shooting (e.g., a studio or ENG construct). As another example, in further configurations the system can be configured in a studio construct for studio use and portable construct for portable use. Users can generally select from a wide variety of different constructs depending on the particular application. Moreover, the same modules, combinations or sub-combinations of modules can be used across the various constructs, allowing a user to shoot in a variety of contexts without needing to purchase context or application specific cameras. For example, the camera system 110 according to various embodiments can be custom-configured an array of constructs including, without limitation, still, motion, portable, studio, mounted, handheld, professional, and consumer constructs, or any subset thereof.

The modular camera system 110 includes a sensor and electronics (or brain) module 112 and lens 116. The module camera system 110 can also include and is configured to be functionally engageable with one or more optional modules including at least one recording modules 120, at least one user interface module 122, at least one power module 124, at least one input/output module 126, and an adapter module 128. In some embodiments, the system 110 may include more than one of each type of module, may not include one or more of the modules shown with respect to FIG. 1. Additionally, the system 110 may include a wide variety of other types of modules not present in FIG. 1.

Brain Module

The image sensor contained within the brain module 112 may comprise any of a variety of video sensing devices, including, for example, CCD, CMOS, vertically stacked CMOS devices such as the FOVEON® sensor, or a multi-sensor array using a prism to divide light between the sensors. In some embodiments, the image sensor can include a CMOS device having about 12 million photocells. However, other size sensors or sensor technologies can also be used.

In some configurations, the camera can be configured to output video at "2 k" (e.g., 16:9 (2048×1152 pixels), 2:1 (2048×1024 pixels), etc.), "3 k" (e.g., 16:9 (3072×1728 pixels), 2:1 (3072×1536 pixels), etc.), "4 k" (e.g., 4,096×2, 540 pixels, 16:9 (4096×2304 pixels), 2:1 (4096×2048), etc.), "4.5 k" horizontal resolution, Quad HD (e.g., 3840×2160 pixels), "5 k" (e.g., 5120×2700) horizontal resolution, "6 k" (e.g., 6144×3160), "8 k" (e.g., 7680×4320), or greater resolutions. As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels.

The sensor can range from as small as about 0.5" (8 mm), ⅔", S35 (cine), 35 mm full frame still and 645, but it can be at least about 1.0 inches, 6 cm×17 cm or larger. In one series of brain modules, sensors are contemplated having sizes of at least about 10.1×5.35 mm; 24.4×13.7 mm; 30×15 mm; 36×24 mm; 56×42 mm and 186×56 mm. Additionally, the image sensor can be configured to provide variable resolution by selectively outputting only a predetermined portion of the sensor. For example, the sensor and/or the image processing module can be configured to allow a user to identify the resolution of the image data output.

The brain module 112 of certain embodiments may be referred to as the "brain" of the camera system 110 for example. Thus, as described herein, users can select different brain modules 112 or "brains" around which they can build camera systems having a multitude of possible configurations.

The camera can also be configured to scale down the resolution, such as by down-sampling and subsequently processing the output of the sensor to yield video output at 2K, 1080p, 720p, or any other resolution. For example, the image data from the sensor can be "windowed", thereby reducing the size of the output image and allowing for higher readout speeds. Alternatively, brain modules having different sensor sizes may be exchanged depending upon the desired effect. Additionally, the camera can be configured to up-sample the output of the sensor to yield video output at higher resolutions. In some embodiments, the sensor can include a Bayer pattern filter. As such, the sensor, by way of its chipset (not shown) outputs data representing magnitudes of red, green, or blue light detected by individual photocells of the image sensor. Any of a variety of sensor sizes or other sensor characteristics may be utilized in the modular camera system of the present disclosure.

The electronics contained in the sensor and electronics module 112 are digital signal processing electronics for processing image data captured by the sensor. The brain module may be configured to deliver any of a variety of desired performance characteristics. For example, light received by the sensor may be converted into raw digital image data at a rate of at least about 23 frames per second (fps), wherein the raw data is compressed and recorded at a rate of at least about 23 (fps) into the recording module 120. In various embodiments, frame rates of from about 1 fps to about 250 fps or more can be achieved. For example, the frame rate may depend on the resolution setting. In some embodiments, the camera 110 is configured for frame rates of from between about 1 fps and about 100 fps in a "5 k" resolution mode, from about 1 and about 125 fps in a "4 k" resolution mode, from about 1 and about 125 fps in a quad HD mode, from about 1 and about 160 fps in a "3 k" resolution mode, and from about 1 and about 250 fps in a "2 k" resolution mode. Possible frame rates include, e.g., frame rates of greater than 12, as well as frame rates of 20, 23.976, 24, 30, 60, and 120 frames per second, or other frame rates between these frame rates or greater. The camera 110 can include a separate compression module, or the compression electronics can be carried within the brain module 112. The compression electronics can be in the form of a separate chip or it can be implemented with software and another processor. General purpose processors, DSPs, custom chips, or processors specialized for image processing may be used. For example, the compression electronics can be in the form of a commercially available compression chip that performs a compression technique in accordance with the JPEG 2000 standard, or other compression techniques.

In some embodiments, the compression module could use a custom ASIC or FPGA or one of many commercially available compression chips or chipsets. The compression module may include subcomponents to allow parallel compression of image data. For example, the compression module may use a first processor or compression chip to compress picture elements corresponding to a first wavelength, and a second processor or compression chip to compress picture elements corresponding to a second wavelength.

In some embodiments, the compression module comprises one or more JPEG 2000 compression chips. In some embodiments, the compression module comprises one or more ADV202 or ADV212 JPEG 2000 Video Codec chips available from Analog Devices. In some embodiments, the compression module comprises one or more QuVIS Digital Mastering Codecs available from QuVIS, Inc. In some embodiments, the compression module comprises one or more RB5C635 JPEG 2000 Coders available from Ricoh.

The brain module 112 can be configured to perform many types of compression processes on the data from the sensor. In some embodiments, the brain module 112 performs a compression technique that takes advantage of the techniques performed by the image processing system. For example, the image processing system can be configured to reduce the magnitude of the values of the red and blue data by subtracting the magnitudes of green image data, thereby resulting in a greater number of zero values, as well as other effects. Additionally, the image processing system can perform a manipulation of raw data that uses the entropy of the image data. Thus, the compression technique performed by the brain module 112 can be of a type that benefits from the presence of larger strings of zeros to reduce the size of the compressed data output therefrom.

Further, the brain module 112 can be configured to compress the image data from the sensor to result in a visually lossless output. The brain module 112 can be configured to apply any known compression technique, such as, but without limitation, JPEG 2000, MotionJPEG, any DCT based codec, any codec designed for compressing RGB image data, H.264, MPEG4, Huffman, or other techniques. Moreover, as with the other modular components in the system, the modularity of the brain module 112 allows for other compression and/or processing techniques to be incorporated as technology develops and new techniques emerge.

Depending on the type of compression technique used, the various parameters of the compression technique can be set to provide a visually lossless output. For example, many of the compression techniques noted above can be adjusted to different compression rates, wherein when decompressed, the resulting image is better quality for lower compression rates and lower quality for higher compression rates. Thus, the compression capability can be configured to compress the image data in a way that provides a visually lossless output, or can be configured to allow a user to adjust various parameters to obtain a visually lossless output. For example, the brain module 112 can be configured to compress the image data at a compression ratio of about 6:1, 7:1, 8:1 or greater. In some embodiments, the brain module 112 can be configured to compress the image data to a ratio of 12:1 or higher. In some embodiments, the brain module 112 achieves compression ratios of about 2:1, 3:1, 4:1 or 5:1.

Additionally, the brain module 112 can be configured to allow a user to adjust the compression ratio. For example, the camera 110 can include a user interface such as on a user interface module 122 that allows a user to input commands that cause the brain module 112 to change the compression ratio. Thus, in some embodiments, the camera 110 can provide for variable compression.

As used herein, the term "visually lossless" is intended to include output that, when compared side by side with original (never compressed) image data on the same display device, one of ordinary skill in the art would not be able to determine which image is the original with a reasonable degree of accuracy, based only on a non-magnified visual inspection of the images. Additional aspects of the preferred compressed raw onboard image data handling capabilities are disclosed in U.S. patent application Ser. No. 12/101,882, filed Apr. 11, 2008, entitled Video Camera, to Jannard et al., the entirety of which is hereby incorporated by reference herein.

In addition to the connectors provided on the expansion interface 138, the brain module 112 of some embodiments includes various inputs and/or outputs. For example, referring to FIG. 1B, in one embodiment, the brain module 112 includes various connectors 101 for providing data input and/or output. In various embodiments, such connectors 101 include one or more video (e.g., HDMI, BNC), audio in and out, data and/or or power connectors. In some embodiments, the brain module 112 includes one or more controls such as the power button 102.

In some embodiments, various components internal to the brain module 112 can be removable. Such components can include, for example, filters (e.g., an optical low pass filter (OLPF), cable connectors, etc. In one embodiment, the sensor is removable from the brain module 112 and can be replaced with a different sensor.

Lens Mount Module

Referring to FIG. 1C, the brain module 112 of certain embodiments is provided with a lens mount module interface 113 for releasably connecting to a complementary brain module interface 115 on a lens mount module 114. FIG. 1C shows a lens mount module 114 of the camera system 110 in a disassembled configuration. The lens mount module 114 is provided with a lens interface 117 for releasable connection to a complementary interface 134 on a lens 116.

For example, a user may releasably connect the lens mount module 114 to the camera system 110 using a plurality of mounting bolts 121. In other embodiments, the lens mount module 114 and corresponding portion of the lens mount module interface 113 include other mounting mechanisms such as snap- or friction-fit mechanisms, threaded mounts, etc.

The lens mount module interface 113 of the brain module 112 includes an electrical interface such as an electrical connector 103 in certain embodiments. The electrical interface connects to a corresponding electrical interface (not shown) on the brain module interface 115 of the lens mount module 114. The electrical interfaces may comprise a variety of electrical connection types and allow for communication between the brain module and one or more of the mount module 114 and the lens 116, for example. In one embodiment, the electrical interfaces allow the brain module 112 to communicate drive signals to the lens 116 for automatically focusing the lens 116.

In some embodiments, the lens interface 117 includes a locking ring 118 and an interior surface 119 defining an opening for receiving the lens 116. The locking ring 118 is tightened by a user following insertion of the lens 116 into the opening, locking the lens 116 into place, although a variety of mechanisms for fastening the lens 116 into place are possible.

The modular camera system 110 is preferably configured to cooperate with any of a variety of commercially available lens systems from a variety of lens manufacturers. Thus, a plurality of lens mount modules 114 may be provided, each having a brain module interface for releasable connection to the brain module 112, and each having a unique lens interface such as RED-PL Mount RED Mini PL Mount, (Red Digital Cinema Camera Company); PL Mount; Canon Mount; Nikon Mount; Medium Format Mount; Mamiya Mount; RED 617 Mount; Linhof Mount; or Alpa Mount.

The lens mount interface on lens mount module 114 is preferably also configured to receive any of a plurality of different types of lens systems from the same lens mount type for example, but without limitation, various sizes of lens systems including a 50-100 millimeter (T3) zoom lens, a 50-150 millimeter (T3) zoom lens, an 18-50 millimeter (T3) zoom lens, an 18-85 millimeter (T2.9) zoom lens, a 300 millimeter (T2.8) lens, 18 millimeter (T2.9) lens, 25 millimeter (T1.8) lens, 35 millimeter (T1.8) lens, 50 millimeter (T1.8) lens, 85 millimeter (T1.8) lens, 85 millimeter (T1.8)

lens, 100 millimeter (T1.8) and/or any other lens. In certain embodiments, a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter and/or (F1.9) lens may be used. Each lens mount module is customized to a corresponding lens or lenses such that despite which complementary lens mount module—lens assembly is attached thereto, images can be properly focused upon a light-sensitive surface of the image sensor in brain module 112.

The focal distance of the modular camera system is the linear distance along the optical path between the lens mount module lens interface and the sensor surface. This includes the sum of the back focal distance within the brain module, and the focal distance of the lens mount module. A plurality of lens mount modules may be provided, for cooperating with the modular camera system, each lens mount configured to attach a commercially available lens onto the modular camera system of the present disclosure. Lens mount modules in accordance with the present disclosure will have focal lengths such that the total focal length of the complementary lens mount module and brain module is about 17 mm, 35 mm, 46 mm, 48 mm, 52 mm, or other desired focal length. Preferably, the back focal length of the sensor module is no more than about 16 mm, in some embodiments no more than about 14, and, in one embodiment, is about 12 mm.

As discussed, the pre-calibrated, modular aspect of the camera system of the present disclosure enables a user to construct a modular camera with, for example, a first brain module having a first, smaller sensor size. When a larger sensor is desired, the user may uncouple the lens mount module and the electronics modules from the brain module with the first sensor size, and reassemble the modular system using a second brain module having a second, larger sensor size. All of the reassembled modules with the second brain module are automatically calibrated for seamless functioning without the need for extra calibration or adjustment steps. This allows the user to upgrade the sensor without the need to purchase a new camera or camera system. The same exchange/upgrade capability exists with respect to each of the modules in the system.

The system may further include a focus calibration apparatus which allows fine adjustments to be made to the focal distance between the camera lens 116 and the sensor, in particular to take into account small changes in the mechanical tolerances when changing lenses, or focal length changes due to factors such as temperature changes. Such a calibration apparatus can have a relatively straightforward control, like a focus ring, that a user can easily manipulate to simplify and speed the lens calibration process.

In some embodiments, the focus calibration apparatus or portions thereof may be included in the lens mount module 114, the sensor module 112, or a combination thereof. In one embodiment, the entire calibration apparatus is included in the lens mount module 114. For example, the focus calibration apparatus of some embodiments allows controlled adjustment of the length along the optical path between the sensor and the lens of about 0.002 inches or less, in some embodiments about 0.001 inches or less, and, in some embodiments of about 0.0005 inches or less. Adjustment may be on a continuous basis, or in a stepped function. Examples of focus calibration apparatus that can be used with the camera systems described herein can be found in U.S. patent application Ser. No. 12/625,451 (the '451 application), filed on Nov. 24, 2009, which is incorporated by reference in its entirety herein.

Additionally, the expansion modules of the modular camera systems disclosed herein may be connected in any order to each other, and/or to the brain module. This functionality is illustrated with respect to FIG. 2, which is a schematic representation of a camera system 200 including various modules. The modular camera system 210 includes a sensor and electronics module 212, lens 216, and various expansion modules including a recording module 220, user interface module 222, power module 224, input/output module 226, and optional adapter module 228.

As illustrated by the dotted lines, the various modules can be connected to each other and to the brain module 212 in generally any order. The camera system 200 can further include a lens mount module 214. Still referring to FIG. 2, an optional image stabilization module 218 may be provided, to enable image stabilization as is understood in the art. In one implementation, the image stabilization module 218 is configured for connection in between the brain module 212 and the lens mount module 214.

Figure 1B:
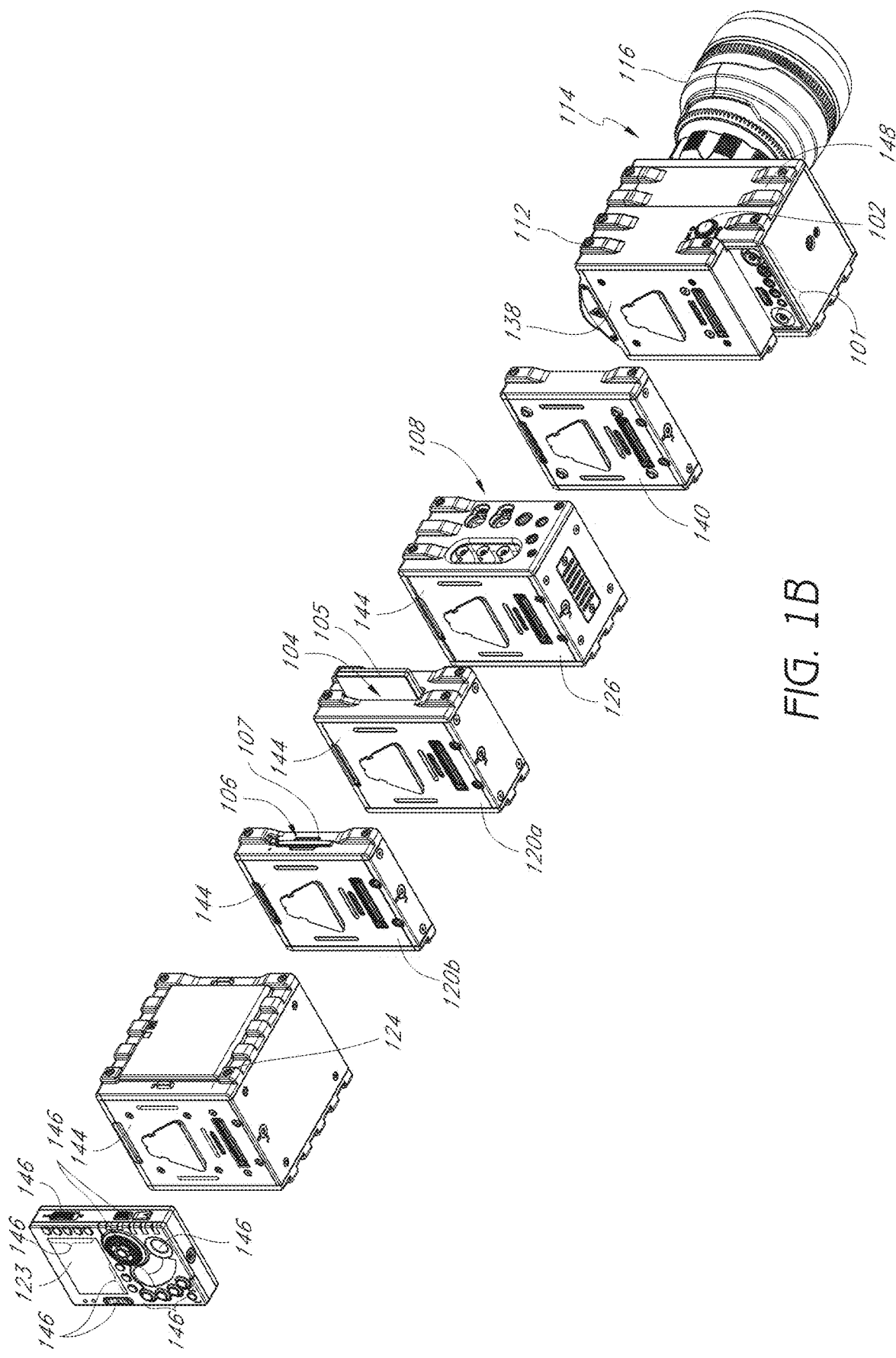
Figure 2:
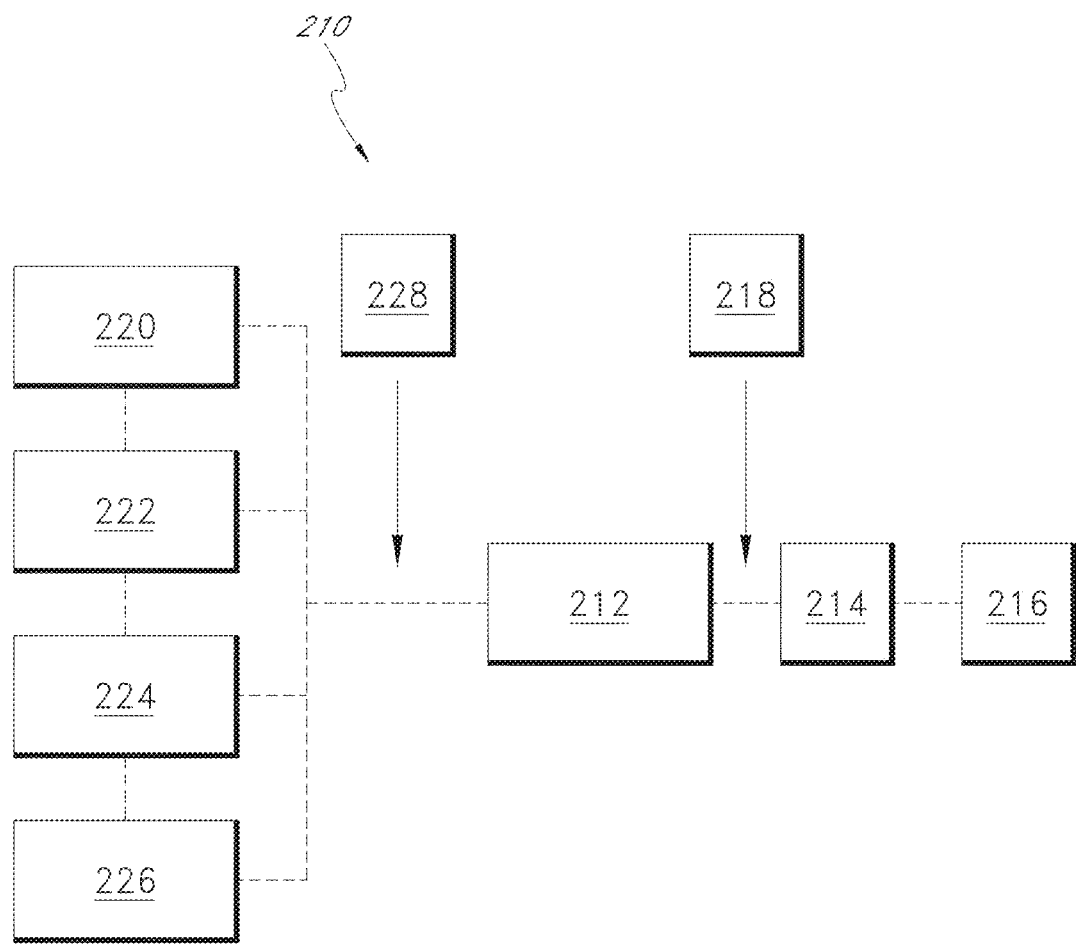
FIG. 2 is a schematic representation of various modules in the modular camera system in accordance with embodiments described herein.

In various embodiments, the modules of the camera system 210 of FIG. 2, including the brain module 212, recording module 220, user interface module 222, power module 224, input/output module 226 and adapter module 228 may be generally similar to or the same as the corresponding modules of the camera system 110 of FIG. 1. Alternatively, one or more of the modules of the camera system 210 of FIG. 2 are different from the modules of the camera system 110 of FIG. 1 in other embodiments. For instance, as described and shown with respect to FIGS. 13A-17B, the camera system 210 can be a modular cellular phone or other wireless mobile device (e.g., a tablet), which can include an additional module having phone electronics, and wherein the various modules can have a plate-like shape or other suitable form-factor.

Adapter Module

Referring again to FIGS. 1A-B, compatible brain modules may have a variety of physical dimensions, mechanical connection types and/or electrical connection types. On the other hand, various other modules in the system have a generally common interface type, allowing them to be connected to each other or stacked in any sequence, as described herein.

The adapter module 128 in certain embodiments which enables connection between the brain module and the common interfaces included on the other modules, allowing a variety of sensors modules having a variety of interface types to be modularly expanded. The optional adapter module 128 provides an interface between the brain module 112 and various expansion modules (e.g., the recording module 120, user interface module 122, power module 124 and/or input/output module 126) of the camera system 110. The adapter module 128 may be referred to interchangeably herein as an adapter module 128 and adapter plate 128.

For example, the adapter module 128 in some embodiments provides mechanical translation between the brain module 112 and various other modules having a different mechanical interface. In some embodiments, the adapter module 128 provides electrical translation between the electrical interface of brain module 112 and electrical interfaces of various other modules in the system 110.

The brain module 112 includes an expansion interface 138, and the expansion modules including the input/output module 126, recording modules 120 and power module 124 include a first interface 142 which is common to each of those modules. In some configurations, the brain module 112 may include one or more additional expansion interfaces 138, such as on a side of the brain module 112, for example.

The expansion interface 138 of the brain module 112 may not be mechanically, electrically, or otherwise compatible with the first interface 142 of the expansion modules in certain configurations. For example, the expansion interface 138 does not mechanically cooperate with the first interface 142. To address this incompatibility, the adapter module 128 includes a brain module interface 136 configured to cooperate with the expansion interface 138 on the brain module 112, and a module interface 140 configured to cooperate with the first interface 142 common to certain expansion modules of the camera system 110. Thus, the adapter module 128 allows for cooperation between the brain module 112 and the expansion modules including, for example, one or more of the input/output module 126, recording modules 120, power module 124, and other modules.

Figure 3A:
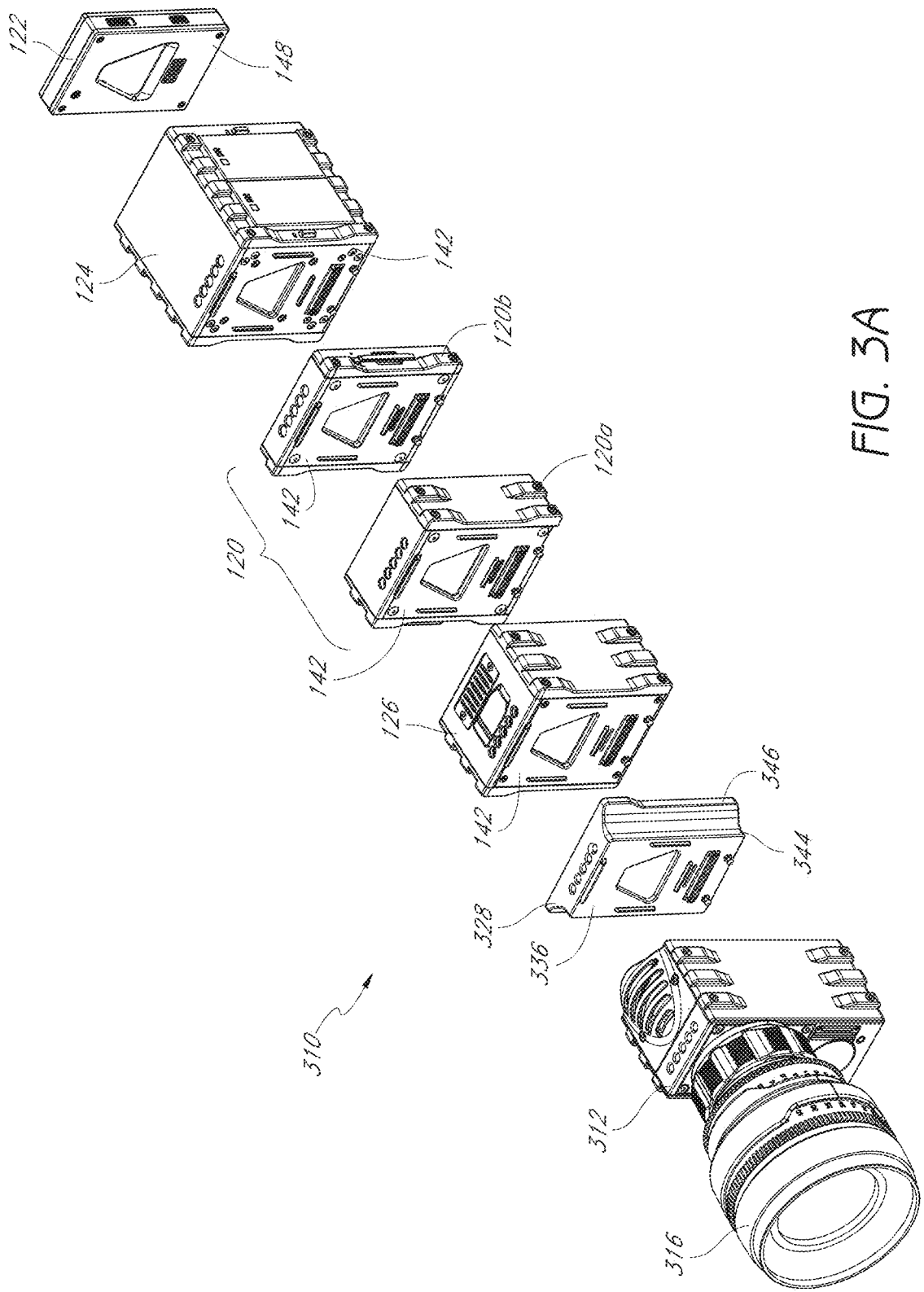
FIGS. 3A-B are perspective exploded views of another configuration of a modular camera system in accordance with embodiments described herein.
Figure 3B:
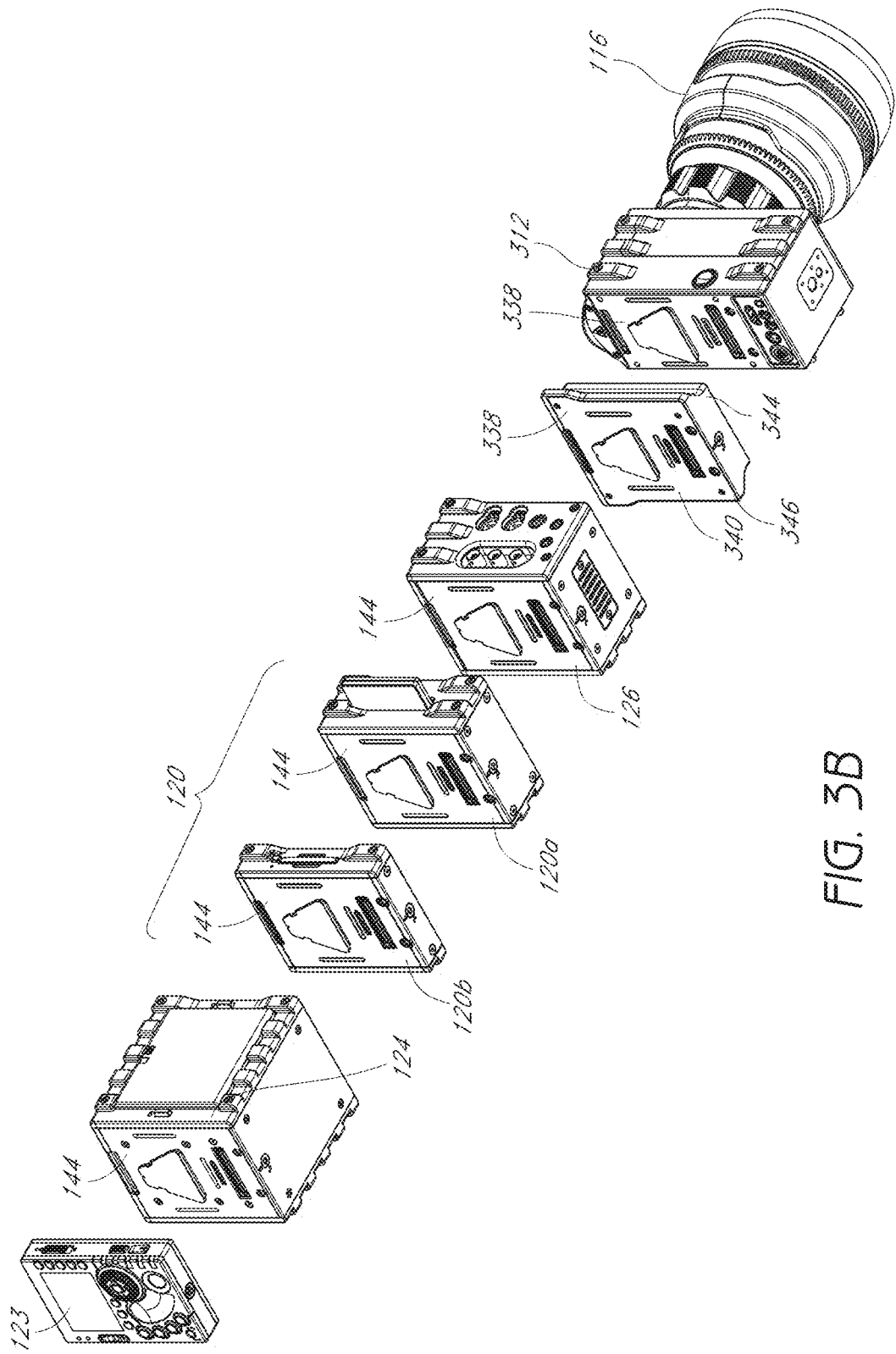

As described, adapter modules may be designed for use with a variety of brain modules. For example, in some embodiments a first adapter module is designed for use with a first brain module, and a second adapter module is designed for use with a second brain module. FIGS. 3A-B are front and rear perspective exploded views of another configuration of a modular camera system 310 including a brain module 312 which is different from the brain module 112 of FIG. 1. The modular camera system 310 also includes a lens 316 and adapter module 328. The modular camera system 310 can also include various modules, including the recording modules 120, user interface module 122, power module 124, and input/output module 126 of FIG. 1, for example.

As shown, the brain module 312 of FIG. 3 is narrower than the expansion modules 120, 124, 126. Thus, the adapter module 328 includes a narrow portion 344 terminating in a first interface 336 configured to cooperate with the interface 338 on the brain module 312. The adapter module 328 further includes a wider portion 346 having a width similar to that of the expansion modules 120, 124, 126. The wider portion 346 terminates in a second interface 340 configured to cooperate with the first interface 142 of the expansion modules 120, 124, 126.

Thus, the adapter module 128 of the camera system 110 of FIG. 1 is designed for use with a first brain module 112, and a second adapter module 328 of FIG. 3 is designed for use with a second brain module 312. Accordingly, a variety of adapter modules may be provided, each having an interface for releasable connection to a common expansion module interface and to a unique brain module interface.

Depending on the type of brain module interface, various adapter module configurations are possible. For example, adapter modules designed for use with brain modules having various physical characteristics may be provided, such as adapter modules for use with relatively wide, tall, or irregularly shaped brain modules. In some embodiments, the adapter module is designed to interface with a brain module having an electrical connection type that is different from the electrical connection type of the expansion modules.

In various embodiments, one or more of the modules may be directly releasably connectable and otherwise compatible with the interface on the brain module without using the adapter module. For example, the user interface module 122 can include an interface 148 releasably engageable with the expansion interface 138 of the brain module 112 of FIG. 1 and the interface 338 of the brain module 312 of FIG. 3. In such embodiments, the user interface module 122 may also be releasably engageable with the module interface 140 of the adapter module 128 of FIG. 1 and/or the interface 340 of the adapter module 328 of FIG. 3.

In some embodiments, no adapter module 128 is included, and the brain module 112 is adapted to cooperate with the first interface 142 of the expansion modules (e.g., recording module 120, power module 124, and/or input/output module 126) of the camera system 110.

Expansion Modules

Referring again to FIGS. 1A-B, the expansion modules of the modular camera system 110 may be connected in any order to each other, and/or to the brain module 112. Modules for use with the camera system of the present disclosure include, but are not limited to, at least one recording module 120, at least one user interface module 122, at least one power module 124 and at least one input/output module 126. The expansion modules are referred to interchangeably herein as functional modules, expansion modules and modules.

The at least one recording module 120 of some embodiments includes a first recording module 120a and a second recording module 120b. In one embodiment, the first recording module 120a comprises a solid state disk ("SSD") and the second module 120b includes a CF memory card. In various configurations, generally any compatible storage technology may be used. For example, the recording modules 120 may include any of a variety of memory technologies, such as hard drives, spinning drives, flash memory, solid state drives, RAID drives, optical discs, or others that may be developed in the art. As with other modules in the present system, the particular media used in the current module is deemphasized in importance compared to some of the prior art systems, since the module may be simply removed and replaced as upgraded technology becomes available. While the camera system 110 shows a set of two recording modules 120a, 120b, only one recording module, or more than two recording modules may be used depending on the application.

In some embodiments, the recording module 120 storage medium or a portion thereof is not integrated into the housing of the recording module 120. In such embodiments, the recording module 120 can be configured to releasably receive one or more memory devices. For example, referring to FIG. 1B, the first recording module 120a of one embodiment includes a drive bay 104 for receiving one or more solid state hard drives 105. In one embodiment, the second recording module 120b includes a slot 106 for releasably receiving a CF card 107. In other embodiments, generally any type of storage medium and corresponding receiving mechanisms can be used.

In some embodiments, the size of the storage device can be sufficiently large to store image data from the compression circuitry corresponding to at least about 30 minutes of video at 12 mega pixel resolution, 12-bit color resolution, and at 60 frames per second. However, the storage device can have any desired size. In one implementation of the disclosure, recording module 20 includes one or two or more 2.5" 160 GB laptop hard drives arranged in a hardware-based RAID.

In some embodiments, the recording module can be mounted on an exterior of the modular camera. Secondary storage devices can be carried by additional recording modules, attached to or external to the camera. The storage device can be connected to the other components through standard or custom communication ports, including, for example, but without limitation, Ethernet, USB, USB2, USB3, IEEE 1394 (including but not limited to FireWire 400, FireWire 800, FireWire S3200, FireWire S800T, i.LINK, DV), SATA and SCSI. Further, in some embodiments, the storage device can comprise a plurality of hard drives, such as those operating under a RAID protocol. However, any type of storage device can be used.

Referring to FIG. 1B, the user interface 122 includes any of a variety of standard user interface features, such as a viewing screen 123 for viewing sampled images and controls 146 for operating the camera. The screen 123 may be a touch screen, with integrated controls 146, or separate controls 146 such as knobs, keypads and the like may be used. The controls 146 can provide a variety of functions including, for example, toggling the camera between motion and still modes, entering a record mode, operating one or more of the displays or other components of the camera system 110, and the like. The user interface module 122 can switch the camera into a DSLR mode in some embodiments, for example.

In some embodiments, the user interface 122 and/or the brain module 112 can include a subsampling system configured to output reduced resolution image data to the monitor on user interface module 122. For example, such a subsampling system can be configured to output video image data to support 2K, 1080p, 720p, or any other resolution. In some embodiments, filters used for demosaicing can be adapted to also perform down-sampling filtering, such that down-sampling and filtering can be performed at the same time. The brain module 112 can be configured to perform any type of demosaicing process to the data from the sensor. Thereafter, demosaiced image data can be displayed on the monitor.

Figure 12:
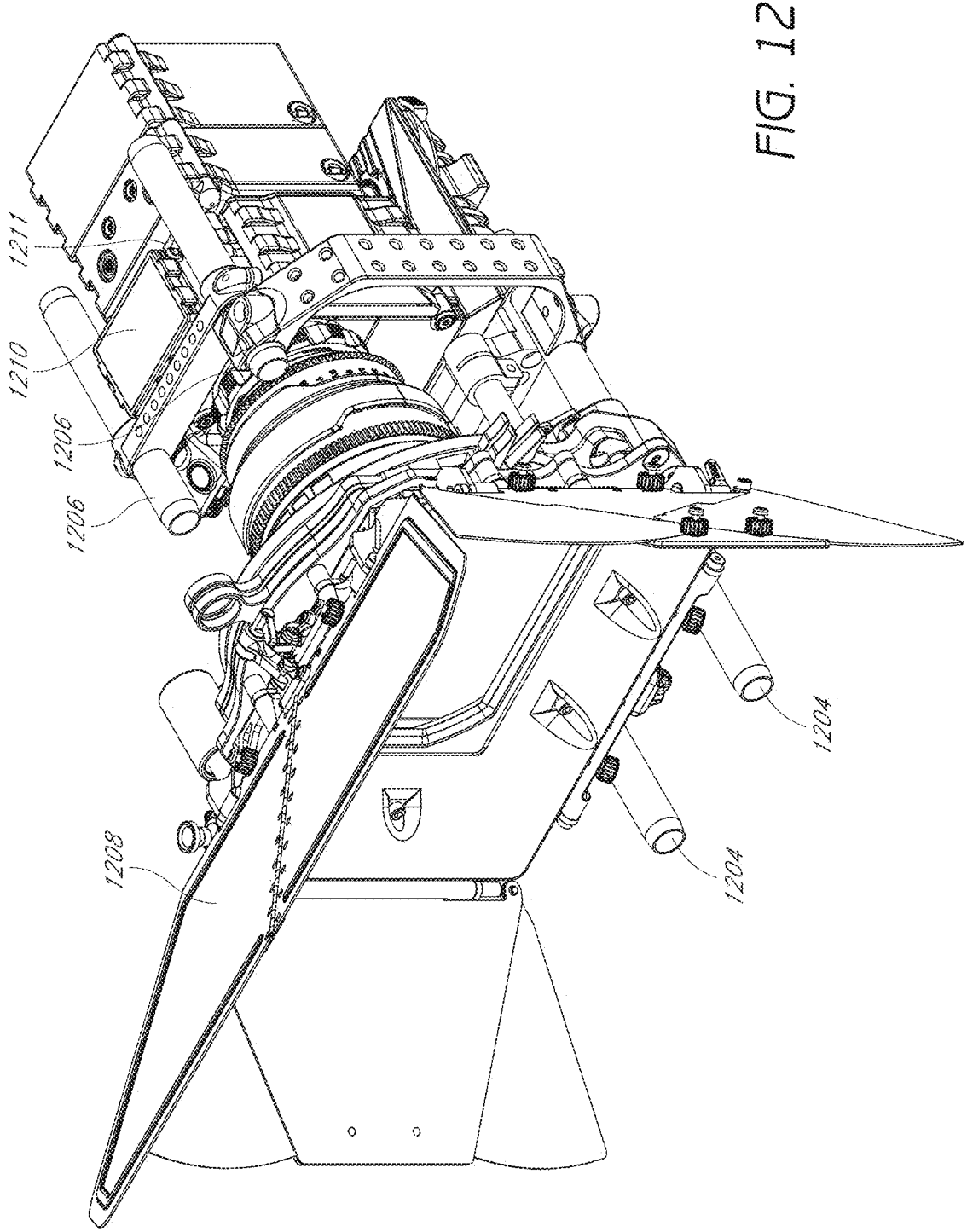

The display 123 on user interface module 122 can include any type of monitoring device. For example, but without limitation, the display can be a four-inch LCD panel supported by the user interface 122. In certain embodiments, the camera 110 includes a separate display instead of, or in addition to the display 123 incorporated in the user interface module 122. In various other embodiments, the display is a 2.8, 5, 7 or 9 inch LCD panel. In some embodiments, the display can be connected to an infinitely adjustable mount configured to allow the display to be adjusted to any position relative to the housing of the user interface module 122 and the camera system 110 so that a user can view the display at any angle relative to the camera 110. In some embodiments, the display can be connected to the monitor module through any type of video cables such as, for example, an RGB or YCC format video cable. FIG. 12 described below includes an example camera configuration including a separate display with an adjustable viewing angle.

Preferably, the user interface 122 includes a wireless transceiver, for wireless communication with the brain module 112. In one embodiment, the user interface 122 is configured to communicate with the brain module 112 when the user interface 122 is within a certain distance (e.g., 100 feet) of the brain module 112. This is in parallel with a hard-wired bus within the user interface 122, for connection physically into the system, as will be discussed. This enables the user interface 122 to either be mounted directly to and hardwired to the modular camera, or removed from the modular camera and operated remotely, to control the camera functionality. In other embodiments, the user interface 122 includes only a physical connection and not a wireless connection to the brain module 112, or vice versa.

In some embodiments, various aspects of the user interface functionality may be distributed and/or replicated amongst other portions of the camera system such as the brain module 112 or other modules. For example, the brain module 112 may include one or more controls similar to those provided on the user interface module 122.

In certain implementations of the disclosure, the modular camera is functional in each of a digital still and motion mode (DSMC). In this mode, the user interface 122 is preferably configured such that it displays the appropriate settings, controls and feedback for motion when the camera is used as a motion camera, and the user interface 122 automatically switches to preconfigured display and control mode when the camera is utilized in a still picture mode. The display and controls may be automatically toggled between the motion mode and the still mode in response to manipulation of a control, such as a first switch or button for activating motion mode filming and a second switch or button for activating still shooting. In this manner, the photographer may toggle as desired between still shooting and motion shooting by simply selecting the right shutter control, and the user interface automatically reconfigures or toggles back and forth between the appropriate feedback and controls. The shutter control switch may be any of a variety of trigger switches, push buttons, toggle switches, slider switches, knobs, touch screen sensors or other switches as is known in the art. The first and second switches may be located adjacent each other, and may be differentiated such as by a different size, shape, texture or elevation from the adjacent portion of the modular body to which the controls are mounted.

For example, a user might set still shooting preferences such as 5K, ISO 500, Aperture Priority, F5.6, Average Metering, Continuous Auto Focus Mode, 5 FPS, and a software choice. Any of these variables may be modified as desired, until the user has set desired preferences for a particular application. For shooting motion in the same setting, the user might select 4K, ISO 500, Manual Exposure Adjustment, 60 FPS and a different software choice. Both sets of settings are retained in the camera. If the user hits the 'still' record button, all of the still preferences are implemented and/or displayed on the LCD or other monitor. If the user then hits the 'motion' record button, the camera automatically implements and/or displays the preselected motion associated preferences, so that the user does not have to manually reconfigure the camera settings. Preferably the user can distinguish the motion and still record controls such as through tactile feedback or other mechanism so that he can switch modes without needing to look away from the monitor or EVF.

The power module 124 may include any of a variety of known power supplies, such as batteries, fuel cells, solar, line input such as from a transformer or studio power or other source or combinations thereof. Typically, conventional rechargeable batteries will be used. The modular camera system 110 may be provided with one or two or three or four or more power modules 124, which may be stacked onto the modular assembly in any order, relative to the other modules, depending upon the desired physical configuration of the system. In some embodiments, a single power module 124 may include two or three or four or more separate power sources (e.g., batteries). The individual power sources may be releasable from the power module 124 in some embodiments. In one embodiment, the power module 124 comprises a quad battery back including four separate batteries. Power module 124 will often be the heaviest of the various modules. As a consequence, shifting the power modules 124 in a forward direction or a rearward direction relative to the other modules along the optical axis of the system will change the center of gravity of the system. This may be utilized to optimize the balance in the camera for the intended configuration, such as when configured in a DSLR mode versus an ENG mode, and/or to provide desired balance for use with a larger or small lens. Such balancing may be achieved by moving generally any of the expansion modules described herein instead of, or in addition to the power modules 124.

A further option for the modular camera system of the present disclosure is the provision of one or two or three or more dummy modules (not illustrated) which are physically capable of connecting into the module stack, and include internal electronics to complete the bus through the dummy module, such as when the dummy module or modules are positioned closer to the brain module than the rear of the stack. The dummy module preferably comprises a module housing with through bus wiring but no additional weight or electronics, or a predetermined weight rating. This enables a further shifting of the center of gravity of the overall system, as may be desired for specialty configurations. In addition, the use of one or more dummy modules enables the remaining modules to be repositioned relative to the brain module, which may be desirable as described below.

Dummy modules may further include mechanical connections or mounting points, allowing for further expansion of the modular camera system. For example, dummy modules or other modules described herein may include mounts for components such as rails, handles, view finders, shoulder pads, or any other appropriate camera component. In various embodiments, the mounts may include mounting bars, clasps, clamps, male or female threaded portions, snap-fit or friction-fit mechanisms, and the like.

As referenced above, the modular camera in accordance with the present disclosure may be interchangeably configurable for motion shooting, still shooting, or DSMC (digital stills and motion) loads. For digital still photography, an input/output module 126 may or may not be utilized depending upon user preference. However, when shooting in motion mode, an in/out module 126 is preferably provided. As with the other modules in the system, the in/out module 126 is configured for attachment in any order directly or indirectly to the brain module 112.

The in/out module 126 may include a variety of input and/or output connections 108 including, for example, audio signals, synchronization signals, dual link HD-SDI monitoring and other connections useful in the film production environment. Generally, the specific in/out module 126 configuration can be customized to production requirements and user preference.

Additionally, the in/out module 126 of some embodiments includes an interface 109 for coupling one of display screens described herein, such as a display screen of an electronic viewfinder.

As is understood in the motion picture arts, motion picture cameras are often mounted and used in environments where supporting frames, cables, rails, rods, shoulder mounts, tripod mounts and other equipment are closely packed into small or tight spaces. As a consequence, the ability of the in/out module 126 to be moved forward or backwards along the optical axis relative to the other modules provides the valuable benefit of allowing input/output cables connected to module 126 to be repositioned in a way that minimizes the obstruction by adjacent cables and structures. This may be accomplished both by rearranging the functional modules described above, as well as by the positioning of one or more dummy modules in the module stack.

FIGS. 1-3 show certain example configurations including some example module types presently contemplated. Other types of modules can be used, such as modules custom designed according to specific user requirements. Additionally, other numbers of expansion modules may be used in various configurations. For example, multiple power modules 124 may be used to provide longer run-times before recharge. A second input/output module 126, such as an input/output modules 126 having additional types of inputs and outputs may be used, providing enhanced input/output capability. In other configurations, one or more of the modules shown in FIGS. 1-3 are not included, or the modules shown are arranged in a different physical arrangement.

As described herein, a variety of other types of modules not shown in FIG. 1 can be implemented. As one example, in one embodiment, one or more of the modules shown, or some other module, includes a cooling unit, e.g., a fan. Additionally, the functionality of certain modules may be combined into a single detachable module. For example, in various embodiments, individual modules may include two or more of a power source, recording capability, input/output functionality, user interface capability, or other capability. Additionally, some of the modular aspects of the camera system 110 described herein can be compatible with film recording in some alternative embodiments. For example, in one embodiment, the brain module 112 is configured to receive and expose photographic film instead of, or in addition to, including a digital sensor.

Module Interfaces

Figure 4:
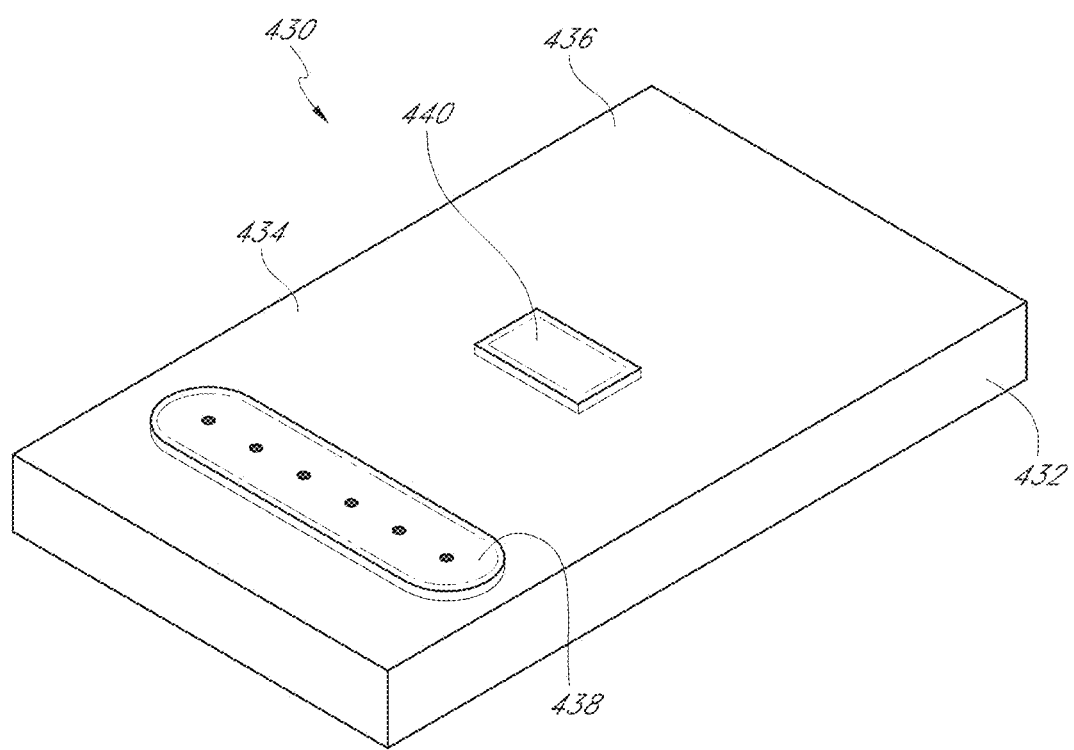
FIG. 4 is a schematic representation of a single module in accordance with embodiments described herein.

Referring to FIG. 4, there is illustrated a schematic view of one embodiment of a single module 430 in accordance with the present disclosure. The module 430 of FIG. 4 may be any of the electronics modules described herein. This is distinguished from the optics modules such as the brain module 112, lens mount module 114, and, if present, image stabilization module 118, which are configured to receive an optical signal, although such modules may include interfaces and features similar to those of the module 430, and vice versa.

Referring to FIG. 4, the module 430 includes a housing 432. The housing 432 is provided with at least a first interface 434, for releasable connection to an adjacent module. As will be appreciated in view of the foregoing, the housing 432 is preferably provided with two or more interfaces, to enable the module to be positioned within and electrically and mechanically engaged within a stack between two other modules. The first and second interface may be provided on opposite surfaces of the module, or may be provided on adjacent surfaces of the module, such as to enable stacking of modules in a non-linear configuration.

In the illustrated embodiment, a first interface 434 is provided on a first surface 436 of the housing 432 and a second interface (not shown) is preferably provided on a second, opposite surface of the housing which is not visible in FIG. 4. One or more of the first interface 434 and the second interface may be configured to cooperate with an interface of a brain module such as one of the brain modules described herein. Thus, one or more modules can be stacked onto a brain module. Additionally, in embodiments where an adapter module is used, one or more of the first interface 434 and the second interface may be configured to cooperate with the adapter module rather than directly with the brain module. The interface comprises a multi-function electrical connector 438, for providing electrical communication with the adjacent module. The interface additionally comprises a mechanical connector 440, for facilitating mechanical releasable locking of the adjacent modules. Alternatively, the multi-function electrical connector 438 can additionally be utilized to perform mechanical interlocking between adjacent modules.

Figure 5:
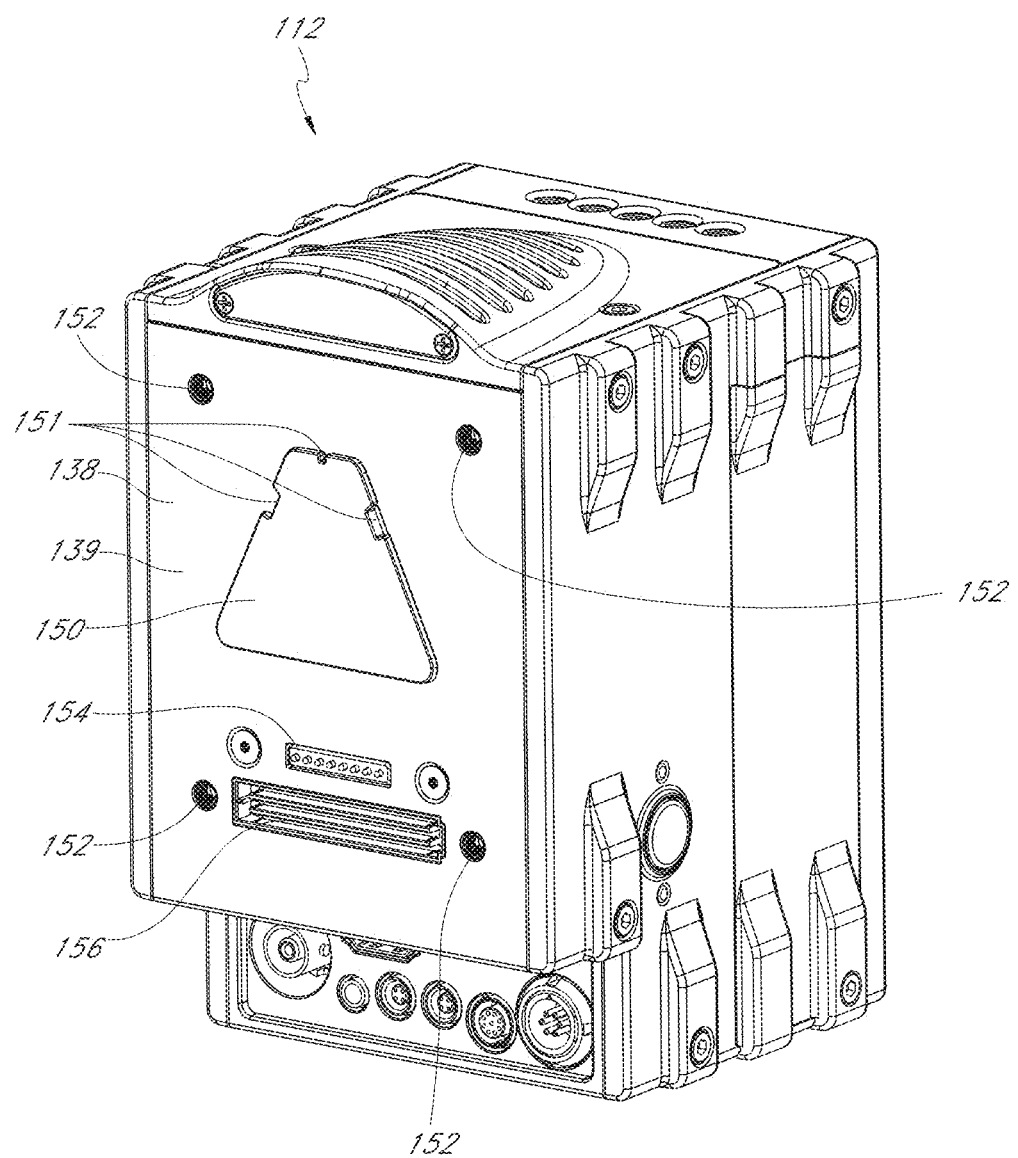
FIG. 5 shows a rear view of the brain module of the camera system of FIG. 1.
Figure 6B:
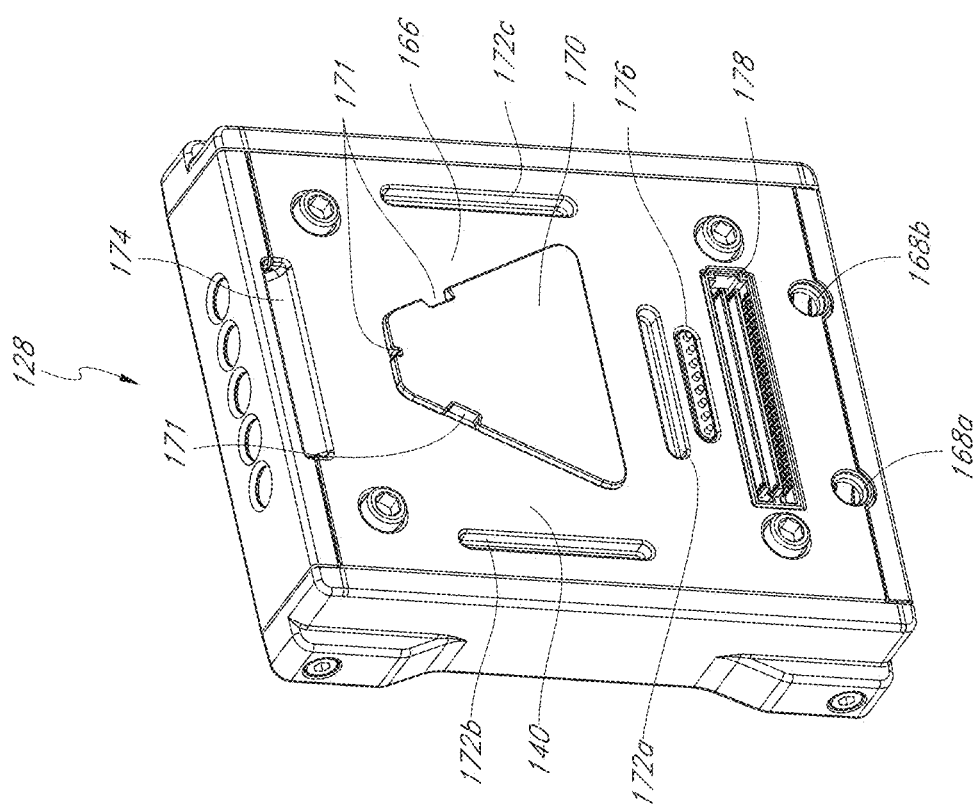
FIGS. 6A-B show front and rear views of the adapter module of the camera system of FIG. 1.
Figure 6A:
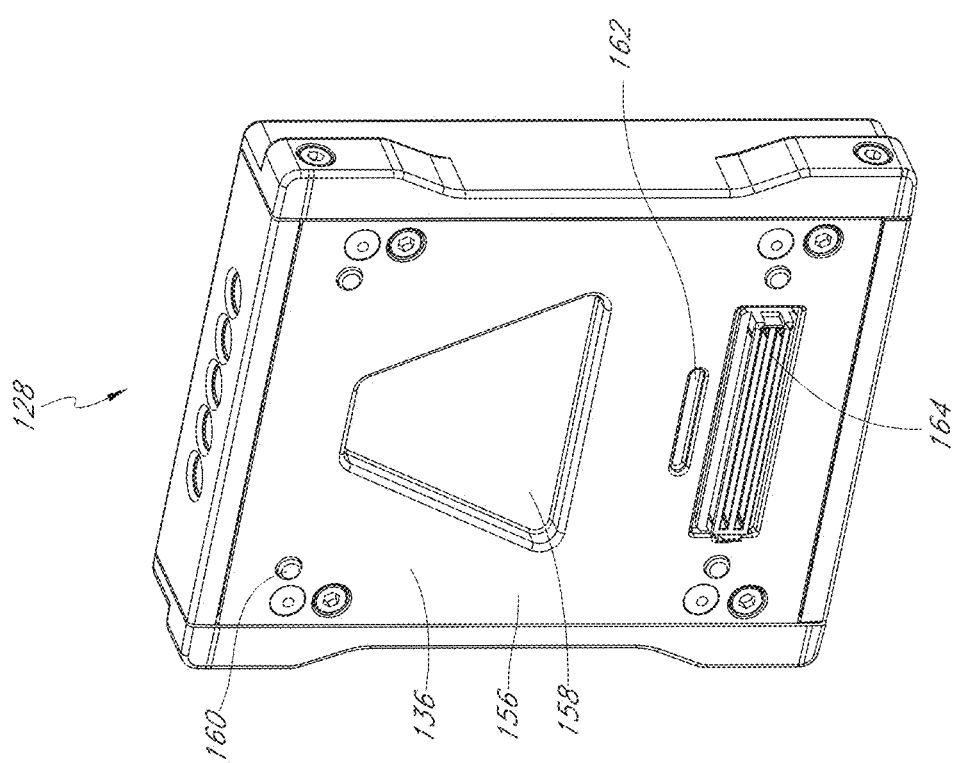

FIG. 5 shows a rear view of the brain module 112 of FIG. 1 and FIG. 6A shows a front view of the adapter module 128 of FIG. 1. The expansion interface 138 of the brain module 112 is configured to cooperate with the corresponding brain module interface 136 of the adapter module 128. The interfaces are configured for releasable, robust electrical communication and mechanical interlocking between the brain module 112 and the adapter module 128.

Referring to FIGS. 5 and 6A, the expansion interface 138 of the brain module 112 has a mechanical interface configured to releasably engage a corresponding interface of the brain module interface 136 of the adapter module 128. The mechanical interface of one embodiment includes a mounting surface 139, a support 150 having locking notches 151, and holes 152.

The expansion interface 138 also includes an electrical interface including first and second connectors 154, 156. The first and second connectors 154, 156 of certain embodiments comprise multi-function electrical connectors for providing electrical communication with the adapter module 128 and with generally any attached expansion modules via the adapter module. In some other embodiments, the electrical interface includes only one type of electrical connector or includes more than two types of electrical connectors.

In one embodiment, the corresponding brain module interface 136 of the adapter module 128 includes a mechanical interface including a mounting surface 156, support recess 158 and pegs 160. The mechanical interface is configured to cooperate with the corresponding features of the expansion interface 138 of the brain module 112 including the mounting surface 139, support 150 and holes 152 of the brain module 112, respectively. Thus, the corresponding mechanical interfaces provide releasable mechanical interlocking between brain module 112 and adapter module 128.

Referring still to FIGS. 5 and 6A, the support 150 and corresponding support recess 158 are shaped as isosceles trapezoids, providing an efficient distribution of the weight of the adapter module 128 and any attached expansion modules onto the brain module 112 in an assembled configuration. A variety shapes may be used for the support 150 and recess 158 in other configurations including rectangular, square, circular, and other shapes. In certain embodiments where the support 150 and recess 158 comprise shapes having terminating angles (e.g., rectangles, squares, triangles), it is preferable that the such angles be blunted, rounded, or otherwise smoothed, minimizing stress (e.g., breaking force) between the support 150 and recess 138. For example, the support 150 and recess 158 are generally triangular but comprise a flat top portion and rounded bottom corners, respectively.

The adapter module 128 further includes an electrical interface including connector 164. The connector 164 is configured to cooperate with the second connector 156 of the brain module 112, providing electrical communication between the brain module 112 and the adapter module 128. Recess 162 physically receives the first connector 154 of the brain module 112. In some embodiments, the recess 162 includes an electrical connector configured for electrical communication with the first connector 154 of the brain module 110. In other embodiments, the recess is not configured for electrical communication.

The first and second electrical connectors 154, 156 of the brain module 112 and corresponding recess 162 and connector 164 of the adapter module 128 may additionally provide mechanical interlocking between the brain module 112 and the adapter module 128.

The expansion interface 138 of the brain module 112 is configured to mate directly with one or more of the expansion modules in certain embodiments without the intermediate adapter module 128. For example, the user interface module 122 mates directly with the brain module 112 in some embodiments as described below with respect to FIG. 8. In other embodiments, no adapter module 128 is used and the other expansion modules are configured to couple directly with the brain module 112.

Figure 7B:
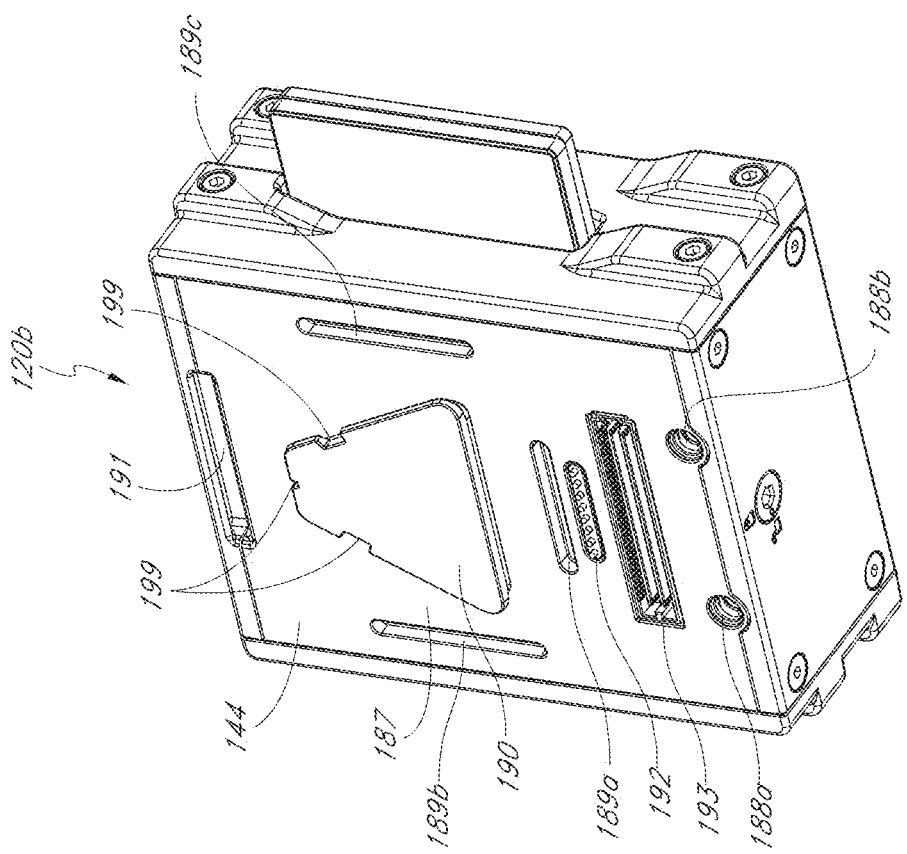
FIGS. 7A-B show front and rear views of an expansion module of the camera system of FIG. 1, particularly, a recording module.
Figure 7A:
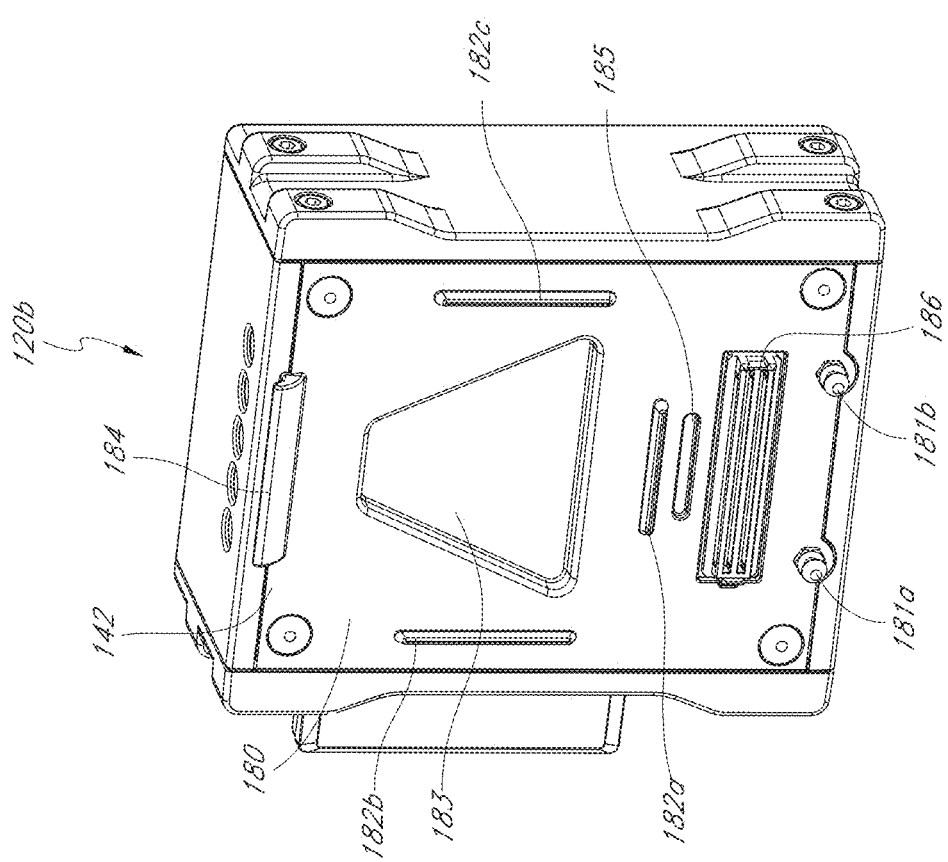

FIG. 6B shows a rear view of the adapter module 128 of FIG. 1. FIGS. 7A-B show front and rear views of the second recording module 120b of FIG. 1. The second recording module 120b includes a first interface 142 and a second interface 144. While the recording module 120b is shown for the purposes of illustration, one or more of the other expansion modules (e.g., the first recording module 120a, power module 124 and input/output module 126) include a first interface 142 and a second interface 144 generally the same as those of the recording module 120b, enabling the interchangeability of expansion modules.

The module interface 140 of the adapter module 140 and the first interface 142 are configured for releasable, reliable electrical communication and mechanical interlocking between the adapter module 128 and the various expansion modules including the second recording module 120b.

The module interface 140 of the adapter module 128 has a mechanical interface configured to releasably engage a corresponding mechanical interface of the first interface 142 of the expansion modules such as the recording module 120b. The mechanical interface of one embodiment includes a mounting surface 166, lower holes 168a, 168b, a support 170 having locking notches 171, recesses 172a, 172b, and an upper slot 174.

The module interface 140 further includes an electrical interface including first and second electrical connectors 176, 178. The first and second connectors 176, 178 include multi-function electrical connectors for providing electrical communication with the expansion modules. In some other embodiments, the electrical interface includes only one type of electrical connector or includes more than two types of electrical connectors.

The first interface 142 includes a mechanical interface having a mounting surface 180, pegs 181a, 181b, support recess 183, ribs 182a, 182b, and upper swoosh 184. The interface is configured to mate with the corresponding features of the mechanical interface of the module interface 140 including the mounting surface 166, lower slots 168a, 168b, support 170, recesses 172a, 172b, and upper slot 174, respectively.

The first interface 142 further includes an electrical interface having an electrical connector 186. The electrical connector 186 is configured to cooperate with the second connector 178 of the adapter module 128, providing electrical communication between the brain module 112 and the adapter module 128. Recess 185 physically receives the first connector 176 of the adapter module 128. In some embodiments, the recess 185 also includes an electrical connector operably couplable with the first connector 176 of the adapter module 128. The first and second connectors 176, 178 of the adapter module 128 and corresponding recess 185 and connector 186 of the recording module 120b and other expansion modules may additionally provide mechanical interlocking between the adapter module 128 and the expansion modules.

Referring to FIG. 7B, the recording module 120b and other expansion modules include a second interface 144. As described, in certain embodiments, and as shown in FIG. 1, each of the expansion modules preferably include a first interface 142 and a second interface 144 on opposing sides of the modules which are substantially the same as the first interface 142 and the second interface 144 of the recording module 120b. In some embodiments, the second interface 144 is of a type that is configured to cooperate with the first interface 142. Thus, the expansion modules can be stacked in generally any order for user-customizable configuration as described herein.

Additionally, as described above, both the second interface 144 and the module interface 140 of the adapter module 128 are configured to cooperate with the first interface 142 of the expansion modules. As such, the second interface 144 may be substantially the same as or include substantially similar mechanical and electrical interfaces as the module interface 140 of the adapter module 128. For example, the second interface 144 has a mechanical interface configured to releasably engage a corresponding mechanical interface of the first interface 142. The mechanical interface of one embodiment includes a mounting surface 187, lower holes 188a, 188b, a support 190 having locking notches 199, recesses 189a, 189b, and an upper slot 191.

The second interface 144 of some embodiments further includes an electrical interface including first and second electrical connectors 192, 193. The first and second connectors 192, 193 include multi-function electrical connectors for providing electrical communication with the other expansion modules. In some other embodiments, the electrical interface includes only one type of electrical connector or includes more than two types of electrical connectors. The mechanical and electrical interfaces of the second interface 144 mechanically interlock and electrically couple with the corresponding features of the first interface 142 in a manner generally similar to the module interface 140 of the adapter module 128.

Figure 8:
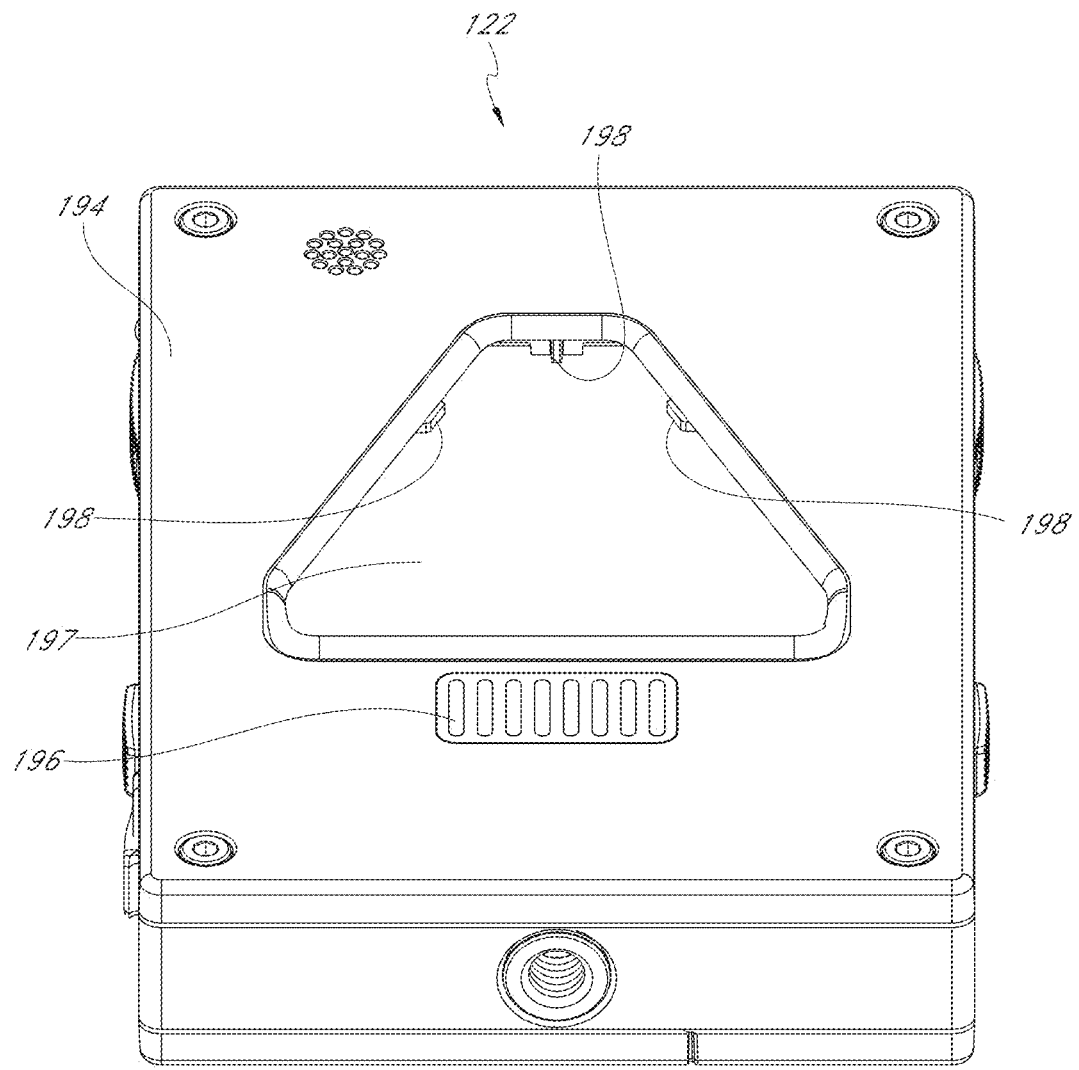
FIG. 8 shows a rear view of the user interface module of the camera system of FIG. 1.

FIG. 8 shows a detailed view of an interface 194 of the user interface module 122. The interface 194 is configured for releasable, reliable electrical communication and mechanical interlocking between the user interface module 122 and the various expansion modules of the modular camera system 110. For example, the user interface module 122 is configured for connection to the second interface 144 expansion modules, the module interface of the adapter module 128, and/or the expansion interface 138 of the brain module 112. As such, the user interface module can be used with the brain module 112 without the use of the adapter module 128. In some other embodiments, the interface 194 is the same as the first interface 142 of the second recording module 120b and other expansion modules.

In one embodiment, the interface 194 of the user interface module 122 includes a mechanical interface having a mounting surface 195, support recess 197, and locking protuberances 198. The interface 194 further includes an electrical interface including an electrical connector 196. The mechanical interface is configured to cooperate with the mechanical interfaces of the brain module 112, adapter module 128 and second interface 144 of the expansion module to fasten the user interface module 122 to the corresponding modules.

Referring to FIGS. 5 and 8, the support recess 197 is configured to accept the support 150 of the brain module 112. Moreover, the locking protuberances 198 engage the corresponding locking notches 151 of the support 150 of the brain module 112, providing enhanced locking of the user interface module 122 and the brain module 112. Referring to FIGS. 6B, 7B and 8, the user interface module mechanically mates in a similar fashion to the supports 170, 195 and corresponding locking notches 171, 199 of the adapter module 128 and expansion modules.

In certain embodiments, the support recesses 158, 183 of the adapter module 128 and expansion modules also include mechanisms similar to the locking protuberances 198 of the user interface 122.

Referring to FIGS. 5, 6B, 7B and 8, the electrical connector 196 of the user interface module 122 is operably couplable with the first electrical connectors 154, 176, and 192 of the brain module 112, adapter module 128 and expansion modules, respectively, providing electrical communication between the user interface module 122 and the remainder of the modular camera system 110. The electrical connector 196 may additionally provide mechanical interlocking between the user interface module and the other modules of the camera system 110.

Referring to FIGS. 5, 6B and 7B, the first electrical connectors 154, 176, 192 of the brain module 112, of the adapter module 128, and of the recording module 120b (or other expansion modules), respectively, can comprise a variety of different connector types. In one embodiment, for example, the first electrical connectors comprise a spring-loaded, single row, surface mount interconnect header made by Mill-Max Mfg. Corp (e.g., Product Number 812-22-003-30-003101). Referring to FIG. 8, in certain embodiments, the electrical connector 196 of the user interface module 122 comprises a corresponding socket configured to electrically and/or mechanically engage such a connector. Although not depicted in the illustrated embodiments, the recesses 162, 185 of the adapter module 128 and of the recording module 120b (or other expansion modules) can similarly comprise corresponding sockets configured to electrically and/or mechanically engage the first electrical connectors 154, 176, 192.

Referring again to FIGS. 5, 6B and 7B, although other types of connectors may be used, in one embodiment, the second electrical connectors 156, 178, 193 of the brain module 112, of the adapter module 128, and of the recording module 120b (and/or other expansion modules), respectively, comprise female SEARAY' brand 180-pin connector sockets made by Samtec (e.g., model number SEAF-30-06.5-X-06-X). Now referring to FIGS. 5, 6A and 7A, in such an embodiment, the electrical connectors 164, 186 of the adapter module 140 and of the recording module 120b (and/or other expansion modules), respectively, can be male SEARAY' brand 180-pin terminals made by Samtec (e.g., model number SEAM-30-06.5-X-06-X). Additionally, the various connectors used in the camera system 110 may be mechanically designed to withstand a relatively high number of mating cycles, providing improved durability.

The various mechanical interlocking features of the modular camera system 110 are designed to provide robust, reliable connection during use. For example, a relatively heavy load is placed on the mechanical connections between the various modules, such as in configurations including several expansion modules. Additionally, the mechanical connections will naturally undergo various stresses as users handle the camera. The interfaces described herein each provide a variety of complementary interlocking mechanisms which are selected and spatially arranged for synergistic operation. As a result, robust connection is maintained between the various modules of the camera system under such conditions without failure of the connections, significant mechanical play between the modules, or other undesirable effects.

Moreover, the mechanical interlocking allows for straightforward connection and disconnection of the various modules from one of another. This provides efficient and straightforward arrangement of the camera system into the desired modular configuration.

For example, referring to FIGS. 7A-B, in one embodiment a user attaches a first expansion module to a second expansion module (e.g., the rearmost module on the camera system) by first inserting the swoosh 184 of the first interface 142 of the first module into the upper slot 191 of the second interface 144 of the second module. The user then brings the first interface 142 flush with the second interface 144. As a result, the pegs 181a, 181b engage the holes 188a, 188b in a friction fit, ribs 182a-c engage portions 189a-c, and the electrical interfaces of the two modules couple with one another. To disengage the modules, a user, in one embodiment, pulls the rearmost module away from the adjacent module, overcoming the friction fit between the pegs 181a, 181b of the first module and the holes 188a, 188b of the adjacent module and further disengaging the remaining interlocking components. A user may connect and disconnect the adapter module 128 to and from the brain module 112 or connect and disconnect the expansion modules to and from the adapter module 128 in a generally similar fashion.

In one embodiment, a user connects the user interface module 122 by sliding the module 122 in a downward fashion onto the appropriate interface of a desired module, such as the second interface 144 of the rearmost expansion module in the system 110. The mounting recess 197 and locking protuberances 198 engage the mount 170 and respecting locking notches 171 of the second interface 144, securing the user interface module 122 in place. The electrical connector 196 also couples to the electrical connector 176 of the second interface 144. For example, as shown, the connector 196 of certain embodiments comprises a plurality of slats which receive corresponding pins on the first electrical connector 176 of the second interface 144. The slats of the illustrated embodiment are elongate and are configured to allow the user interface module 122 to slide down onto the corresponding interface of the adjacent module, releasably securing the module into place as described. In certain embodiments, a user attaches the user interface module 122 to the module interface 140 of the adapter module 128 or to the expansion interface 138 of the brain module 112 in a similar fashion.

In other embodiments, various other interface configurations and corresponding methods of coupling and decoupling the components in the system are possible. For example, in some embodiments, various mechanisms may be used to further secure the connections between the sensor module 112 and the expansion modules, between expansion modules and other expansion modules, etc. One or more sliding lock mechanisms can be used, for example. Referring to FIGS. 7A-B, one or more of the modules can be configured to receive a locking pin which engages the pegs 181a, 181b of an adjacent, attached module. Such pins may, in some embodiments, comprise bobby pins, cotter pins, R-clips, split pins, and the like, or may be otherwise similar to such types of pins in structure and function. For example, a user may connect a first module to a second, adjacent module. The user may then insert a pin into an opening (not shown) positioned on one side of the first module and providing access to a slot which extends laterally across the width of the first module. Although other configurations are possible, in one embodiment, the slot extends across the entire width of the module, terminating in a second opening positioned on the opposite side of the module. The slot can also be configured to intersect the holes 188a, 188b of the first module such that, upon insertion into the slot, the pin engages the pegs 181a, 181b of the adjacent, second module, preventing separation of the modules without removal of the pin.

Additionally, in some embodiments, a separate supporting structure (not shown) can be used to support the assembled camera system or portions thereof. For example, in various embodiments, an elongate tray, set of rails, or other structure can be used to support the weight of the expansion modules, relieving stress on the connection between the sensor module 112 and the expansion modules. In one embodiment, an elongate tray is releasably anchored to the sensor module 112 and extends along the underside of the expansion modules, for example.

Moreover, the orientation of the interfaces or portions thereof may be generally reversed in certain configurations. In one embodiment, the male and female mechanical interlocking features and electrical connectors of the modules are generally reversed. Moreover, other types of mechanical interlocking features and/or electrical connectors are contemplated instead of or in addition to those of the illustrated embodiments. For example, adhesive or magnetic connections are used in some embodiments. In some embodiments no adapter module 128 is used, the brain module 112 is directly compatible with the expansion modules, and the expansion interface 138 is similar to or the same as the second interface 144 of the expansion modules.

Additional Module Interface Embodiments

Figure 9B:
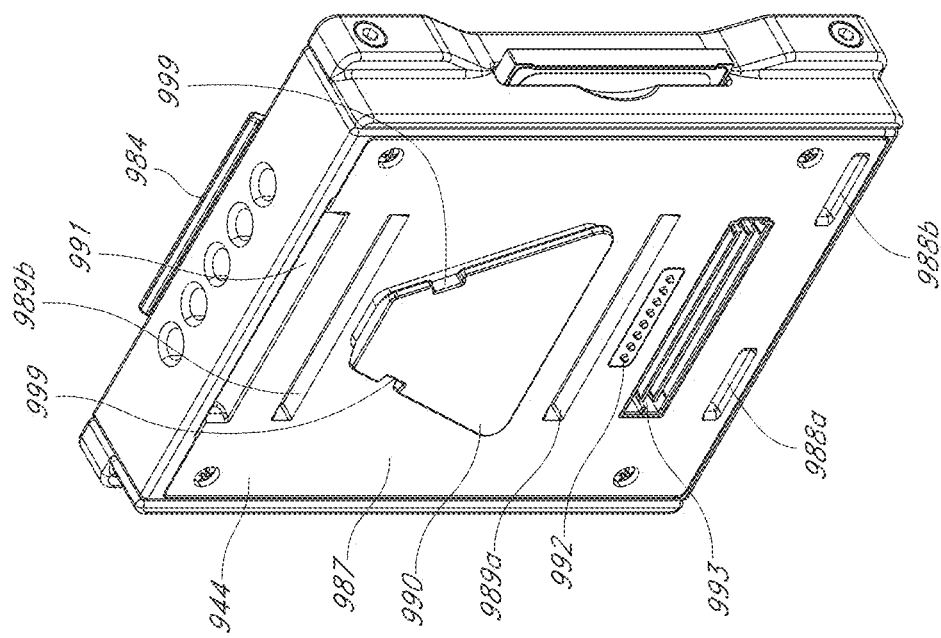
FIGS. 9A-B show front and rear views of another embodiment of an expansion module of a camera system in accordance with embodiments described herein.
Figure 9A:
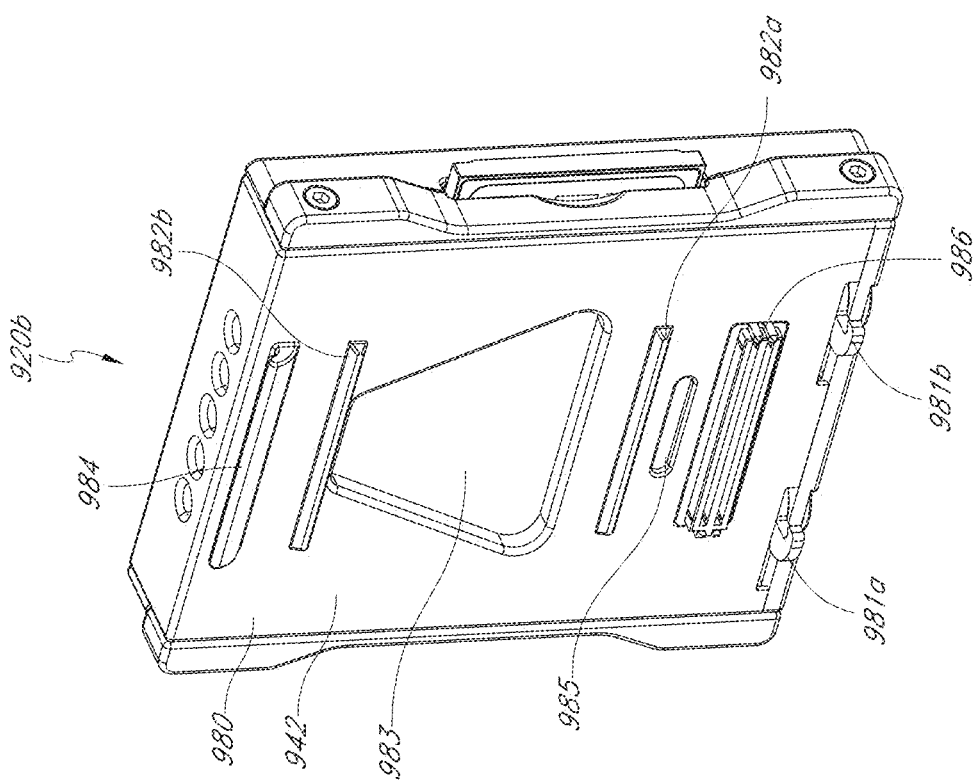

FIG. 9A-B shows an expansion module 920b of another embodiment of a camera system. As shown, some of the mechanical interlocking features of the expansion module 920b are different than those of the expansion modules of the camera system 110 of FIGS. 1 and 5-8, or of the camera system 310 of FIG. 3. The expansion module 920b may be a recording module 920b similar to one or more of the recording modules described herein, for example.

While only one expansion module 920b is shown, the expansion module 920 may be compatible with a camera system including a variety of other components such as other expansion modules, a brain module and/or adapter module.

The second recording module 920b includes a first interface 942 and a second interface 944. The second interface 944 is of a type that is configured to cooperate with the first interface 942. Additionally, one or more of the other expansion modules include a first interface 942 and a second interface 944 generally the same as those of the recording module 920b. Thus, the expansion modules can be stacked in generally any order for user-customizable configuration as described herein. Additionally, the first interface 942 is configured for releasable, reliable electrical communication and mechanical interlocking between a corresponding interface of an adapter module and/or brain module (not shown) in certain embodiments.

The first interface 942 of the expansion modules includes a mechanical interface having a mounting surface 980, hooks 981a, 981b, support recess 983, ribs 982a, 982b and upper swoosh 984. The first interface 942 further includes an electrical interface including an electrical connector 986 configured to cooperate with the second connector 978 of the adapter module 928, providing electrical communication between the brain module 912 and the adapter module 928.

The second interface 944 has a mechanical interface configured to releasably engage a corresponding mechanical interface of the first interface 942. The mechanical interface includes a mounting surface 987, lower hook slots 988a, 988b, a support 990 having locking notches 995, recesses 989a, 989b, and an upper slot 991. The second interface 144 further includes an electrical interface including first and second electrical connectors 992, 993. The first and second connectors 992, 993 include multi-function electrical connectors for providing electrical communication with the other expansion modules.

In one embodiment a user attaches a first expansion module to a second expansion module (e.g., the rearmost module on the camera system) by first inserting the swoosh 984 of the first interface 942 of the first module into the upper slot 991 of the second interface 944 of the second module. The user then brings the first interface 942 flush with the second interface 944. In one embodiment, the hooks 981a, 981b are each coupled to a spring mechanism such that they are deflected upon contact with a corresponding catch (not shown) positioned in the slots 988a, 988b of the second interface 944. As the user brings the modules flush with one another, the hooks 981a, 981b move past the respective catches and spring back into their original positions behind the catches, releasably locking the modules into place.

To disengage the modules a user, in one embodiment, pulls the rearmost module away from the adjacent module, overcoming the spring action of the hooks 981a, 981b. In another embodiment, a release mechanism is provided on the module for releasing the hooks. For example, release buttons or slider switches coupled to the spring mechanism are provided, and the user actuates the buttons or switches to disengage the modules. A user may connect and disconnect the adapter module to and from the brain module or connect and disconnect the expansion modules to and from the adapter module in a generally similar fashion.

Additional Modules and Configurations

As described, various modules described herein include generally uniform interfaces on opposing sides to allow for stacking of modules together in generally any order. In certain such embodiments, these modules can be chained together off of the back of the brain module (e.g., via an adapter module). Additionally, a number of modules having different types of interfaces can be attached to various points in camera system, increasing the configurable flexibility of the system according to user preference. In various embodiments, these modules are attached to various points on the brain module or to the other expansion modules, for example.

Figure 10A:
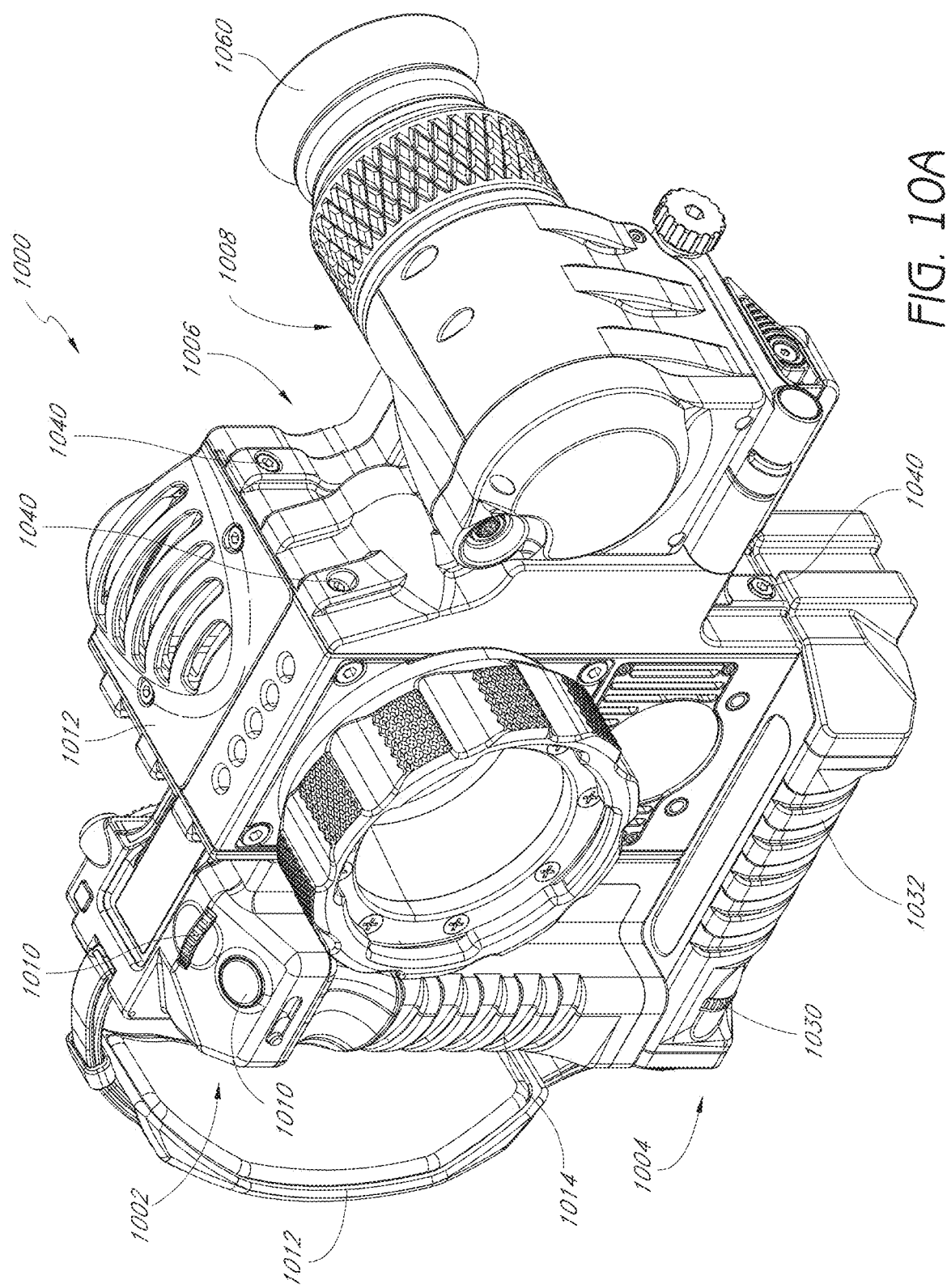
FIGS. 10A-B, 11 and 12 are perspective views of additional embodiments of camera system configurations in accordance with embodiments described herein.
Figure 10B:
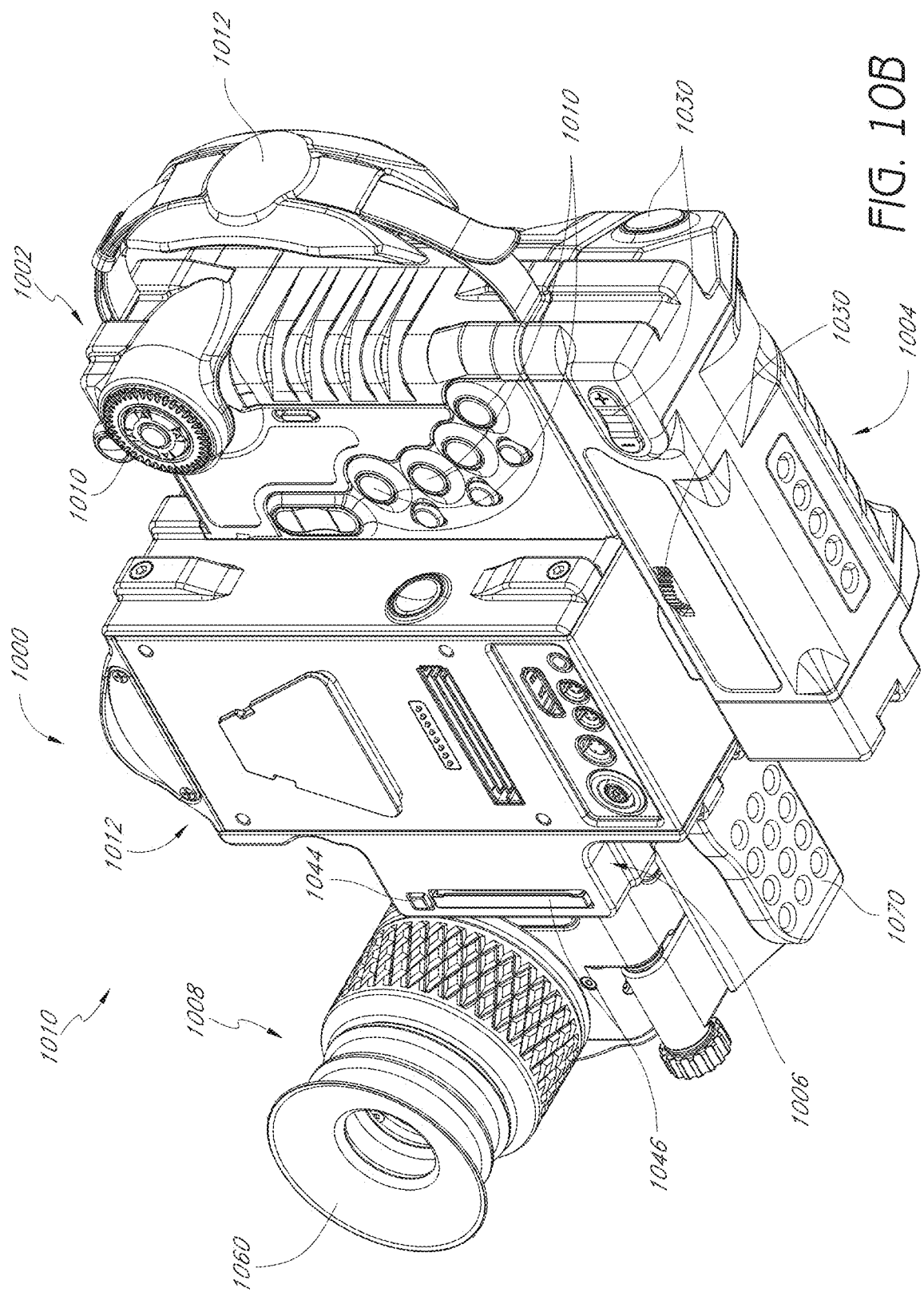

FIGS. 10A and 10B show a configuration 1000 including a variety of optional modules releasably attachable to the brain module 1012. The configuration 1000 includes a side handle 1002, a bottom handle 1004, a recording component 1006, and an electronic view finder (EVF) module 1008. An optical view finder module (not shown) may also be compatible with the configuration 1000 in certain embodiments. Additionally, in some embodiments, such as in configurations where both an electronic viewfinder and an optical viewfinder are included, camera systems described herein can be switched between an electronic view-finding mode and an optical view-finding mode.

The system 1000 of certain embodiments is capable of operating in a DSLR mode, and the depicted configuration may be referred to as a DSLR configuration. For example, the system 1000 is configured to have a relatively low physical profile and includes components such as the handles 1002, 1004 and strap 1012 facilitating handheld use. Such a configuration may be one example of a configuration that is suitable for use in a DSLR mode. While the system 1000 is not depicted as having an expansion module or an adapter module attached to the brain module 1012, one or more expansion modules or an adapter module can be attached. For example, a recording module can be included, and attached to the brain module 102.

While the configuration of FIGS. 10A and 10B can be referred to as a DSLR configuration, other configurations shown throughout the disclosure may also be capable of DSLR modes and/or be DSLR configurations. As will be appreciated, DSLR configurations can be used for still photography. In some embodiments, camera systems described herein can be arranged in other constructs suited for still photography (e.g., digital point and shoot). Still constructs can include those constructs which will be appreciated by those of skill in the art as being generally more suited for use in still shooting. For example, still constructs may include less bulky constructs, constructs having relatively less recording space and/or or relatively less in/out capability than motion constructs, constructs including one or more handle modules, optical viewfinders, straps, etc. While these characteristics and components may be particularly associated with motion constructs, it will be appreciated that certain motion constructs may include one or more of these characteristics or components in certain embodiments.

The side handle 1002 includes an interface (not shown) including features for mechanically and/or electrically coupling the side handle 1002 to a corresponding interface (not shown) on the brain module 1012. For example, the side handle 1002 may be releasably attachable to the brain module 1012 via a variety of mechanisms including friction-fit, snap-fit, threaded components, and the like. In one embodiment, the handle 1002 includes a hook portion and a cam lock screw. Additionally, a variety of electrical connectors can be used.

In some embodiments, the side handle 1002 further includes a variety of controls 1010 for controlling the camera system. The controls 1010 may include exposure controls, focus controls, and the like, which may be user-definable and suitable for use in still and/or video applications. The handle 1002 also has a hand strap 1012 and grip portion 1014 in some embodiments, providing an ergonomic and robust handling interface for the user. The side handle 1002 may be particularly suited for hand-held and light-weight tripod use. In certain embodiments, the side handle 1002 includes a rechargeable battery, allowing for lightweight and low-profile remote use without a separate power module or other power source.

The bottom handle 1004 includes an interface (not shown) including features for mechanically and/or electrically coupling the handle 1004 to a corresponding interface (not shown) on the brain module 1012. For example, the bottom handle 1004 may be releasably attachable to the brain module 1012 via a variety of mechanisms including friction-fit, snap-fit, threaded components, etc., or a combination thereof. Additionally, a variety of electrical connectors can be used.

The bottom handle 1004 further includes a variety of controls 1030 for controlling the camera system. The controls 1030 may include exposure controls, focus controls, and the like, which may be user-definable and suitable for use in still and/or video applications. The handle 1004 also grip portion 1032, providing an ergonomic and robust handling interface for the user. The side handle 1004 may be particularly suited for hand-held use, for example. In certain embodiments, the side handle 1004 includes a rechargeable battery, allowing for lightweight and low-profile remote use without a separate power module or other power source. Where the handle modules of the camera system 1000 (e.g., the bottom and side handles 1002, 1004) or any other component of the camera system 1000 includes a power source, such components may be referred to as a power module.

In certain other configurations, one or more of the side and/or bottom handles 1002, 1004 do not include separate controls, batteries or other electrical components and they provide purely the mechanical benefits of their respective handling interfaces. In some embodiments, only one of the side and bottom handles 1002, 1004 are used. In configurations including both handles 1002, 1004, the functionality of the handles 1002, 1004 complement one another, providing improved handling and/or electronic control of the camera system. In yet other embodiments, handles are provided which attach to the top of the brain module 1012, some other point on the brain module 1012, or to some other point in the system such as to one or more of the expansion modules described herein.

In certain embodiments, a recording component 1006 releasably attaches to the brain module 1012, such as to the side of the brain module 1012. The recording component 1006 has an interface including features for mechanically and electrically coupling the recording component 1006 to a corresponding interface on the brain module 1012. In one embodiment, the mechanical interface can include a set of threaded bolts 1040 which cooperate with corresponding threaded holes in the brain module 1012. The recording component 1006 may be releasably attachable to the brain module 1012 via a variety of other mechanisms including friction-fit, snap-fit, other types of threaded components, etc., or a combination thereof. Additionally, a variety of electrical connectors (not shown) can be used for electrically connecting the recording component 1006 to the brain module 312. In one embodiment, a SATA interface is used.

The recording component 1006 includes memory card slot configured to receive a memory component 1046 which is releasable via an eject button 1044, although other types of release mechanisms may be used. The memory device slot of one embodiment is configured to receive a Compact-Flash ("CF") card, although a variety of other memory technologies may be used, such as hard drives, spinning drives, other types of flash memory, solid state drives, RAID drives, optical discs, or others that may be developed in the art.

The EVF unit 1008 is mountable on an optional mounting bracket 1070 attached to the bottom of the brain module 1012 and includes an interface (not shown) for electrical coupling of the EVF unit 1008 to a corresponding interface of the brain module 1012. The EVF unit 1008 may be releasably attachable to the brain module 312 via a variety of mechanisms including friction-fit, snap-fit, threaded components, etc., or a combination thereof. Additionally, a variety of electrical connectors can be used for the electrical connection to the sensor unit 1012.

The EVF unit 1008 includes a display disposed inside the body of EVF unit 1008. An eyepiece 1060 allows a user to view the display. The sensor records the view through the lens. The view is processed and then projected on the display of the EVF unit 1008 which is viewable through the eyepiece 1060. The processing may occur in a processor in the brain module 1012, in the EVF unit 1008, or some other processor. The image on the display is used to assist in aiming the camera.

Figure 11:
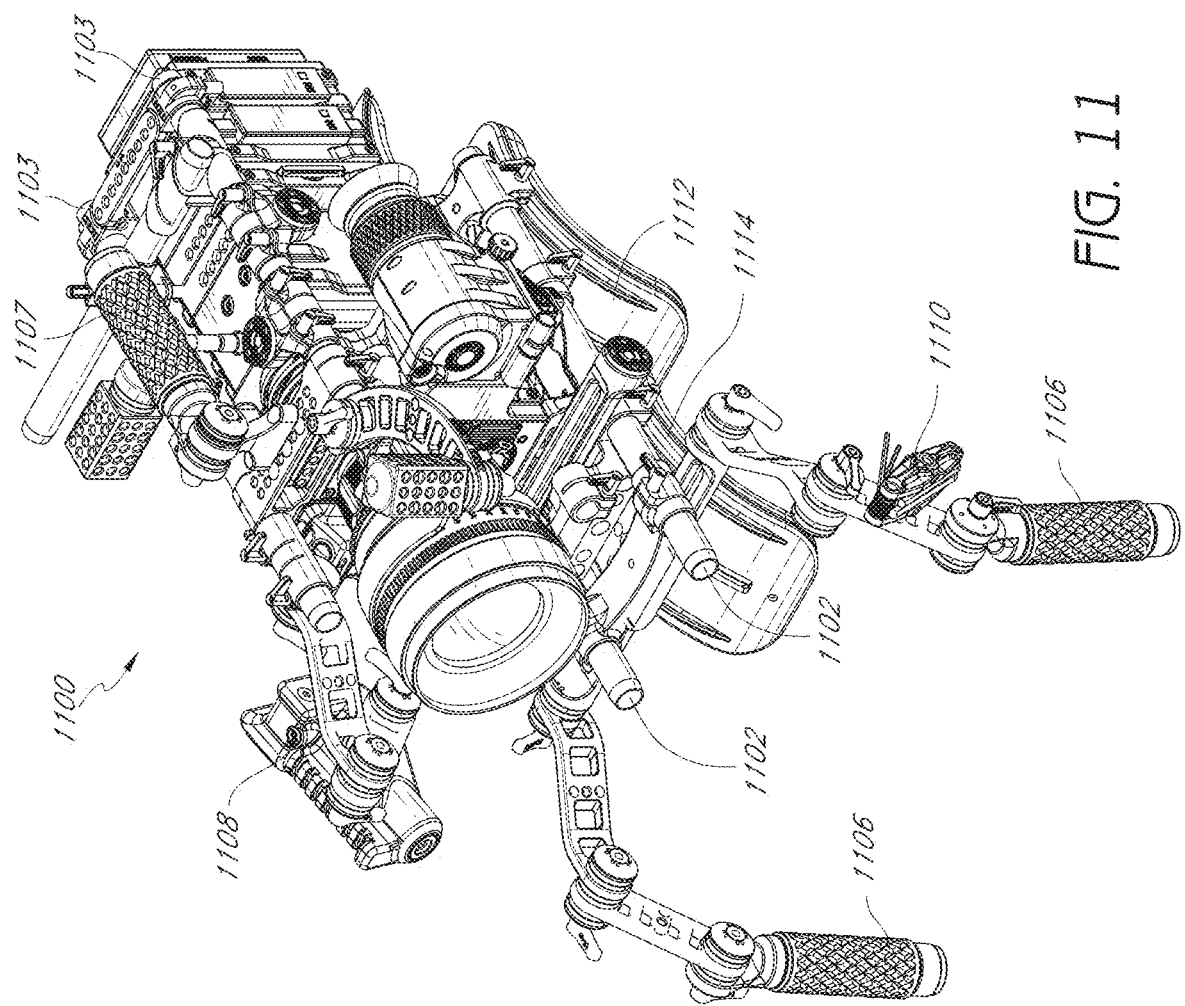

The cameras described herein are compatible with various rails, rods, shoulder mounts, tripod mounts, helicopter mounts, matte boxes, follow focus controls, zoom controls, and other features and other accessories known in the art. FIG. 11 shows an example camera system 1100 including various modules and other components described herein. The camera system 1100 also includes upper and lower sets of rods 1102, 1103 providing mounting points for various components including extension handles 1106, top handle 1107, side handle 1108, multi-tool 1110 and shoulder mounts 1112, 1114. The configuration of the camera system 1100 may be referred to as an ENG configuration in certain embodiments. ENG configurations may include configurations suited for portable professional use, and, in some cases, ENG configurations may be referred to as television camera configurations. For example, ENG configurations may include shoulder mounts or shoulder stocks for mounting the camera on a cameraman's shoulder during portable use. While the system 1100 may be referred to as an ENG configuration, other configurations described herein may also be ENG configurations.

FIG. 12 shows yet another modular configuration of a camera system 1200 including lower rods upper sets of rods 1204, 1206. The camera system 1202 also includes a matte box 1208 as well as an adjustable display 1210. As shown, the display 1210 can be positioned generally flat against the camera body for storage, transport, or when otherwise not in use. Alternatively, the display 1210 can be rotated about the pin 1211 to a desired viewing angle during use. In one embodiment, the display 1210 is connected to a port of an i/o module such as the port 109 of the i/o module 126 of FIG. 1. Other mechanisms for positioning or connecting the display are used in various embodiments. The configuration of the camera system 1200 may be referred to as a studio configuration in certain embodiments. Studio configurations can include configurations which are generally configured for professional shooting in a studio setting, such as configurations capable of being mounted on a tripod, dolly or crane. For example, such configurations can include a relatively large number of attached modules and other accessories such as cages, mounts, rails, etc. While the system 1200 may be referred to as having a studio configuration, other configurations described herein may also be studio configurations.

While the configuration of FIGS. 11 and 12 can be referred to as ENG and studio configurations, respectively, other constructs shown throughout the disclosure may also comprise ENG and/or studio constructs. As will be appreciated, ENG and studio configurations can be used for and may be particularly suited for motion photography. In some embodiments, camera systems described herein can be configured for other modes, configurations or constructs suited for motion photography. As will be appreciated by those of skill in the art, motion constructs generally include those in which the camera is suitable for motion use. Such constructs may include those incorporating a relatively large amount of recording space, e.g., those including one or more power modules such as the power modules 124 of FIG. 1. Motion constructs may also include those incorporating one or more in/out modules such as the in/out modules 126 of FIG. 1, those incorporating a display such as the display 1210, etc., or any other functionality generally suitable for motion shooting. While these characteristics and components may be particularly associated with motion constructs, it will be appreciated that certain still constructs may also include one or more of these characteristics in certain embodiments.

As discussed, the terms still configuration, still mode, still construct, etc., as used herein, may refer to modular constructs which will be appreciated as being particularly suitable for still photography. However, it will be appreciated that, in some embodiments, still constructs are capable of both still and motion shooting. Similarly, the terms motion configuration, motion mode, motion construct, etc., as used herein may refer to modes, constructs or configurations which are particularly suited for motion shooting. However, it will be appreciated that, in some embodiments, motion constructs are capable of both still and motion shooting.

Modular System Bus

As described, the camera systems include a system bus for communicating electrical signals such as image and other data, control and power, for example. Moreover, as described, the camera systems are modular and the modules can generally be arranged in a variety of configurations, including stacked configurations. For example, modules of different types may be stacked between each other. The system bus is advantageously configured to allow for the communication between any subset of modules, regardless of the physical arrangement of the modules on the camera systems, thereby maintaining the modularity of the camera systems. For example, the bus is advantageously segmented across the modules in certain embodiments.

Aspects of the system bus will now be described with respect to the camera system 110 and expansion module 120b of FIGS. 1 and 5-8. The description may additionally apply to the system buses of the other camera systems and modules described herein, such as the camera systems 210, 310 of FIGS. 2 and 3, or the module 430 of FIG. 4, or the modular cellular phone 1300 of FIGS. 13A-17B, for example. The module 120b of the camera system 110 includes a bus segment (not shown) electrically coupled to one or more of the multi-function electrical connectors of the first interface 142 and the second interface 142 such as the connectors 186, 192, 193. Preferably, the design of the bus segment is common across the modules in the camera system 110, thereby advantageously allowing for the transfer of information between any subset of modules and/or other components in the camera system 110 connected to the modules.

For example, in some embodiments, each of the expansion modules of the camera system 110 include a bus segment. Each of the adapter module 128, the input/output module 126, the recording modules 120a, 120b, and the power module 124 of the system 110 of FIG. 1 include a bus segment in some embodiments. The user input module 122 of one embodiment does not include a bus segment, or only implements portions of the segmented system bus. For example, only a select subset of the segmented bus may be routed to and from the user interface module 122 in certain embodiments. In other embodiments, the user input module 122 does include a bus segment.

As described, one or more of the electrical connectors 186, 192, 193 of the module 120b are common across each of the modules in the camera system 110. Each of the functional modules in the camera system 110 may further include a common operational module (not shown) configured to carry out one or more functions associated with the segmented bus. The operational modules may include a software module running on a processor of the functional module 120b, for example. In other embodiments, the operational module includes a hardware module, or may include a combination of hardware and software.

In one configuration, for example, a power module 124 is stacked between the at least one recording module 120 and the brain module 112. Although the power module 124 may not itself process, store or otherwise utilize image data, the common bus segment associated with the power module 124 is configured to receive and transmit image data. Image data may therefore be transferred between the brain module 112 and the recording module 124 through the power module 124. As described herein, other configurations of stacked modules including one or more recording modules 120, user interface modules 122, power modules 124, input/output modules 126 and/or dummy modules are possible.

The segmented system bus of certain embodiments is configured to include multiple bus interfaces providing complementary functionality and allowing for a high level of flexibility, performance and efficiency. In addition, the system bus can be configured to power down one or more of the bus interfaces when they are unused, thereby improving the power efficiency of the bus and improving battery life of the camera system 110.

The system bus includes multiple classes of bus interfaces in certain configurations. In some embodiments, for example, the system bus can include one or more high bandwidth bus interfaces and one or more support or control bus interfaces. The high bandwidth interfaces can provide a very high throughput data pipe, while the control bus interface provides a relatively low power, low overhead control interface. Thus, the interfaces combine to provide a bus that is tailored for camera applications such as video recording, video streaming, portable use, and the like. Specialized interfaces such as, for example, one or more audio interfaces may be included as well. The segmented system bus is described herein in terms of interface categories, classes, types, etc. in order to illustrate certain advantages associated with the bus architecture. However, these characterizations not intended to be limiting.

Moreover, the segmented system bus of certain embodiments includes multiple types of bus interfaces within the classes. For example, the system bus can include two, three or more types of each of the high-bandwidth, control and/or specialized interfaces in various configurations.

Providing a variety of bus interface classes and types across the system bus advantageously improves the flexibility, performance and efficiency of the camera system 110 in a variety of ways. For example, different bus interfaces may be better suited to particular purposes. Some modules or external devices may transmit, receive and/or process large amounts of data and may therefore benefit from a particular high-bandwidth bus interface. Other modules or external devices may operate within very low latency parameters and may benefit from a low-latency serial protocol, for example. Moreover, certain external components may only support particular types of interfaces. As described, the segmented system bus 110 of the modular camera system 110 can be configured to provide a number of bus interface options. Thus, the camera system 110 can be generally interoperable with a wide variety of external devices and modules, enhancing the flexibility of the system 110. In addition, multiple bus interfaces may be available on the segmented bus which are each capable of providing bus functionality within acceptable parameters to a particular module or external device. In such a situation, the system designer or system 110 itself can select the more appropriate bus for communicating with that module or external device. For example, greater speed and/or efficiency may be achieved using a particular available bus interface than with other acceptable bus interfaces also available on the system bus. The system designer or the system 110 itself can select the more appropriate bus, thereby improving performance and efficiency.

The high bandwidth bus interfaces may be used by the system 110, for example, for resource intensive tasks such as transferring image data, other types of data, control information, etc. The control bus interfaces may include one or more serial interfaces, for example, and may be used by the system 110 to provide support and control functions, such as module and peripheral identification and/or control. The control bus interfaces may provide low or zero latency support functions in certain embodiments and may be used to perform multi-camera synchronization or control peripheral devices such as lenses or flashes in some configurations. The control bus interface may also be referred to interchangeably as a support bus interface. Moreover, the one or more specialized interfaces can provide specialized functions such as for the transmission of audio data, for example.

The high-bandwidth interfaces of the system bus can allow for the transfer of large amounts of image and/or control data at relatively high speeds. In some embodiments, for example, the high bandwidth interface may include an extensible data pipe capable of up to about 12 GB/s. Other bandwidths are possible. In some other embodiments, the high bandwidth interface is capable of providing up to about 8 GB/s, about 10 GB/s, or about 14 GB/s. For example, the high bandwidth bus interface of other embodiments can allow for the transmission of up to 15 GB/s of total bi-directional bandwidth in some embodiments. In some embodiments, the high bandwidth bus interface is capable of providing greater bandwidths, such as, for example, about 16 GB/s, about 18 GB/s, about 20 GB/s, about 21 GB/s, or more. In one embodiment, the bus implements three high bandwidth interfaces capable of delivering at least about 1 GB/s of data throughput. For example, the bus includes a PCI Express ("PCIe") interface, a SATA interface, and a XAUI based interface in one embodiment. Although other configurations are possible, in one embodiment, the PCIe interface includes a PCI 2.0 ×4 interface and is capable of delivering from up to about 4 GB/s of total throughput in a high-performance mode, for example. For example, in one embodiment, the PCIe interface may be configured to have up to four active channels at 500 MB/s throughput in each direction. In certain embodiments, the lanes are configurable such that any combination of lanes may be configured for use at any given time. In other embodiments, the PCIe interface can be configured for other amounts of total data throughput, such as, for example, 5 GB/s, 10 GB/s, of total data throughput or more. The SATA interface may be configured for up to about 3 GB/s of bandwidth in certain embodiments. In some embodiments, the SATA interface can be configured for other amounts of total throughput, such as, for example, 6 GB/s of total data throughput or more. In some embodiments, the XAUI-based high bandwidth interface is capable of delivering up to about 5 GB/s of throughput. For example, in one embodiment, the XAUI is a full duplex ×4 link having four channels capable of 6.25 Gbps per lane. The XAUI according to some embodiments uses 10G electrical protocol and implements low overhead L2 and L3 protocol layer. In some embodiments, the XAUI interface is used for carrying control data, image data, or a combination thereof. The XAUI interface can also be used to transfer other forms of data including SATA packets and on-screen display ("OSD") graphics, for example. In some embodiments, the XAUI interface serves as a monitor and/or general purpose expansion bus, and can be scalable.

Additionally, the number of active PCIe lanes can be configured based the data and/or power requirements of the particular application. The different high bandwidth interfaces are selected to provide a synergistic set of functionality, and include generally complementary features particularly suited for camera applications. For example, the PCIe provides a highly configurable and very high throughput data pipe, while the SATA interface provides a relatively low overhead, yet still relatively high throughput interface.

Each of the various high bandwidth interfaces can be used in conjunction with the presently contemplated modules or with other modules for generally any suitable purpose. In one embodiment, for example, the PCIe interface is used for streaming raw image data off of the camera to an external computing device for processing and/or storage. For example, in one embodiment one of the stackable modules of the camera system 110 has a PCIe port configured to output PCIe data. The raw video image data is transmitted over the PCIe interface from the brain module 112 to that expansion module and through any intervening modules. The data is then streamed off of the camera system 110 through the PCIe port. The SATA interface can be used for various applications including communication to a recording module, such as those including SATA compatible hard-drives, Compact Flash modules and the like.

In another embodiment, the bus includes two PCI Express ("PCIe") interfaces, PCIe 2.0 ×8 and ×1, respectively, and a XAUI interface. The combined PCIe functionality is therefore capable of delivering from up to about 1 GB/s in a low power mode to about 8 GB/s in a high-performance mode, for example. The PCIe interface can also be configured to implement both the PCIe standard protocol for the OSI Model layers (e.g., physical, transaction and/or data link layers) and other protocols including, for example, variations of the OSI model layers. In various embodiments, other high bandwidth bus interfaces may be included instead of, or in addition to those described above, such as, for example, InfiniBand®, StarFabric, HyperTransport, RapidIO® or some other bus interface.

The one or more control interfaces of some embodiments include a plurality of serial interfaces. For example, the control interfaces include three serial interfaces in some embodiments. For example, the support interfaces include an I²C interface, a Serial Peripheral Interface ("SPI") interface and a 1-Wire® interface in one embodiment. In another embodiment, the control interfaces include an I²C interface, a SPI interface, a 1-Wire® interface, and an RS-232 interface. One or more UART devices are used in conjunction with the RS-232 interface in certain embodiments.

These interfaces may be used to provide flexibility by providing a variety of control and support features. For example, given the plurality of control interfaces provided in certain embodiments, system designers can select the interface most appropriate for a particular application. For example, the 1-Wire® interface of one embodiment is configured to allow the system to quickly identify modules in the system. The 1-Wire® interface may act as a common multi-drop bus, for example. The RS-232 interface and/or UART devices can be used to communicate with the user interface module 122. For example, while the user interface module 122 does not, in certain embodiments, include an entire common bus segment, it may include an RS-232 capable interface for communicating with the camera system 110 through the segmented system bus. The RS-232 interface may be accessible via the connector 196 of the user interface module 122, for example.

A general purpose input/output interface ("GPIO") may also be included. The GPIO interface may provide control functions such as multi-camera synchronization or may provide control for other external devices such as lenses and flashes, for example. In various embodiments, other support interfaces may be implemented such as an RS-485 interface or some other type of interface. Moreover, generally any number or combination of interfaces may be present, depending on the configuration. In certain embodiments, the system includes at least two control interfaces. In other configurations, the system can include at least 3, 4, 5 or more control interfaces, or a single serial interface.

As mentioned, one or more specialized interfaces may be included as part of the system bus. For example, specialized interfaces may provide for the transmission of audio data between the modules of the camera system 10, the other components of the camera system 10 and/or one or more audio peripheral devices. The specialized interfaces may include an Inter-IC Sound ("I$^2$S") interface for communicating sound data between the components in the system 110 between the system 110 and external devices. In one embodiment, a time division multiplexed ("TDM") audio interface may be used. In one embodiment, a TDM interface is used which is configured to support up to 16 channels of monaural audio at up to 192 KHz per channel. Moreover, certain parameters may be modified, providing flexibility and interoperability with a variety of audio components. For example, the sample rate and sample width can be adjusted on a channel by channel basis in some embodiments. In various embodiments, specialized interfaces may provide other functions and may allow for the transmission of some other type of data, for example, instead of, or in addition to, audio data.

In addition to the interfaces described above, the segmented system bus can include a variety of signals or groups of signals dedicated for particular purposes. For example, one or more signals are configured as interrupt lines, providing interrupt functionality to one or more of the modules in the system 110. One or more dedicated presence detect signals may be used to detect the presence or absence of expansion modules or other components in the system 110. The segmented system bus can include a variety of dedicated clock signals as well.

In some embodiments, one or more dedicated storage interfaces are included in the system bus. Such interfaces may include a SATA interface such as those described above for example. In other embodiments, other types of storage interfaces such as a SCSI interface may be used.

In various embodiments, a variety of other interface types may be incorporated in the segmented bus, including, but not limited to, Ethernet, USB, USB2, USB3, IEEE 1394 (including but not limited to FireWire 400, FireWire 800, FireWire 53200, FireWire S800T, i.LINK, DV), etc.

The segmented system bus also includes a common power supply interface which is configured to power the components of the system 110. For example, the power supply interface may allow for automatic routing of a desired one or more of a set of available power sources to the camera modules. The set of available power sources can vary depending on the particular modular configuration of the system 110, and the power supply interface of certain embodiments can be extended to provide power from generally any number of possible input power sources.

The power supply interface may be configured to provide automatic fall-over protection when one or more of the power sources become unavailable, or when it becomes otherwise desirable to provide power from a different power source. Although a variety of schemes are available, the power sources of one embodiment are logically cascaded in order of priority. When the highest priority power source is unavailable or when it is otherwise desirable to switch power sources, the power supply interface automatically routes power to the system from the power source having the next highest priority.

In one configuration, the power supply interface is configured to provide power from one of six available power sources including: an external power source connected to an input jack on a brain module 112; a battery integrated into a modular handle (e.g, the side handle 1002 of FIGS. 10A-B); and a set of four batteries of a power module 12 comprising a quad battery pack. In other configurations, there are different numbers and/or types of power sources. For example, there can be 2, 3, 4, 5 or 7 or more power sources. In yet another embodiment, there is a single power source. In one embodiment, the input jack on the brain module 112 has the highest level of priority, followed by the integrated side handle battery, followed by each of the four batteries of the power module 124. In one use scenario, a user pulls a power cable from the input jack on the brain module 112, and the power supply interface routes power to the camera system 110 from the side handle battery. The user may then remove the side handle or one or more of the batteries of the power module 124, and the power supply interface automatically switches to the appropriate power source. In some embodiments, the power supply interface provides uninterrupted power delivery and thus uninterrupted camera operation during automatic transition between power sources.

The power supply interface of some embodiments detects the addition of an available power source over one of the communication interfaces provided in the segmented bus. For example, a control interface of the segmented bus, described in greater detail below, or one or more other signals in the segmented bus may be used. While other methods of detecting available power sources may be used, in one embodiment, a message is sent to the brain module 112 from an attached module having a power source. A processor running on the brain module 112 may receive the message. Thus, the system 110 is notified of the presence of the power source. Then, according to whatever selection scheme is implemented (e.g., a ranking or other priority scheme), the system 110 may select from the available power sources to determine which power source will be used to power the system 110.

In some embodiments, for example, power is generally routed through the brain module 112 before being delivered to the remainder of the camera system 110 for consumption. Thus, the brain module 112 can act as a hub for distributing power.

For example, the power supply interface according to such embodiments may include a first power bus routed through the stackable modules and received by the brain module 112. The first power bus runs through each of stackable modules and routes one or more power signals from the stackable modules into the brain module 112. The brain module 112 may receive one or more additional power signals from non-stackable sources (e.g., an input jack of the brain module 112, an integrated battery of a handle module). The power supply interface further includes a second power bus routed out from the brain module 112, through the modules in the system 110 for consumption. Depending on which power source is selected for powering the system at any given time, the brain module places either a power signal from the first power bus or a power signal from one of the additional, non-stackable power sources onto the second power bus.

In one embodiment, the first power bus coming from the stackable modules comprises a single power line, while the stackable modules may include a plurality of power sources. In this scenario, the brain module 112 arbitrates which of the plurality of power sources is placed on the single power line by sending an arbitration message to each of the modules in the system 110. Based on the received message, the modules can either take control of the first power bus or yield to other modules such that only one power source will be placed on the bus and delivered to the brain module 112, thereby avoiding conflicts. For example, in one scenario, the brain module 112 may send a message indicating that a first battery element of a quad battery power module 124 is to be placed on the first power bus. In response to the message, the power module 124 places the output of its first battery element on the bus and the other modules in the system 110 yield control of the first power bus to the power module 124. In other embodiments, the first power bus includes a plurality of power lines, and power signals from each of the power sources in the stackable modules are sent to the brain module 112.

In the example stacked configuration shown in FIG. 1, the first power bus may be routed from the power module 124 through the bus segments of each of the intervening modules, and eventually into the brain module 112. The second power bus may conversely be routed from the brain module 112 out through the each of the intervening modules, terminating at the power module 124. In such an embodiment, the user input module 122 receives power from another source, such as an integrated rechargeable battery. In other embodiments, the user interface 122 does include the common power supply interface or portions thereof, and one or more of the first and second power buses of the power supply interface are routed from and to the user input module 122, respectively.

In some embodiments, power source selection decisions made by the brain module 112 may be overridden under appropriate conditions. For example, a module including a power source may override decisions made by the brain module 112. In one embodiment, where the power module 124 includes a plurality of battery elements, the power module 124 detects that a battery element selected by the brain module 112 to power the system 110 is insufficiently charged. In such a situation, the power module 124 may automatically route power from another, sufficiently charged, battery element. Additionally, in some configurations, the system 110 includes a manual override allowing the user to select the appropriate power source.

Due to the modular, segmented nature of the power supply interface, the power supply bus can be extended to support generally any number of cascaded power source inputs. For example, in accordance with certain embodiments, a user can stack power modules 124 along with other types of modules in generally any physical arrangement, providing flexibility in creating a desired modular construct. Additionally, according to some embodiments, users can stack generally any number of power modules 124 onto the modular arrangement. Thus, users can customize modular configurations according to desired battery life. Moreover, in addition to the power sources presently contemplated, the power supply interface can, in some embodiments, be extended to support various other module designs incorporating other power sources. As such, the extendible nature of the power supply interface also allows system designers to adapt to changes in technology.

The power supply interface may also be configured to provide power to external devices in some configurations. For example, in one embodiment the power supply can provide current-limited output power to an external motor or some other device, thereby improving the interoperability of the camera system 110 with a variety of devices.

Although described with respect to certain preferred embodiments, aspects of the power supply interface of the segmented bus can be configured differently. For example, the power sources may be manually selected by the user instead of, or in addition to, being automatically determined by the system 110.

Modular Cellular Phone

The modular camera systems described herein can include modules that provide wireless communication capabilities (e.g., the user interface module 122 described herein with reference to FIGS. 1A and 1B) as well as modules that provide a touch screen user interface (e.g., the viewing screen 123 described herein with reference to FIG. 1B). With these modules, the modular camera system can provide functionality similar to a modular cellular phone. Example configurations of such modular camera systems configured as modular cellular phones are described herein with reference to FIGS. 13A to 17B.

FIGS. 13A-D illustrate various views of an example modular cellular phone 1300 in an assembled configuration. The example modular cellular phone 1300 can be configured to acquire pictures using optics and image sensors as well as provide wireless communication with other electronic devices (e.g., cellular phones) over wireless communication networks and/or the Internet. The example modular cellular phone 1300 can be configured to provide a user interface that includes a touch screen as well as one or more physical elements configured to receive input from a user to control the modular cellular phone 1300. One or more of the modules can include connector interfaces to output or receive data, wherein the received data can be communicated to at least one other module, and wherein the output data can be provided by at least one other module.

The modular cellular phone 1300 can include 2 or more modules coupled together to provide a combination of functions. For example, the modular cellular phone 1300 includes 3 modules coupled to one another to provide imaging, power, and communication. The modular cellular phone 1300 includes a camera module 1310, a battery module 1320, and a phone module 1330. The camera module 1310 can further include an optical module 1305. In some embodiments, the modular cellular phone 1300 includes one or more modules in addition to or in place of the modules illustrated in FIGS. 13A-D. For example, modules that can be used include an additional battery module, a flash module (e.g., a module that has an upwardly extending support for a flash array for photography), an additional camera module (e.g., for 3D imaging), a mounting module (e.g., a module with physical attachments for different mounting structures such as a tripod or a drone), an I/O module with one or more connector interfaces and/or physical buttons or other user input elements, a sensor module (e.g., a module with one or more sensors such as a barometer, infrared sensor, accelerometer, glucose sensor, etc.), gamepad module (e.g., a module to provide user interface elements for games), light module (e.g., a module configured to provide one or more colors of light), speaker module (e.g., a module configured to provide speakers for playing music and/or video), a projector module (e.g., a module configured to project images onto a surface for viewing), a display module (e.g., a screen or viewfinder), and the like. The modular camera system 1300 can include any of the modules or other components or functionality described herein with respect to other modular camera embodiments, such as any of those shown and described with respect to the modular camera 200 of FIG. 2 (e.g., the sensor and electronics module 212, lens mount module 214, lens 216, image stabilization module 218, recording module 220, user interface module 222, power module 224, input/output module 226, or adapter module 228), or such as any of those shown and described with respect to the modular cameras 110, 310 of FIGS. 1A-1C, 3A-3B, and 5-12 (e.g., the brain module 112, lens mount module 114, adapter module 128, input/output module 126, recording modules 120a, 120b, power module 124, or user interface module 122). As just one example, the modular cellular phone 1300 could additionally include a recording module and/or input/output module inserted into the module stack. In such a configuration, the recording module, input/output module, and power module 1320 could be placed in any order with respect to one another in the stack. Or, in another configuration, a recording module and/or input/output module could be inserted in the stack in place of the power module 1320.

The camera module 1310 includes an interchangeable optical module 1305. The optical module 1305 can be replaced with another optical module that provides different functionality. For example, the optical module 1305 can include optical elements such as lenses, shutters, prisms, mirrors, irises, and the like to form an image of an object at a targeted location. In some implementations, the optical module 1305 can also include an image sensor configured to output electronic signals in response to light incident on the sensor. In some implementations, the image sensor is part of the camera module 1310. The camera module 1310 can be configured to acquire video and/or images. In some implementations, the camera module 1310 includes data storage (e.g., internal storage or a removable flash memory device such as an SD card) for storing acquired video/image data.

The image sensor and optical components of the camera module 1310 can provide the same functionality and capability described elsewhere herein with reference to the image sensors and optical components of the disclosed modules of the modular cameras. For example, the camera module 1310 in combination with the optical module 1305 can be configured to acquire and output video data at "2 k" (e.g., 16:9 (2048×1152 pixels), 2:1 (2048×1024 pixels), etc.), "3 k" (e.g., 16:9 (3072×1728 pixels), 2:1 (3072×1536 pixels), etc.), "4 k" (e.g., 4,096×2,540 pixels, 16:9 (4096×2304 pixels), 2:1 (4096×2048), etc.), "4.5 k" horizontal resolution, Quad HD (e.g., 3840×2160 pixels), "5 k" (e.g., 5120× 2700) horizontal resolution, "6 k" (e.g., 6144×3160), "8 k" (e.g., 7680×4320), or greater resolutions. Output video data can also be provided at a rate of at least about 23 frames per second (fps) or output video data can be provided at frame rates of from about 1 fps to about 250 fps or more can be achieved. For example, the frame rate may depend on the resolution setting. In some embodiments, the camera module 1310 is configured for frame rates of from between about 1 fps and about 100 fps in a "5 k" resolution mode, from about 1 and about 125 fps in a "4 k" resolution mode, from about 1 and about 125 fps in a quad HD mode, from about 1 and about 160 fps in a "3 k" resolution mode, and from about 1 and about 250 fps in a "2 k" resolution mode. Possible frame rates include, e.g., frame rates of greater than 12, as well as frame rates of 20, 23.976, 24, 30, 60, and 120 frames per second, or other frame rates between these frame rates or greater.

Figure 13A:
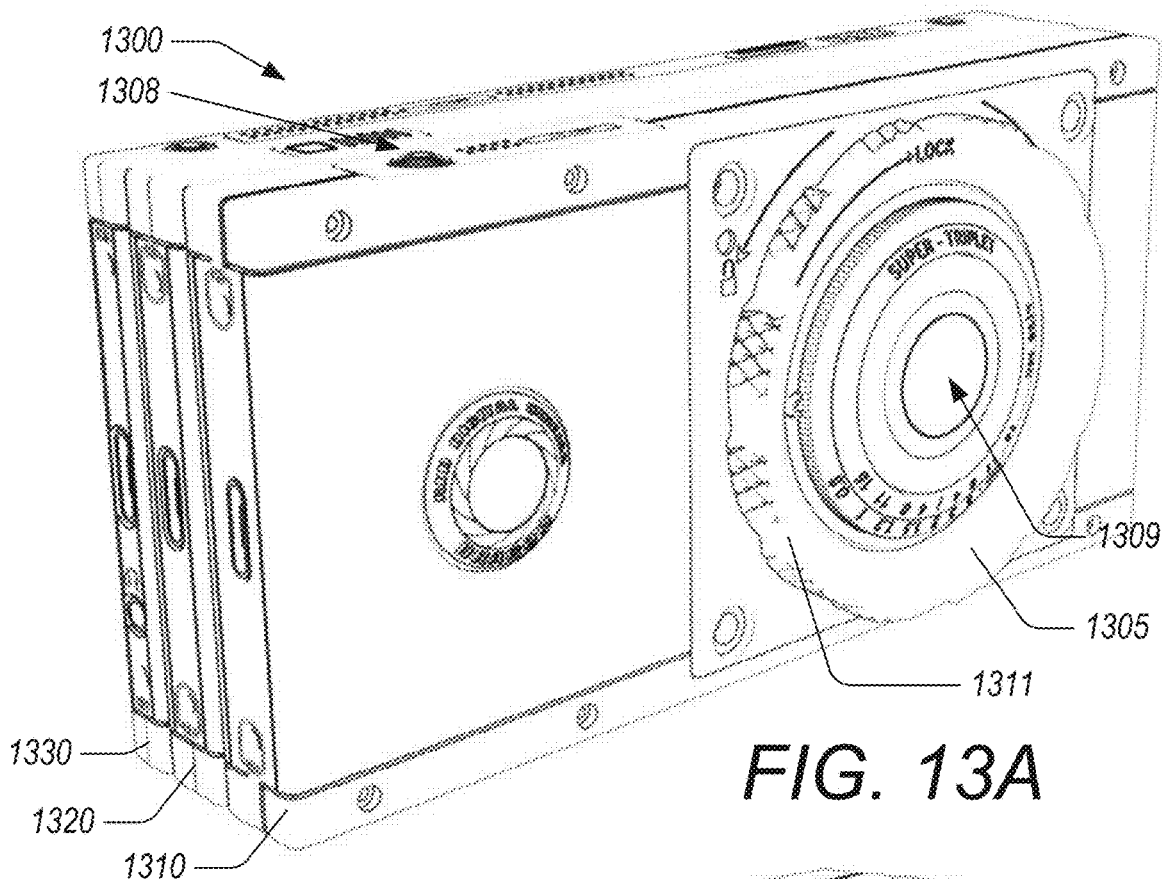
FIGS. 13A-D illustrate various views of an example modular cellular phone in an assembled configuration.

The camera module 1310 can include digital signal processing electronics, such as compression electronics, as described herein. In some embodiments, the compression electronics can be provided in a different module (e.g., a specialized module) or in the battery module 1320 or the phone module 1330. Where the compression electronics are provided by a specialized module, this module can be replaced or swapped for a different module to provide different compression (e.g., visually lossless) and/or different image processing (e.g., application of different color spaces, subsampling, demosaicing, etc.) for storage or display (e.g., on a monitor) prior to or in addition to recording the video data output. This can be used to provide advanced processing, recording, or storage capabilities. Referring to FIG. 13A, the illustrated camera module 1310 can include a record button 1308, which the user can press to activate the camera module 1310 to begin video recording or still capture. The illustrated camera module 1310 further includes a lens 1309, which can be removably mounted into the lens mount of the optical module 1305. For instance, the user can install the lens 1309 by placing the lens 1309 within the opening defined by the lock ring 1311 of the optical module 1305, and spinning the ring 1311 clockwise to lock the lens 1309 in place. Conversely, the user can remove the lens 1309 by spinning the ring 1311 counterclockwise to unlock the ring, and then removing the lens 1309. The user can then install another type of lens, if desired. The lens 1305 can be a prime lens, zoom lens, or other type of lens, and can comprise any of the lenses described herein, for example.

The battery module 1320 can be configured to provide power to one or more modules in the modular cellular phone 1310. In some implementations, the battery module 1320 can be configured to provide additional capabilities similar to the capabilities described herein with reference to the brain module 112. In some implementations, the battery module 1320 includes data storage (e.g., internal storage or a removable flash memory device such as an SD card) for storing data received from one or more modules, such as the camera module 1310. By swapping out different battery modules 1320, the modular cellular phone 1300 can be used for an extended period of time without having to charge a dedicated phone battery. In addition, different battery modules can include batteries of different sizes so that the form factor of the modular cellular phone 1300 can be configured to be thinner, for example, when a smaller battery is desired, and to be wider, for example, when a battery with a larger capacity is desired. In some embodiments, the battery module 1320 can provide functionality similar to the brain module 112 described elsewhere herein.

The phone module 1330 can be configured to provide wireless communication functionality to the modular cellular phone 1300. For example, the phone module 1330 can be configured to provide communication over cellular networks (e.g., GSM, CDMA, AMPS, etc.). The phone module 1330 can provide voice communication as well as data communication through cellular networks and/or through wireless network signals (e.g., WiFi). In some embodiments, the phone module 1330 includes other wireless communication functionality such as BLUETOOTH and/or near field communication ("NFC"). The phone module 1330 includes user interface features described elsewhere herein to allow a user to interact and use the phone module 1330 as a cellular phone. In some implementations, the phone module 1330 includes data storage (e.g., internal storage or a removable flash memory device such as an SD card) for storing data received from one or more modules, such as the camera module 1310.

When the phone module 1330, battery module 1320, and camera module 1310 are assembled to form the modular cellular phone 1300, information and power can be transmitted between the modules through a system bus, as described elsewhere herein. For example, the camera module 1310 can send video data having a resolution of at least about 2 k and a frame rate of at least about 23 fps through the battery module 1320 to the phone module 1330 for display, storage, transmission, or the like. In some implementations, the camera module 1310 can be configured to record video data at a first resolution and frame rate, and to transmit video data to the phone module 1330 at a second resolution and frame rate. In some implementations, the camera module 1310 can be configured to record video data at a first resolution and frame rate and to transmit video data to the phone module 1330 at the first resolution and frame rate and the phone module 1330 can be configured to process the video data and store the video at a second resolution and/or frame rate. In some embodiments, the battery module 1320 can provide power to both the phone module 1330 and the camera module 1310. In various implementations, the power from the battery module 1320 can be used to charge batteries in the individual modules.

FIGS. 14A-D illustrate various views of an example modular cellular phone 1300 in a disassembled configuration. The respective modules can be removed and/or added to the modular cellular phone 1300 using physical connectors, attachments, or mounting components. Individual modules can be configured for independent use when disconnected from the modular cellular phone 1300. For example, the camera module 1310 can be configured to be able to acquire video and/or images when disconnected from the modular cellular phone 1300. The camera module 1310 can include an independent power source (e.g., a battery) in the module along with image processing electronics and data storage. In some embodiments, the rear face of the camera module 1310 includes a display (e.g., an LCD display) to view images being acquired with the camera. When coupled to the modular cellular phone 1300, the display can automatically shut off to conserve power.

Similarly, the phone module 1330 can be configured for independent use. For example, when disconnected from the modular cellular phone 1300, the phone module 1330 can be configured to send and receive phone calls as well as digital data over cellular networks and wireless networks.

The battery module 1320 can be configured for independent use as a portable charger. For example, the battery module 1302 can be connected to an electronic device through a cable (e.g., a USB cable) to provide power to charge the electronic device.

Individual modules can be configured to have their respective batteries charged through a charge and/or data connector 1341 (e.g., an AC adapter, a micro-USB connector, or other connector for data and/or power). When the modules are coupled together, data and/or power provided at the connectors 1341 or a first module can provide power and/or data to one or more of the other modules. For example, power and/or data received at a connector 1341 can be transmitted to other modules through the system bus connecting the individual modules.

Other connectors can be configured for dual use as well (e.g., for use in an independent mode and for use when the module is coupled to the modular cellular phone 1300). For example, a video output connector 1343 can be provided by the camera module 1310 to output video data. This can be used to output video data when the camera module 1310 is independent or coupled to the modular cellular phone 1300. Similarly, a video output connector can be on the battery module 1320 and/or the phone module 1330 to similarly output video data. This output video data can be the video data acquired by the camera module 1310, but the phone module 1330, or by another module coupled to the modular cellular phone 1300. As described herein, this can be enabled by the system bus that is configured to transmit data between modules of the modular cellular phone 1300. This is similarly applicable for audio data and audio connectors 1342.

The modular cellular phone 1300 includes individual modules that can be interchangeably coupled together to form a configurable electronic device. The individual modules can be physically coupled through the use of magnets that are configured to provide attractive forces between modules. The individual modules can be physically coupled using interlocking structures, fasteners, mechanical snap surface structures, mechanical latch surface structures, mechanical interference fit surface structures, or the like. These can be used in addition to or in place of magnets.

Figure 15A:
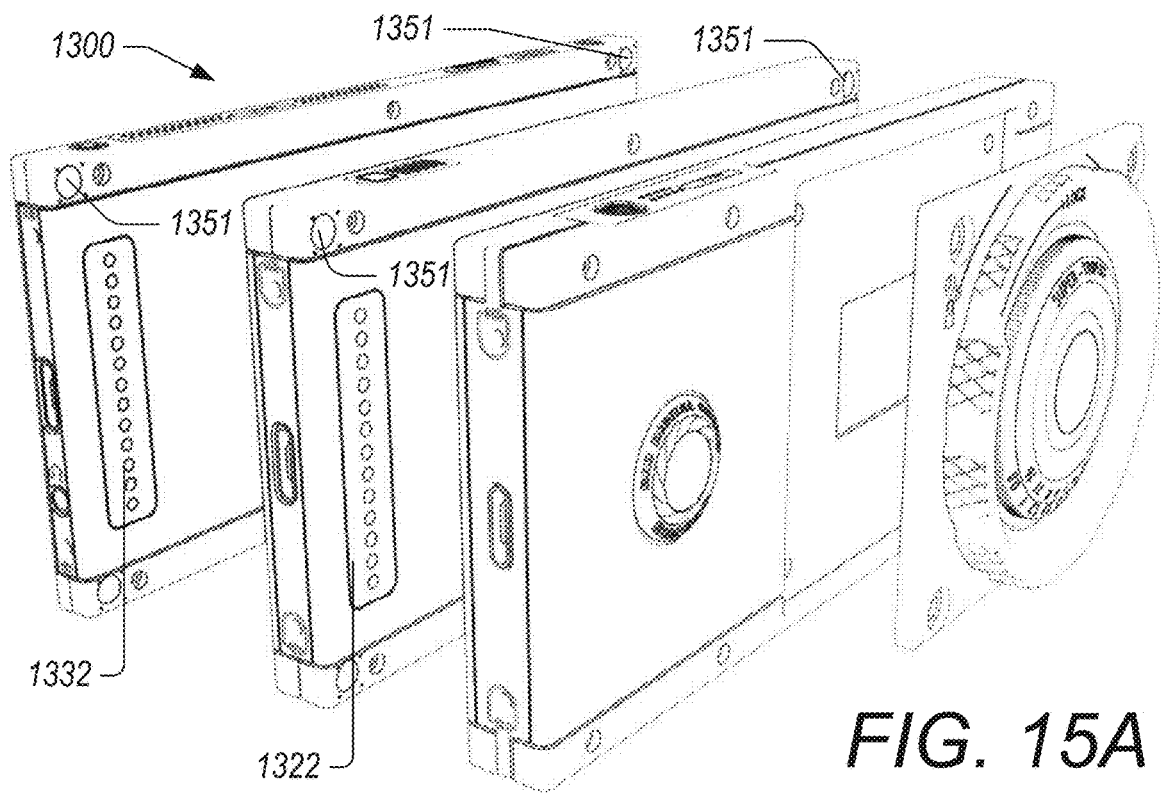
FIGS. 15A-B illustrate perspective views of an example camera module, an example battery module, and an example phone module of a modular cellular phone.
Figure 15B:
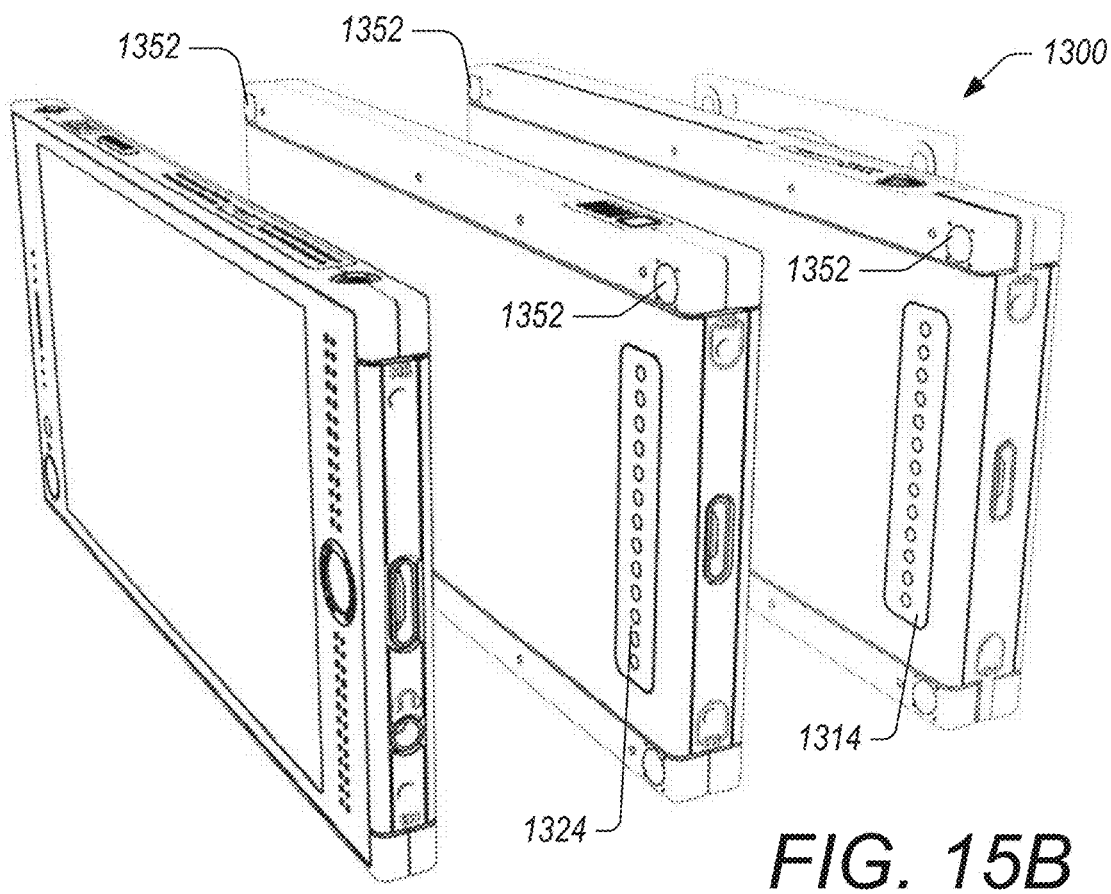

FIGS. 15A-B illustrate perspective views of an example camera module 1310, an example battery module 1320, and an example phone module 1330 of a modular cellular phone. The camera module 1310, battery module 1320, and phone module 1330 include mounting holes 1351, 1352 that can be used to connect the modules together and/or to build a cage system for accessories.

The camera module 1310 includes an electrical interface including electrical connectors 1314 that include multi-function electrical connector for providing electrical communication from the camera module 1310 to other connected modules. The battery module 1320 includes a first electrical interface including electrical connectors 1322 on a first side of the battery module and a second electrical interface including electrical connectors 1324 on a second side of the battery module, the second side opposite the first side. The first and second electrical connectors 1322, 1324 include multi-function electrical connectors for providing electrical communication from the battery module 1320 to other connected modules. Similarly, the phone module 1330 includes an electrical interface including electrical connectors 1332 that include multi-function electrical connector for providing electrical communication from the phone module 1330 to other connected modules. The electrical connectors of the individual modules electrically couple to one another to form the system bus that transmits data and power between modules.

The camera module 1310 and the phone module 1330 are examples of terminal modules that include electrical connectors on a single side of the module. The battery module 1320 is an example of a throughput module that includes electrical connectors on both sides of the module. Terminal modules can be configured for use as a front- or rear-most module in the modular cellular phone 1300. Throughput modules can be configured for use at any position in the modular cellular phone 1300. These throughput modules can be use as internal modules within the modular cellular phone 1300 because they can both receive and transmit data through the electrical connectors on both sides of the modules to other connected modules. Throughput modules can also be used as the front- or rear-most module in the modular cellular phone 1300.

The electrical connectors 1314, 1322, 1324, 1332 include electrical pins and/or electrical pads that are configured to electrically couple to corresponding electrical elements when the modules are coupled together. For example, the electrical elements connectors 1314, 1322, 1324, 1332 can include retractable pins (e.g., spring-loaded pins or pogo pins), sockets, static pins, or the like. In some embodiments, individual electrical connectors include at least 14 electrical contact points, at least 16 electrical contact points, less than 20 electrical contact points, less than 15 electrical contact points, between 1 and 200 electrical contact points, between 2 and 100 electrical contact points, or between 5 and 50 electrical contact points. The electrical connectors can be configured as described elsewhere herein as well.

Figure 16A:
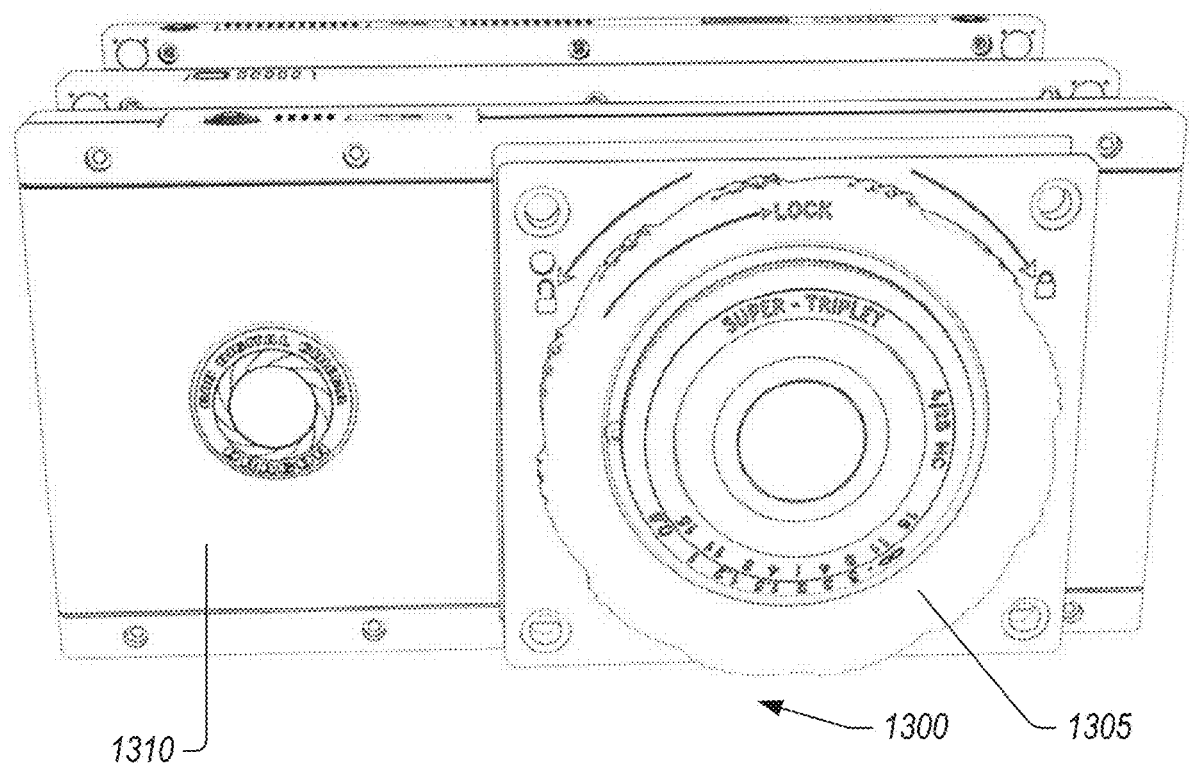
FIGS. 16A-16B illustrate front views of an example modular cellular phone in an assembled and disassembled configuration, highlighting the camera module.
Figure 16B:
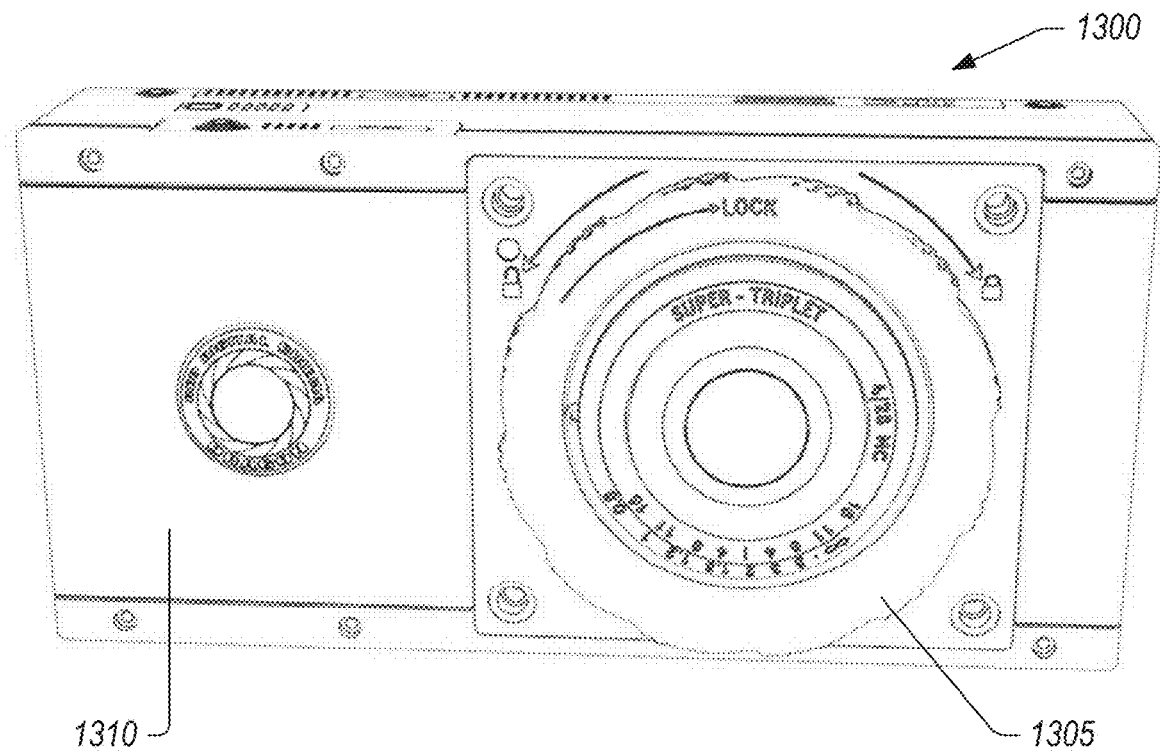

FIGS. 16A-16B illustrate front views of an example modular cellular phone 1300 in an assembled and disassembled configuration, highlighting the camera module 1310 with the optical module 1305. The optical module 1305 can be coupled to the camera module 1310 using the mechanical techniques described herein. In some embodiments, the optical module can be coupled to the camera module using a low profile, positive lock camera component that is lockable and removable from a camera. Examples of this mechanical mounting are described in greater detail in U.S. patent application Ser. No. 14/821,631, entitled "Low-Profile Lens Mount," filed Aug. 7, 2015, the entirety of which is incorporated herein by reference so as to form part of this specification.

The low profile, positive lock camera component includes: a stationary plate having a central aperture; a rotatable lock ring, carried by the stationary plate; and at least two rotatable projections coupled to the lock ring and carried on a camera side of the camera component that is opposite a lens side of the camera component. The rotation of the lock ring rotates the projections about a central axis and also advances the projections along the axis in the direction of the stationary plate.

The low profile, positive lock camera component of the preceding paragraph can include one or more of the following features: The stationary plate is a portion of a telephone housing. Each of the projections has a compression surface arranged parallel to and facing a compression surface of the stationary plate, and the compression surfaces of the projections move closer to the compression surface as the stationary plate as the projections advance along the axis in the direction in the direction of the stationary plate. The camera component is a camera lens. The camera component is a lens mount adapter. The stationary plate and the rotatable projections comprise a first interface of the lens mount adapter configured to allow for removable attachment of the camera component to a corresponding interface on an imaging device housing, and the camera component further comprises a second interface provided on the lens side of the camera component configured to allow for removable attachment of a camera lens thereto. The camera component is configured to fasten to a corresponding support on a housing of an imaging device, forming an effective flange focal distance of no more than about 25 millimeters. The effective flange focal distance is no more than about 20 millimeters. The effective flange focal distance is 18 millimeters. The effective flange focal distance is 19.25 millimeters. The first mounting interface is a male interface and the second mounting interface is a female interface. The low profile, positive lock camera component includes at least three rotatable projections. The low profile, positive lock camera component includes six rotatable projections centered on 60 degree spacing about the axis. The low profile, positive lock camera component includes four rotatable projections, centered on 90 degree spacing about the axis. The low profile, positive lock camera component includes at least two projections on the stationary plate. The low profile, positive lock camera component includes four projections on the stationary plate. The low profile, positive lock camera component includes six projections on the stationary plate. The rotatable projections are movable between a first position in which they are rotationally aligned with the projections on the stationary plate, and a second position in which they are rotationally offset from the projections on the stationary plate. The low profile, positive lock camera component includes a first plurality of electrical contacts on a camera side of the lens mount, and a second plurality of electrical contacts on a lens side of the lens mount. The first plurality of electrical contacts has a different configuration than the second plurality of electrical contacts. The lock ring is threadably coupled to the stationary plate.

In some embodiments, a support having an aperture configured to receive an optical element is disclosed. The support includes: a support front surface, a support rear surface and a thickness there between; a side wall of the aperture extending between the support front surface and support rear surface; and at least two arcuate flanges extending radially inwardly from the side wall into the aperture, each flange having a flange front surface which is recessed from the support front surface, and a flange rear surface which is recessed from the support rear surface. The support forms a female side of a positive lock mounting system.

The support of the preceding paragraph can include one or more of the following features: The support includes an optical element seating cavity having a periphery defined by a forward portion of the sidewall which extends from the support front surface to the flange front surfaces. The periphery of the seating cavity is contoured to accommodate a corresponding contoured periphery surface of the optical element. The contour of the periphery of the seating cavity includes a keying feature configured to allow for single-orientation insertion of the optical element into the aperture. The support comprises a surface on a camera. The support comprises a surface on a cell phone. The support is provided on a lens side of a lens mount adapter. The support comprises a plate configured for attachment to a cell phone. The support includes at least four arcuate flanges extending radially inwardly from the side wall into the aperture. The at least four arcuate flanges are substantially equally spaced about the periphery of the aperture. The support includes an alignment keying feature provided on the sidewall configured to provide for single-orientation insertion of the optical element.

In some embodiments, a support having an aperture configured to receive an optical element is disclosed. The support includes: a support front surface, a support rear surface and a thickness there between; a side wall of the aperture extending between the support front surface and support rear surface; and at least two arcuate flanges extending radially inwardly from the side wall into the aperture, each flange having a flange front surface which is recessed from the support front surface, and a flange rear surface which is recessed from the support rear surface. The support does not include a rotatable locking ring or a spring configured to assist in fastening the optical element to the support.

The support of the preceding paragraph can include one or more of the following features: The support does not implement a bayonet style mount. The support implements a female portion of a positive lock mount.

In some embodiments, an imaging system includes: a housing; at least one image sensor within the housing; a support carried by the housing and having an aperture configured to receive an optical element, wherein light emanating from outside the housing travels through the aperture and is incident on the image sensor. The support includes: a support front surface, a support rear surface, and a thickness there between; a side wall of the aperture extending between the support front surface and support rear surface; and at least two flanges extending radially inwardly from the side wall into the aperture. The support forms a female side of a positive lock mounting interface.

The imaging system of the preceding paragraph can include one or more of the following features: Each of the flanges has a flange front surface that is recessed from the support front surface, and a flange rear surface which is recessed from the support rear surface. A native flange focal distance of the imaging system is no more than about 15 millimeters. A native flange focal distance of the imaging system is no more than about 10 millimeters. A native flange focal distance of the imaging system is about 8 millimeters. The imaging system includes a lens component implementing the male side of the positive lock mounting interface and configured for removable attachment to the support. The lens component comprises a lens or a lens mount adapter. The lens component comprises a lens mount adapter, and an effective flange focal distance of the imaging system with the lens component attached to the support is no more than about 20 mm.

In some embodiments, a lens mount adapter, which is lockable and removable from a camera, is disclosed. The lens mount adapter includes: a rotatable lock ring extending circumferentially around a central aperture; a lens flange surface extending circumferentially around the aperture, the lens flange surface normal to a central axis extending through the aperture; a post movably mounted with respect to the lens flange surface; a button coupled to the lock ring. The button engages the post when the lock ring is rotated to a first position and is displaced from the post when the lock ring is rotated away from the first position.

The lens mount adapter of the preceding paragraph can include one or more of the following features: The button and post engage one another via a tongue and groove connection. Actuation of the button when the button is engaged with the post causes the post to move from an extended position in which the post extends beyond the flange surface to a retracted position in which the post does not extend beyond the flange surface. The post is mounted to a spring, the spring changing from a relaxed state to a compressed state when the button moves from the extended position to the retracted position. The lens mount adapter includes at least two rotatable projections coupled to the lock ring, and the rotation of the lock ring rotates the projections about a central axis and also advances the projections along the axis. The lens mount adapter includes a stationary plate threadably connected to the lock ring, and the rotation of the lock ring in a first direction advances the projections along the axis in a direction of the stationary plate, and rotation of the lock ring in a second direction advances the projections along the axis in a direction away from the stationary plate. The lens mount adapter is configured to allow for an effective flange focal depth of less than or equal to about 25 mm when attached to a corresponding support provided on a housing of an imaging device. The lens mount adapter is configured to allow for an effective flange focal depth of less than or equal to about 20 mm when attached to a corresponding support provided on a housing of an imaging device. The lens mount adapter is configured to allow for an effective flange focal depth of 18 mm when attached to a corresponding support provided on a housing of an imaging device. The lens mount adapter is configured to allow for an effective flange focal depth of 19.25 mm when attached to a corresponding support provided on a housing of an imaging device.

In some embodiments, a low-profile lens component includes: a rotatable lock ring extending circumferentially around a central aperture; a lens interface provided on a camera side of the lens component; a spring-mounted post protruding from a surface on the lens interface when in a spring-relaxed state; a mechanically actuatable control. The control is arranged with respect to the post such that actuation of the control when the lock ring is rotated to a first position overcomes a spring-force of the spring-mounted post, causing the post to retract so that it no longer protrudes from the surface on the lens interface. The control cannot be actuated to cause the post to retract when the lock ring is rotated away from the first position.

The low-profile lens component of the preceding paragraph can include the following feature: The surface on the lens interface is a flange front surface. In other embodiments, the optical module 1305 can comprises a different type of lens mount, and can be the same or similar to any of the other lens mount modules described herein, such as the lens mount modules 114, 214.

Figure 13B:
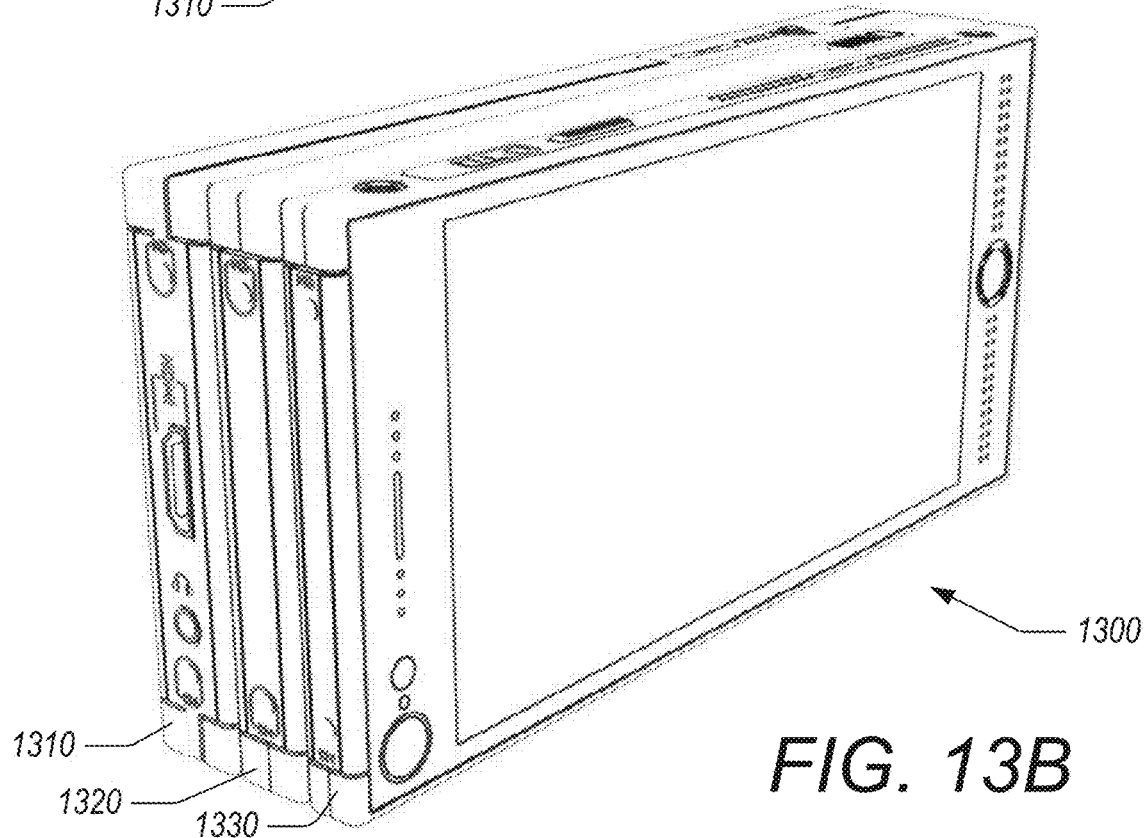
Figure 13C:
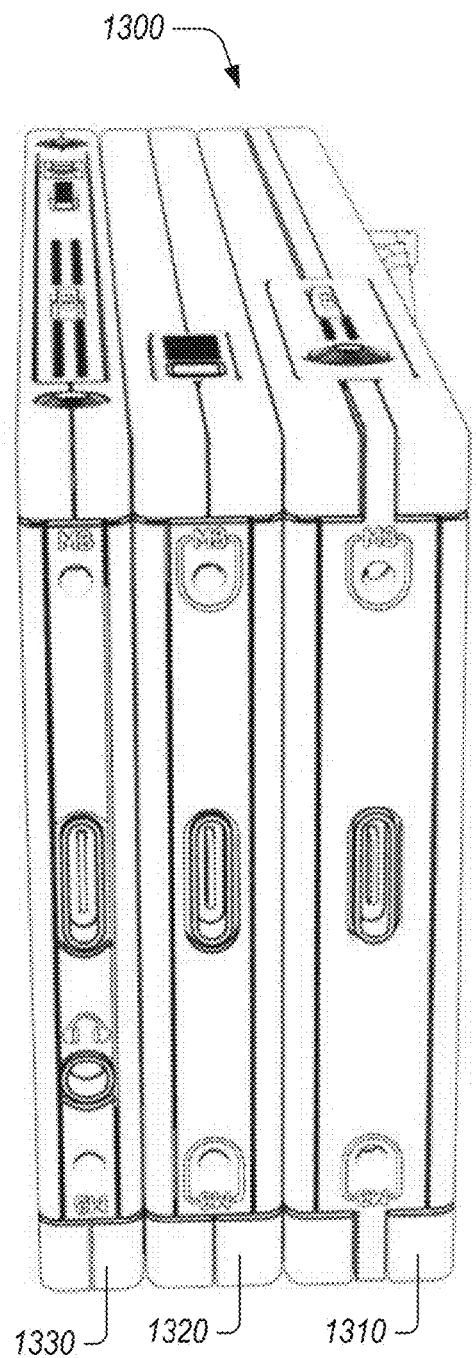
Figure 13D:
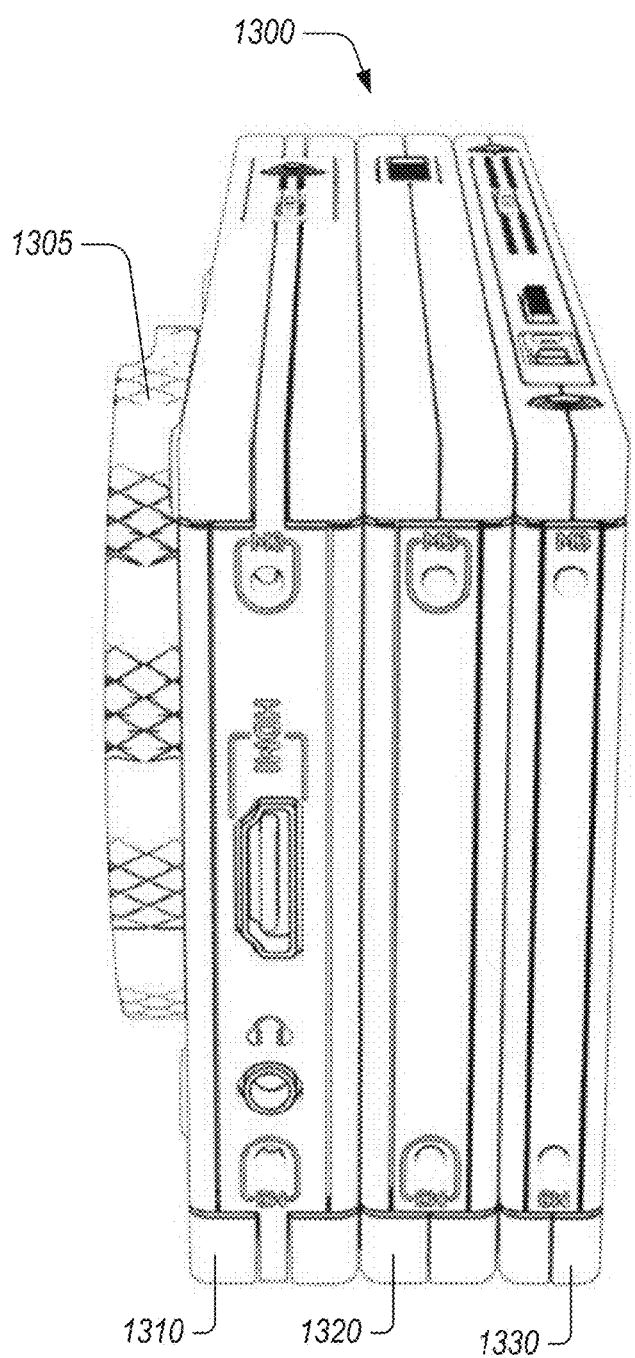
Figure 14A:
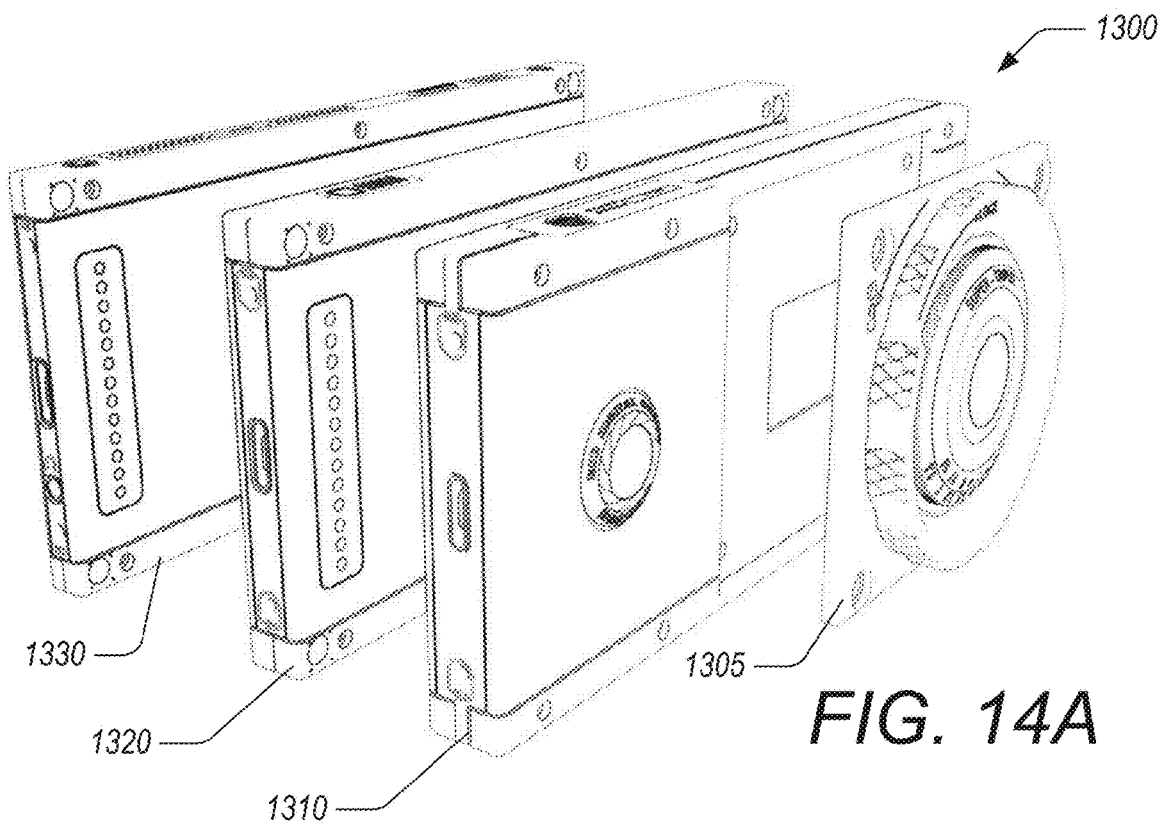
FIGS. 14A-D illustrate various views of an example modular cellular phone in a disassembled configuration.
Figure 14B:
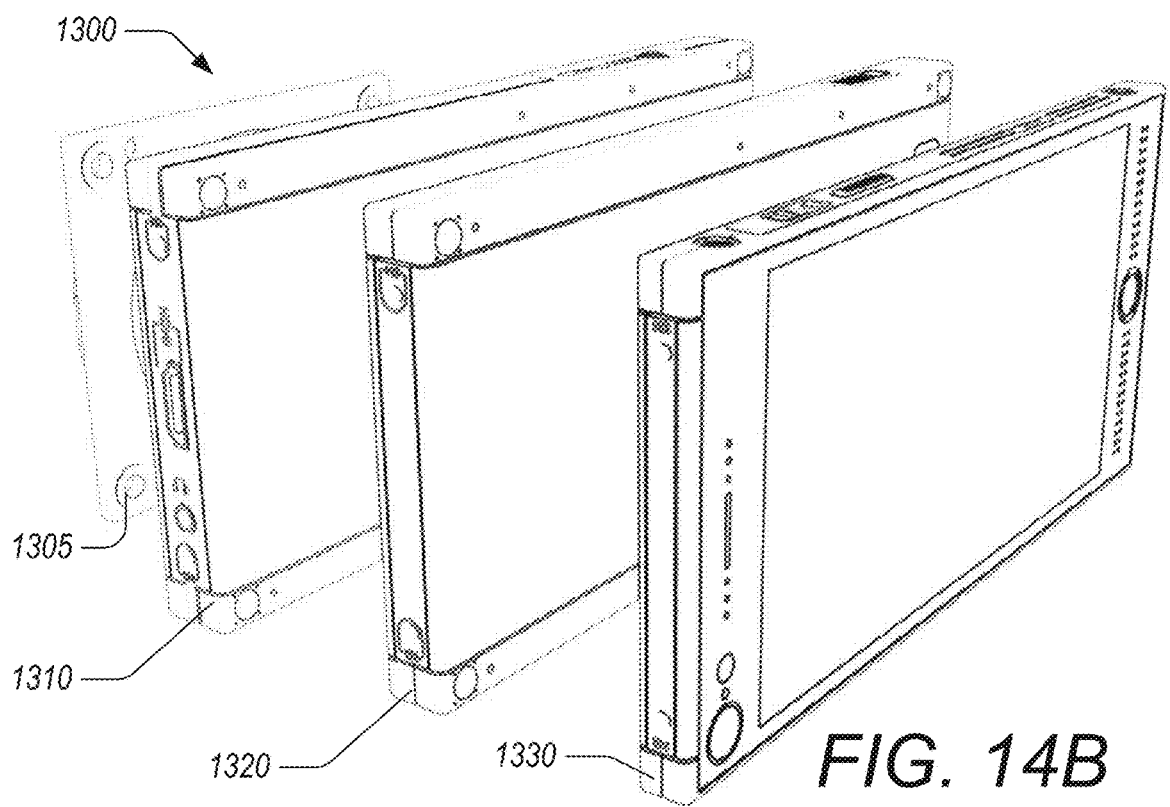
Figure 14C:
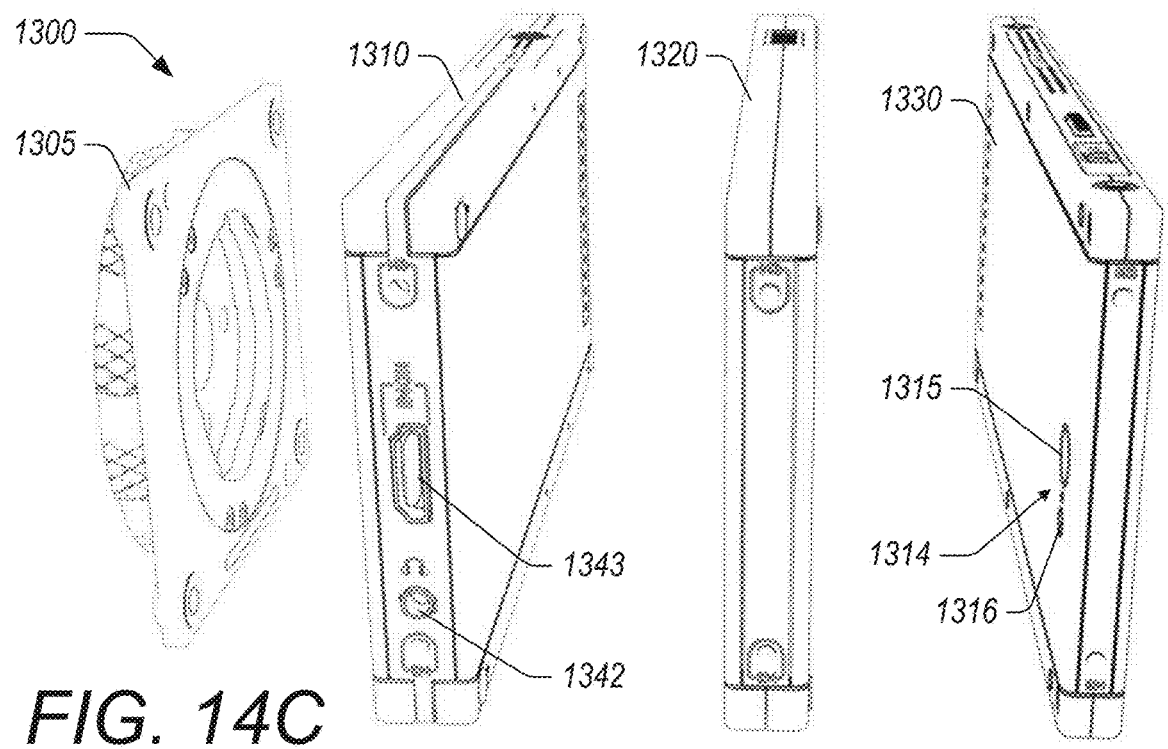
Figure 14D:
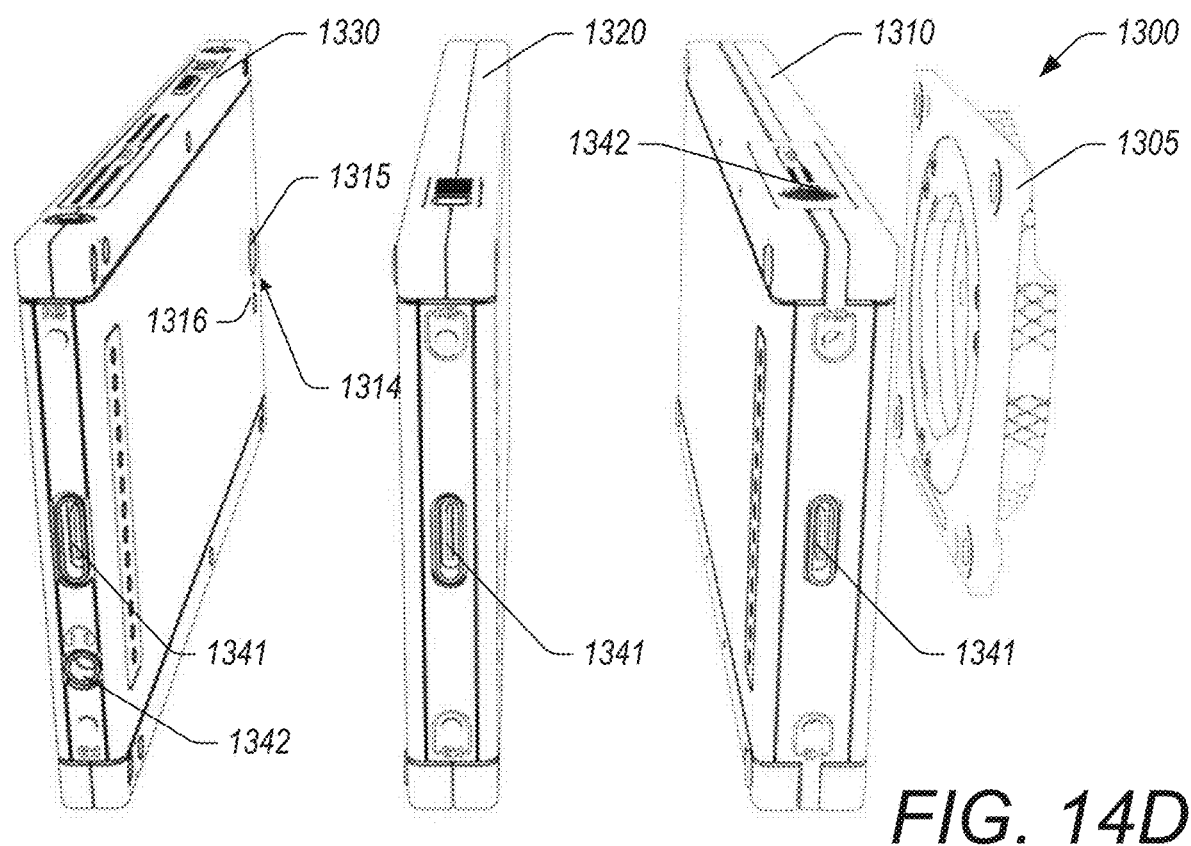
Figure 17A:
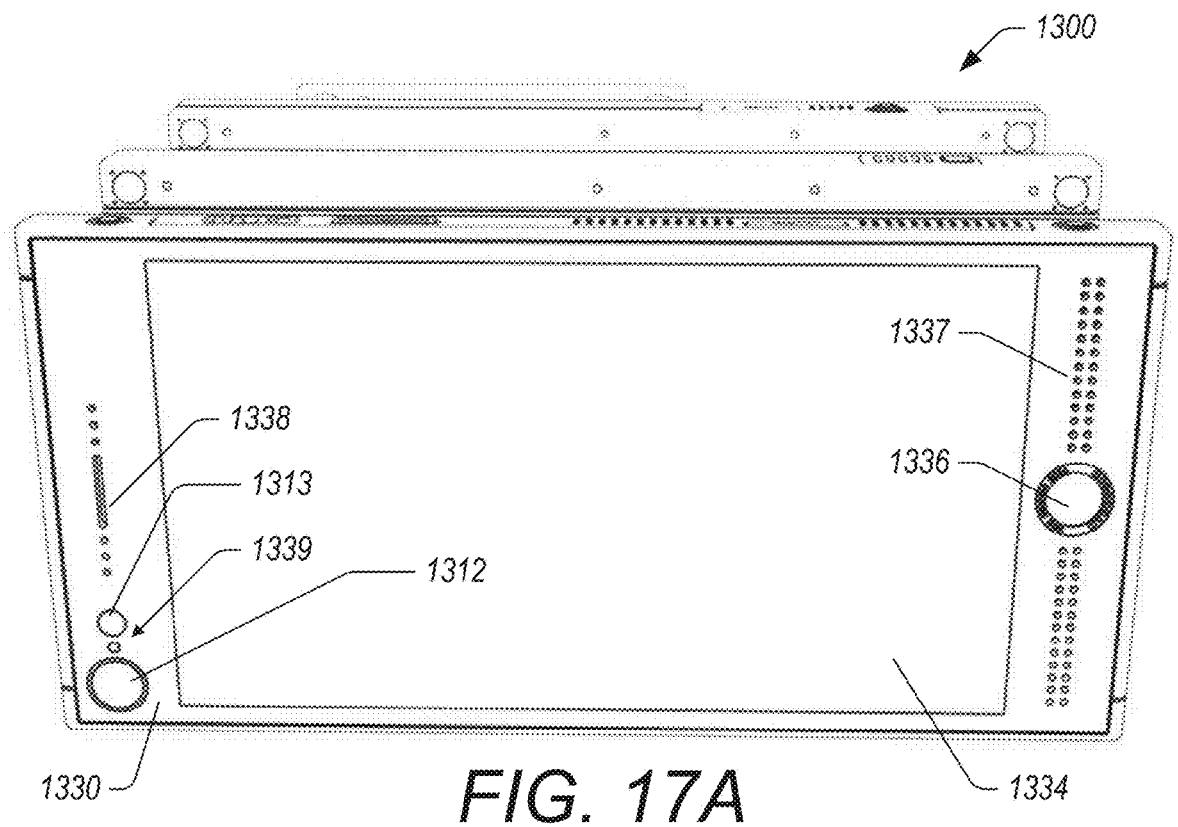
FIGS. 17A-17B illustrate rear views of an example modular cellular phone in an assembled and disassembled configuration, highlighting the phone module.
Figure 17B:
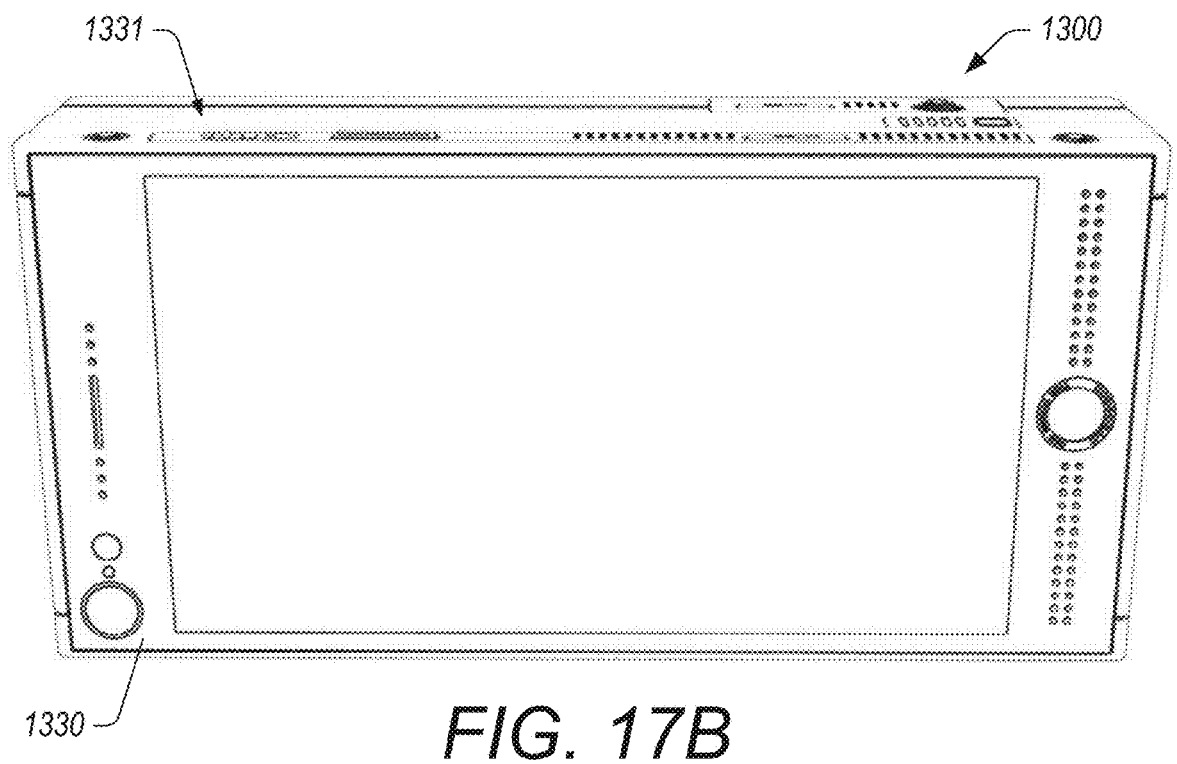

FIGS. 17A-17B illustrate rear views of an example modular cellular phone 1300 in an assembled and disassembled configuration, highlighting the phone module 1330. The phone module 1330 includes physical buttons 1331 to receive user input. The physical buttons can include a power button, volume rocker, mute button, screen lock, rotation lock, capacitive buttons, or the like. The phone module 1330 includes a display 1334. The display 1334 can be a touch screen display configured to both display images as well as receive input. The phone module 1330 can include a main button 1336 configured to perform a variety of actions when pressed, such as turn on the display, take a picture with the camera, perform application-specific actions, or the like. The phone module 1330 can include speakers 1337 and a microphone 1338. The phone module 1330 can include a camera 1339. The camera 1339 can include a light sensor, flash, or the like. The illustrated camera 1339 include a lens 1312 and flash 1313. As illustrated in FIGS. 14C-14D, the illustrated phone module 1330 additionally includes a rear camera 1314, which includes a lens 1315 and flash 1316. As shown in FIGS. 13A-13B, the rear camera 1314 is entirely covered by a subsequent module when in an assembled configuration, such as the battery module 1320 in the illustrated configuration. In a two-module configuration, where no battery module 1320 or other intermediate module is used, and the camera module 1310 is attached directly to the phone module 1330, the rear camera 1314 is entirely covered by the camera module 1310. As described herein, the phone module 1330 can be configured to operate in an independent mode, allowing a user to run applications, send and receive data, make phone calls, take pictures or record video with an included camera, and the like. The functionality of the phone module 1330 can be expanded through the use of modules such as a high quality camera module (e.g., the camera module 1310), the battery module 1320, or any of the other modules described herein.

CONCLUSION

The functionality of certain embodiments of the camera system and associated modules described herein may be implemented as software modules, hardware modules, or a combination thereof. In various embodiments, the functionality may be embodied in hardware, firmware, a collection of software instructions executable on a processor, or in analog circuitry.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A mobile terminal comprising:
a mobile terminal housing having first and second substantially planar sides spaced by a thickness of the mobile terminal housing;
a battery housing to receive a battery within the mobile terminal housing;
mobile terminal electronics configured to provide wireless voice and data communication functionality;
a first camera comprising a first image sensor;
one or more memory devices configured to store digital image data derived from light incident on the first image sensor;
a mobile terminal electrical interface having a first plurality of electrical connectors electrically connected to the mobile terminal electronics and positioned on the first side of the mobile terminal housing; and
a touch screen display on the second side of the mobile terminal housing,
the mobile terminal being attachable to a second camera comprising a camera housing having a first side and a second side, the first side of the camera housing having an aperture through which light enters the camera housing, the second side being substantially planar,
the second camera configured to operate in an independent mode and a modular mode, the independent mode corresponding to use of the second camera when decoupled from the mobile terminal, the second camera comprising:
a lens connected to the first side of the camera housing over the aperture; and
a second image sensor configured to digitize light incident on the second image sensor after the light passes through the lens and the aperture.

2. The mobile terminal of claim 1 further comprising:
magnets configured to provide for magnetic attachment of the mobile terminal to the second camera, the magnets mating the first side of the mobile terminal housing with the second side of the camera housing.

3. The mobile terminal of claim 1, wherein data acquired by the second camera is transmitted to the mobile terminal across a system bus formed by electrical connections between the mobile terminal electrical connector and the camera electrical connector.

4. The mobile terminal of claim 1, wherein one or more of the mobile terminal's electrical interface and the second camera's electrical interface comprise retractable pins.

5. The mobile terminal of claim 4, wherein the mobile terminal housing and the camera housing are connected via a supporting structure through which the retractable pins communicate.

6. The mobile terminal of claim 5, wherein the retractable pins are pogo pins.

7. The mobile terminal of claim 1, wherein the second side of the camera housing is dimensioned to cover the first side of the mobile terminal housing when the mobile terminal module and the camera module are coupled to one another.

8. The mobile terminal of claim 1 further comprising a battery module releasably attachable to the mobile terminal module via magnetic coupling of a side of the battery module to the first side of the mobile terminal housing, the battery module configured to charge the battery of the mobile terminal module.

9. The mobile terminal of claim 1, further comprising a projector module releasably attachable to the mobile terminal housing via magnetic coupling of a side of the projector module to the first side of the mobile terminal housing.

10. The mobile terminal of claim 1, further comprising a speaker module releasably attachable to the mobile terminal housing via magnetic coupling of a side of the speaker module to the first side of the mobile terminal housing.

11. The mobile terminal of claim 1, the modular mode corresponding to use of the mobile terminal when coupled to the second camera.

12. The mobile terminal of claim 1, wherein the lens of the second camera is a zoom lens.

13. The mobile terminal of claim 1, wherein the video data comprises a resolution of at least 2k and a frame rate of at least 23 frames per second.

14. The mobile terminal of claim 1, wherein the mobile terminal is configured to store video data transmitted from the camera module in raw format.

15. The mobile terminal of claim 14, wherein the video data is transmitted through a system bus in real time.

16. The mobile terminal of claim 1, wherein the mobile terminal's electrical interface and the second camera's electrical interface each comprise an oblong shape having a longest dimension extending in a direction transverse to a longitudinal direction of the mobile terminal and the second camera.

17. The mobile terminal of claim 1, the second camera further comprising a camera module electrical interface comprising a second plurality of electrical connectors positioned on the second side of the camera housing.

18. The mobile terminal of claim 1, wherein a rectangular outer periphery of the first side of the mobile terminal housing matches a rectangular outer periphery of the second side of the camera housing.

19. A mobile terminal comprising:
a mobile terminal housing having first and second substantially planar sides spaced by a thickness of the mobile terminal housing;
a battery housing for receiving a battery within the mobile terminal housing;
mobile terminal electronics configured to provide wireless voice and data communication functionality;
a first camera comprising a first image sensor;
one or more memory devices configured to store digital image data derived from light incident on the first image sensor;
a mobile terminal electrical interface having a first plurality of electrical connectors and positioned on the first side of the mobile terminal housing; and
a touch screen display on the second side of the mobile terminal housing,
the mobile terminal being attachable to a second camera comprising:
a camera housing having a first side and a second side, the first side of the camera housing having an aperture through which light enters the camera housing,
a lens connected to the first side of the camera housing over the aperture; and
a second image sensor configured to digitize light incident on the second image sensor after the light passes through the lens and the aperture,
the second camera configured to operate in an independent mode and a modular mode, the independent mode corresponding to use of the second camera when decoupled from the mobile terminal.

* * * * *